US009953378B2

(12) United States Patent
Purves et al.

(10) Patent No.: US 9,953,378 B2
(45) Date of Patent: Apr. 24, 2018

(54) SOCIAL CHECKOUT WIDGET GENERATION AND INTEGRATION APPARATUSES, METHODS AND SYSTEMS

(71) Applicant: Visa International Service Association, San Francisco, CA (US)

(72) Inventors: Thomas Purves, San Francisco, CA (US); Manav Gupta, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1038 days.

(21) Appl. No.: 13/872,005

(22) Filed: Apr. 26, 2013

(65) Prior Publication Data

US 2013/0290203 A1 Oct. 31, 2013

Related U.S. Application Data

(63) Continuation-in-part of application No. 13/714,090, filed as application No. PCT/US2012/069557 on Dec. 13, 2012.

(Continued)

(51) Int. Cl.

*G06Q 50/00* (2012.01)
*G06Q 20/12* (2012.01)

(Continued)

(52) U.S. Cl.

CPC ......... *G06Q 50/01* (2013.01); *G06F 9/44526* (2013.01); *G06Q 20/12* (2013.01);

(Continued)

(58) Field of Classification Search

None

See application file for complete search history.

(56) References Cited

U.S. PATENT DOCUMENTS

| | | | |
|---|---|---|---|
| 789,106 | A | 5/1905 | Seymour |
| 5,237,164 | A | 8/1993 | Takada |

(Continued)

FOREIGN PATENT DOCUMENTS

| | | |
|---|---|---|
| EP | 0855659 | 11/2007 |
| JP | 08-545210 | 12/2008 |

(Continued)

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, p. 1.

(Continued)

*Primary Examiner* — Mamon Obeid

(74) *Attorney, Agent, or Firm* — Loeb & Loeb LLP

(57) ABSTRACT

The SOCIAL CHECKOUT WIDGET GENERATION AND INTEGRATION APPARATUSES, METHODS AND SYSTEMS ("CWI") transforms developer credentials, codes and parameter inputs via the CWI component into buy widgets, payment acceptance and purchase transaction outputs. In one embodiment, the CWI may facilitate obtaining a plurality of authentication parameters and widget customization parameters. The CWI may authenticate a user using a parameter derived from the plurality of authentication parameters and may dynamically generate a purchase widget for the authenticated user using the plurality of widget customization parameters.

19 Claims, 43 Drawing Sheets

Example Social Wallet Integration

Related U.S. Application Data

(60) Provisional application No. 61/639,837, filed on Apr. 27, 2012, provisional application No. 61/639,843, filed on Apr. 27, 2012.

(51) Int. Cl.
*G06F 9/445* (2018.01)
*G06Q 30/06* (2012.01)
*G06Q 20/10* (2012.01)
*G06Q 10/10* (2012.01)

(52) U.S. Cl.
CPC ......... *G06Q 30/0613* (2013.01); *G06Q 10/10* (2013.01); *G06Q 20/102* (2013.01)

(56) References Cited

U.S. PATENT DOCUMENTS 5,311,594 A 5/1994 Penzias
5,446,890 A 8/1995 Renslo et al.
5,459,656 A 10/1995 Fields et al.
5,510,777 A 4/1996 Pilc et al.
5,521,362 A 5/1996 Powers
5,530,438 A 6/1996 Bickham et al.
5,536,045 A 7/1996 Adams
5,588,105 A * 12/1996 Foster .................. G06F 3/0481 715/779
5,615,110 A 3/1997 Wong
5,615,264 A 3/1997 Kazmierczak et al.
5,649,118 A 7/1997 Carlisle et al.
5,815,657 A 9/1998 Williams et al.
5,850,446 A 12/1998 Berger et al.
5,878,337 A 3/1999 Joao et al.
5,903,830 A 5/1999 Joao et al.
5,943,624 A 8/1999 Fox et al.
5,963,924 A 10/1999 Williams et al.
6,064,990 A 5/2000 Goldsmith
6,092,053 A 7/2000 Boesch et al.
6,202,052 B1 3/2001 Miller
6,202,933 B1 3/2001 Poore et al.
6,263,447 B1 7/2001 French et al.
6,267,292 B1 7/2001 Walker et al.
6,304,886 B1 * 10/2001 Bernardo .............. G06F 17/211 707/E17.112
6,330,593 B1 * 12/2001 Roberts ............... G06F 17/3005 707/E17.009
6,336,099 B1 1/2002 Barnett et al.
6,374,250 B2 * 4/2002 Ajtai ....................... H03M 7/30
6,473,500 B1 10/2002 Risafi et al.
6,529,725 B1 3/2003 Joao et al.
6,535,855 B1 3/2003 Cahill et al.
6,601,761 B1 8/2003 Katis
6,735,572 B2 5/2004 Landesmann
6,842,741 B1 * 1/2005 Fujimura ............. G06Q 20/342 705/1.1
6,853,982 B2 2/2005 Smith et al.
6,857,073 B2 2/2005 French et al.
6,873,974 B1 3/2005 Schutzer
6,898,598 B2 5/2005 Himmel et al.
6,934,528 B2 8/2005 Loureiro et al.
6,963,859 B2 * 11/2005 Stefik ...................... G06F 21/10 375/E7.009
6,999,943 B1 2/2006 Johnson et al.
7,024,383 B1 4/2006 Mancini et al.
7,028,052 B2 4/2006 Chapman et al.
7,047,041 B2 5/2006 Vanska et al.
7,051,002 B2 5/2006 Keresman, III et al.
7,089,208 B1 8/2006 Levchin et al.
7,096,003 B2 8/2006 Joao et al.
7,111,789 B2 9/2006 Rajasekaran et al.
7,155,411 B1 12/2006 Blinn et al.
7,165,041 B1 * 1/2007 Guheen .................. G06Q 30/04 705/26.1
7,167,844 B1 * 1/2007 Leong .................... G06Q 30/04 705/37
7,177,848 B2 2/2007 Hogan et al.
7,194,437 B1 3/2007 Britto et al.
7,206,847 B1 4/2007 Alberth et al.
7,212,979 B1 5/2007 Matz et al.
RE39,736 E 7/2007 Morrill, Jr.
7,268,667 B2 9/2007 Beenau et al.
7,268,668 B2 9/2007 Beenau et al.
7,290,704 B1 11/2007 Ball et al.
7,318,049 B2 1/2008 Iannacci
7,337,119 B1 2/2008 Geschwender et al.
7,337,144 B1 2/2008 Blinn et al.
7,343,149 B2 3/2008 Benco et al.
7,343,351 B1 3/2008 Bishop et al.
7,349,885 B2 3/2008 Gangi
7,356,505 B2 4/2008 March
7,357,310 B2 4/2008 Calabrese et al.
7,359,880 B2 4/2008 Abel et al.
7,373,669 B2 5/2008 Eisen et al.
7,379,899 B1 5/2008 Junger
7,392,222 B1 6/2008 Hamilton et al.
7,395,242 B2 7/2008 Blinn et al.
7,398,250 B2 7/2008 Blinn et al.
7,413,113 B1 8/2008 Zhu
7,450,966 B2 11/2008 Vanska et al.
7,477,780 B2 1/2009 Boncyk et al.
7,499,889 B2 3/2009 Golan et al.
7,500,607 B2 3/2009 Williams
7,533,064 B1 5/2009 Boesch
7,536,360 B2 5/2009 Salvotore et al.
7,571,139 B1 8/2009 Giordano et al.
7,571,140 B2 8/2009 Weichert et al.
7,593,858 B2 9/2009 Matz et al.
7,603,311 B1 10/2009 Yadav-ranjan
7,630,937 B1 12/2009 Mo et al.
7,634,295 B2 12/2009 Hayaashi et al.
7,644,037 B1 1/2010 Ostrovsky
7,644,859 B1 1/2010 Zhu
7,660,749 B2 2/2010 Koski
7,676,434 B2 3/2010 Evans
7,685,067 B1 3/2010 Britto et al.
7,698,221 B2 4/2010 Blinn et al.
7,707,113 B1 4/2010 Dimartino et al.
7,708,194 B2 5/2010 Vawter
7,708,198 B2 5/2010 Gangi
7,712,658 B2 5/2010 Gangi
7,734,630 B2 * 6/2010 Kato ................. G06F 17/30029 707/748
7,739,194 B2 6/2010 Blinn et al.
7,742,984 B2 6/2010 Mohsenzadeh
7,774,076 B2 8/2010 Skowronek
7,783,569 B2 8/2010 Abel et al.
7,784,684 B2 8/2010 Labrou et al.
7,801,829 B2 9/2010 Gray et al.
7,802,719 B2 9/2010 Johnson et al.
7,810,720 B2 10/2010 Lovett
7,819,307 B2 10/2010 Lyons et al.
7,828,206 B2 11/2010 Hessburg et al.
7,828,992 B2 11/2010 Kilickiran et al.
7,837,125 B2 11/2010 Biskupski
7,844,530 B2 11/2010 Ziade et al.
7,849,014 B2 12/2010 Erikson
7,870,027 B1 1/2011 Tannenbaum
7,877,299 B2 1/2011 Bui
7,878,400 B2 2/2011 Harris
7,890,370 B2 2/2011 Whitsitt et al.
7,895,119 B2 2/2011 Praisner
7,899,744 B2 3/2011 Bishop et al.
7,904,360 B2 3/2011 Evans
7,908,227 B2 3/2011 Zizzimopoulos et al.
7,926,714 B1 4/2011 Zhu
7,933,779 B2 4/2011 Rooks et al.
7,942,337 B2 5/2011 Jain
7,962,418 B1 6/2011 Wei et al.
7,967,196 B1 6/2011 Bierbaum et al.
7,971,782 B1 7/2011 Shams
7,996,259 B1 8/2011 Distefano, III
8,016,192 B2 9/2011 Messerges et al.
8,020,763 B1 9/2011 Kowalchyk et al.
8,024,260 B1 9/2011 Hogl et al.

(56) References Cited

U.S. PATENT DOCUMENTS

| | | | |
|---|---|---|---|
| 8,028,041 | B2 | 9/2011 | Olliphant et al. |
| 8,032,438 | B1 | 10/2011 | Barton et al. |
| 8,041,338 | B2 | 10/2011 | Chen et al. |
| 8,050,997 | B1 | 11/2011 | Nosek et al. |
| 8,060,413 | B2 | 11/2011 | Castell et al. |
| 8,074,876 | B2 | 12/2011 | Foss et al. |
| 8,086,535 | B2 * | 12/2011 | Zweig .................... G06F 21/10 380/200 |
| 8,108,261 | B2 | 1/2012 | Carlier et al. |
| 8,127,982 | B1 | 3/2012 | Casey et al. |
| 8,140,418 | B1 | 3/2012 | Casey et al. |
| 8,145,188 | B2 | 3/2012 | Park et al. |
| 8,145,561 | B1 | 3/2012 | Zhu et al. |
| 8,145,566 | B1 | 3/2012 | Ahuja et al. |
| 8,145,569 | B2 | 3/2012 | Gong |
| 8,145,898 | B2 | 3/2012 | Kamalakantha |
| 8,150,767 | B2 | 4/2012 | Wankmueller |
| 8,150,772 | B2 | 4/2012 | Mardikar et al. |
| 8,151,328 | B1 | 4/2012 | Lundy |
| 8,151,330 | B2 | 4/2012 | Vishik et al. |
| 8,151,336 | B2 | 4/2012 | Savoor |
| 8,155,999 | B2 | 4/2012 | De Boer et al. |
| 8,156,000 | B1 | 4/2012 | Thompson |
| 8,156,026 | B2 | 4/2012 | Junger et al. |
| 8,156,042 | B2 | 4/2012 | Winkleman, III et al. |
| 8,156,549 | B2 | 4/2012 | Rice et al. |
| 8,157,178 | B2 | 4/2012 | Dewan et al. |
| 8,157,181 | B2 | 4/2012 | Bates et al. |
| 8,160,935 | B2 | 4/2012 | Bui |
| 8,160,959 | B2 | 4/2012 | Rackley, III et al. |
| 8,165,961 | B1 | 4/2012 | Dimartino et al. |
| 8,166,068 | B2 | 4/2012 | Stevens |
| RE43,351 | E | 5/2012 | Jordan, Jr. |
| 8,170,921 | B2 | 5/2012 | Stocker |
| 8,175,235 | B2 | 5/2012 | Mumford et al. |
| 8,175,965 | B2 | 5/2012 | Moore et al. |
| 8,175,967 | B2 | 5/2012 | O'Leary et al. |
| 8,175,968 | B2 | 5/2012 | O'Leary et al. |
| 8,175,975 | B2 | 5/2012 | Cai et al. |
| 8,175,979 | B2 | 5/2012 | Baentsch et al. |
| 8,176,416 | B1 | 5/2012 | Williams et al. |
| 8,179,563 | B2 | 5/2012 | King et al. |
| 8,180,289 | B1 | 5/2012 | Glickman |
| 8,180,705 | B2 | 5/2012 | Kowalchyk et al. |
| 8,190,513 | B2 | 5/2012 | Felger |
| 8,191,775 | B2 | 6/2012 | Hildred |
| 8,195,233 | B2 | 6/2012 | Morikuni et al. |
| 8,195,544 | B2 | 6/2012 | Horsfall |
| 8,195,547 | B2 | 6/2012 | Aaltonen et al. |
| 8,195,565 | B2 | 6/2012 | Bishop et al. |
| 8,195,576 | B1 | 6/2012 | Grigg et al. |
| 8,196,131 | B1 | 6/2012 | Von Behren et al. |
| 8,200,582 | B1 | 6/2012 | Zhu |
| 8,204,774 | B2 | 6/2012 | Chwast et al. |
| 8,204,829 | B2 | 6/2012 | Alvarez et al. |
| 8,209,245 | B2 | 6/2012 | Dennes |
| 8,209,744 | B2 | 6/2012 | Zhu et al. |
| 8,214,288 | B2 | 7/2012 | Olliphant et al. |
| 8,214,289 | B2 | 7/2012 | Scipioni |
| 8,214,291 | B2 | 7/2012 | Pelegero et al. |
| 8,214,292 | B2 | 7/2012 | Duggal et al. |
| 8,214,293 | B2 | 7/2012 | Powell |
| 8,214,886 | B2 | 7/2012 | Foley et al. |
| 8,215,546 | B2 | 7/2012 | Lin et al. |
| 8,219,411 | B2 | 7/2012 | Matz et al. |
| 8,219,474 | B2 | 7/2012 | Sutton et al. |
| 8,219,490 | B2 | 7/2012 | Hammad et al. |
| 8,220,047 | B1 | 7/2012 | Soghoian et al. |
| 8,224,702 | B2 | 7/2012 | Mangerink et al. |
| 8,224,754 | B2 | 7/2012 | Pastusiak et al. |
| 8,224,773 | B2 | 7/2012 | Spiegel |
| 8,225,997 | B1 | 7/2012 | Bierbaum et al. |
| 8,227,936 | B1 | 7/2012 | Folk et al. |
| 8,229,354 | B2 | 7/2012 | Sklovsky et al. |
| 8,229,808 | B1 | 7/2012 | Heit |
| 8,229,844 | B2 | 7/2012 | Felger |
| 8,229,851 | B2 | 7/2012 | Doran et al. |
| 8,229,854 | B2 | 7/2012 | Stephen et al. |
| 8,233,841 | B2 | 7/2012 | Griffin et al. |
| 8,234,183 | B2 | 7/2012 | Smith |
| 8,239,276 | B2 | 8/2012 | Lin et al. |
| 8,244,580 | B2 | 8/2012 | Mankoff et al. |
| 8,249,965 | B2 | 8/2012 | Tumminaro |
| 8,255,278 | B1 | 8/2012 | Young et al. |
| 8,255,323 | B1 | 8/2012 | Casey et al. |
| 8,255,324 | B2 | 8/2012 | Bercy et al. |
| 8,275,704 | B2 | 9/2012 | Bishop et al. |
| 8,280,777 | B2 | 10/2012 | Mengerink et al. |
| 8,281,998 | B2 | 10/2012 | Tang et al. |
| 8,282,002 | B2 | 10/2012 | Shams |
| 8,285,640 | B2 | 10/2012 | Scipioni |
| 8,285,820 | B2 | 10/2012 | Olliphant et al. |
| 8,285,832 | B2 | 10/2012 | Schwab et al. |
| 8,286,875 | B2 | 10/2012 | Tang et al. |
| 8,290,433 | B2 | 10/2012 | Fisher et al. |
| 8,290,819 | B2 | 10/2012 | Bawcutt |
| 8,290,829 | B1 | 10/2012 | Katz et al. |
| 8,295,898 | B2 | 10/2012 | Ashfield et al. |
| 8,296,187 | B2 | 10/2012 | Light et al. |
| 8,296,204 | B2 | 10/2012 | Templeton et al. |
| 8,296,228 | B1 | 10/2012 | Kloor |
| 8,296,231 | B2 | 10/2012 | Britto et al. |
| 8,301,500 | B2 | 10/2012 | Pharris |
| 8,301,510 | B2 | 10/2012 | Boesch |
| 8,301,556 | B2 | 10/2012 | Hogl et al. |
| 8,311,520 | B2 | 11/2012 | Choi et al. |
| 8,312,096 | B2 | 11/2012 | Cohen et al. |
| 8,321,267 | B2 | 11/2012 | Hoerenz et al. |
| 8,321,294 | B2 | 11/2012 | Carlier et al. |
| 8,321,315 | B2 | 11/2012 | Abel et al. |
| 8,321,338 | B2 | 11/2012 | Baumgart et al. |
| 8,321,343 | B2 | 11/2012 | Ramavarjula et al. |
| 8,326,756 | B2 | 12/2012 | Egendorf |
| 8,326,769 | B1 | 12/2012 | Weisman |
| 8,326,770 | B1 | 12/2012 | Weisman |
| 8,327,450 | B2 | 12/2012 | Clement et al. |
| 8,332,272 | B2 | 12/2012 | Fisher |
| 8,332,275 | B2 | 12/2012 | Poon et al. |
| 8,332,323 | B2 | 12/2012 | Stals et al. |
| 8,335,720 | B2 | 12/2012 | Juang et al. |
| 8,335,726 | B1 | 12/2012 | Ling et al. |
| 8,335,822 | B2 | 12/2012 | Ahmed et al. |
| 8,335,921 | B2 | 12/2012 | Von Behren et al. |
| 8,335,932 | B2 | 12/2012 | Von Behren et al. |
| 8,340,666 | B2 | 12/2012 | Ramer et al. |
| 8,341,029 | B1 | 12/2012 | Ramalingam et al. |
| 8,346,643 | B2 | 1/2013 | Boyer et al. |
| 8,346,659 | B1 | 1/2013 | Mohsenzadeh |
| 8,346,663 | B2 | 1/2013 | Kawan |
| 8,352,323 | B2 | 1/2013 | Fisher |
| 8,352,362 | B2 | 1/2013 | Mohsenzadeh |
| 8,352,499 | B2 | 1/2013 | Bharat et al. |
| 8,352,749 | B2 | 1/2013 | Von Behren et al. |
| 8,355,987 | B2 | 1/2013 | Hirson et al. |
| 8,359,070 | B1 | 1/2013 | Zhu |
| 8,364,587 | B2 | 1/2013 | Nuzum et al. |
| 8,364,590 | B1 | 1/2013 | Casey et al. |
| 8,370,264 | B1 | 2/2013 | Wei et al. |
| 8,380,177 | B2 | 2/2013 | Laracey |
| 8,401,904 | B1 | 3/2013 | Simakov et al. |
| 8,412,586 | B1 | 4/2013 | Foulser et al. |
| 8,412,630 | B2 | 4/2013 | Ross et al. |
| 8,417,633 | B1 | 4/2013 | Chmara et al. |
| 8,423,462 | B1 | 4/2013 | Amacker et al. |
| 8,788,935 | B1 * | 7/2014 | Hirsch ................ G06F 17/2247 715/234 |
| 9,471,332 | B2 * | 10/2016 | Li ......................... G06F 9/4443 |
| 2001/0037297 | A1 | 3/2001 | McNair |
| 2001/0056359 | A1 | 12/2001 | Abreu |
| 2002/0019777 | A1 * | 2/2002 | Schwab ............ G06Q 10/0837 705/26.41 |
| 2002/0040325 | A1 | 4/2002 | Takae et al. |
| 2002/0077976 | A1 | 6/2002 | Meyer et al. |
| 2002/0107755 | A1 | 8/2002 | Steed et al. |

(56) References Cited

U.S. PATENT DOCUMENTS

2002/0112014 A1 8/2002 Bennett et al.
2002/0116271 A1 8/2002 Mankoff
2002/0143614 A1 10/2002 MacLean et al.
2003/0014307 A1 1/2003 Heng
2003/0026404 A1 2/2003 Joyce et al.
2003/0028481 A1 2/2003 Flitcroft et al.
2003/0061170 A1* 3/2003 Uzo ........................ G06Q 20/06 705/64
2003/0080185 A1 5/2003 Werther
2003/0097318 A1 5/2003 Yu et al.
2003/0101134 A1 5/2003 Liu et al.
2003/0174823 A1 9/2003 Justice et al.
2003/0177361 A1* 9/2003 Wheeler ................. G06F 21/32 713/176
2003/0191711 A1 10/2003 Jamison et al.
2003/0200142 A1 10/2003 Hicks et al.
2003/0200184 A1 10/2003 Dominguez et al.
2003/0212642 A1 11/2003 Weller et al.
2004/0078332 A1 4/2004 Ferguson et al.
2004/0103037 A1 5/2004 Wetmore et al.
2004/0128197 A1 7/2004 Bam et al.
2004/0138999 A1 7/2004 Friedman et al.
2004/0148255 A1 7/2004 Beck et al.
2004/0215963 A1 10/2004 Kaplan
2004/0230536 A1 11/2004 Fung et al.
2004/0236646 A1 11/2004 Wu et al.
2004/0254891 A1 12/2004 Blinn et al.
2004/0267608 A1 12/2004 Mansfield, Jr.
2005/0010483 A1 1/2005 Ling
2005/0015338 A1* 1/2005 Lee ...................... G06Q 20/102 705/40
2005/0037735 A1 2/2005 Coutts
2005/0065819 A1 3/2005 Schultz
2005/0080747 A1 4/2005 Anderson et al.
2005/0080821 A1 4/2005 Breil et al.
2005/0097320 A1 5/2005 Golan et al.
2005/0137969 A1 6/2005 Shah
2005/0171894 A1 8/2005 Traynor
2005/0192893 A1 9/2005 Keeling et al.
2005/0192895 A1 9/2005 Rogers et al.
2005/0220326 A1 10/2005 Sim
2005/0234817 A1 10/2005 VanFleet et al.
2005/0246278 A1 11/2005 Gerber et al.
2005/0254714 A1 11/2005 Anne
2005/0261967 A1 11/2005 Barry et al.
2006/0005207 A1* 1/2006 Louch ....................... G06F 8/38 719/328
2006/0015399 A1* 1/2006 Alberth, Jr. .......... G06Q 10/103 705/301
2006/0053056 A1 3/2006 Alspach-goss et al.
2006/0053077 A1* 3/2006 Mourad .............. G06F 17/3089 705/51
2006/0085328 A1 4/2006 Cohen et al.
2006/0085477 A1 4/2006 Phillips et al.
2006/0089962 A1* 4/2006 Tsukazaki .............. G06Q 30/06 709/200
2006/0124729 A1 6/2006 Martin
2006/0129427 A1 6/2006 Wennberg
2006/0163349 A1 7/2006 Neugebauer
2006/0178986 A1 8/2006 Giordano et al.
2006/0190347 A1 8/2006 Cuervo
2006/0212722 A1* 9/2006 Ginter ..................... G06F 21/10 713/193
2006/0226216 A1 10/2006 Keithley
2006/0268007 A1* 11/2006 Gopalakrishnan ......................... G06F 17/30244 345/619
2006/0277143 A1 12/2006 Almonte et al.
2006/0293947 A1 12/2006 Nicholson
2007/0011025 A1 1/2007 Cracchiolo et al.
2007/0038515 A1 2/2007 Postrel
2007/0038516 A1 2/2007 Apple et al.
2007/0055571 A1 3/2007 Fox et al.
2007/0087820 A1 4/2007 Van Luchene et al.
2007/0094066 A1 4/2007 Kumar et al.
2007/0100691 A1 5/2007 Patterson
2007/0100728 A1 5/2007 Rotman et al.
2007/0106607 A1 5/2007 Seib et al.
2007/0113289 A1 5/2007 Blumenau
2007/0143204 A1 6/2007 Claus et al.
2007/0150413 A1 6/2007 Morgenstern
2007/0180119 A1 8/2007 Khivesara et al.
2007/0208662 A1 9/2007 Jeronimus et al.
2007/0214078 A1 9/2007 Coppinger
2007/0214250 A1 9/2007 Ahmed et al.
2007/0226152 A1 9/2007 Jones
2007/0233590 A1 10/2007 Hardison, III
2007/0239502 A1 10/2007 Babu
2007/0255653 A1* 11/2007 Tumminaro ........... G06Q 20/10 705/39
2007/0276765 A1 11/2007 Hazel et al.
2007/0299976 A1* 12/2007 Zafar .................. H04L 61/1582 709/229
2008/0004116 A1 1/2008 Van Luchene et al.
2008/0004952 A1 1/2008 Koli
2008/0010096 A1 1/2008 Patterson et al.
2008/0021829 A1 1/2008 Kranzley
2008/0034309 A1* 2/2008 Louch ................... G06F 3/0481 715/766
2008/0077489 A1 3/2008 Gilley et al.
2008/0086365 A1 4/2008 Zollino et al.
2008/0091553 A1 4/2008 Koski
2008/0091616 A1 4/2008 Helwin et al.
2008/0097856 A1 4/2008 Blagg et al.
2008/0104496 A1* 5/2008 Williams ............. G06Q 10/107 715/209
2008/0114737 A1 5/2008 Neely et al.
2008/0126145 A1 5/2008 Racklet, III et al.
2008/0133351 A1 6/2008 White et al.
2008/0140568 A1 6/2008 Henry
2008/0147883 A1 6/2008 Philyaw
2008/0148283 A1* 6/2008 Allen ........................ G06F 8/38 719/316
2008/0162361 A1 7/2008 Sklovsky et al.
2008/0167965 A1 7/2008 Von Nothaus et al.
2008/0172274 A1 7/2008 Hurowitz et al.
2008/0172331 A1 7/2008 Graves et al.
2008/0177574 A1 7/2008 Lara Gonzalez et al.
2008/0177672 A1 7/2008 Brunner et al.
2008/0223918 A1 9/2008 Williams et al.
2008/0270300 A1 10/2008 Jones et al.
2008/0272188 A1 11/2008 Keithley et al.
2008/0319905 A1 12/2008 Carlson
2009/0006181 A1 1/2009 Ghosh et al.
2009/0024527 A1 1/2009 Sellen et al.
2009/0037255 A1 2/2009 Chiu et al.
2009/0048934 A1 2/2009 Haddad et al.
2009/0055757 A1* 2/2009 Chaney ................. G06F 9/4443 715/762
2009/0061884 A1 3/2009 Rajan et al.
2009/0063261 A1 3/2009 Scribner et al.
2009/0064056 A1 3/2009 Anderson et al.
2009/0076934 A1* 3/2009 Shahbazi ............. G06Q 20/102 705/30
2009/0076953 A1 3/2009 Saville et al.
2009/0076966 A1 3/2009 Bishop et al.
2009/0089176 A1 4/2009 Mccabe
2009/0089193 A1 4/2009 Paintin
2009/0104888 A1 4/2009 Cox
2009/0106151 A1 4/2009 Nelsen et al.
2009/0119176 A1 5/2009 Johnson
2009/0119211 A1 5/2009 Johnson
2009/0132347 A1 5/2009 Anderson et al.
2009/0132395 A1 5/2009 Lam et al.
2009/0132403 A1* 5/2009 Titus ...................... G06Q 10/04 705/311
2009/0132435 A1* 5/2009 Titus ...................... G06Q 10/10 705/400
2009/0144104 A1 6/2009 Johnson
2009/0150388 A1* 6/2009 Roseman .............. G06F 17/278
2009/0164344 A1 6/2009 Shiftan et al.
2009/0171778 A1 7/2009 Powell

(56) References Cited

U.S. PATENT DOCUMENTS

2009/0182664 A1 7/2009 Trombley
2009/0182762 A1* 7/2009 Chang ............... G06F 17/30935
2009/0210300 A1 8/2009 Cansler et al.
2009/0222347 A1 9/2009 Whitten
2009/0222511 A1* 9/2009 Hays .................. G06F 17/2229 709/203
2009/0233579 A1 9/2009 Castell et al.
2009/0234751 A1 9/2009 Chan et al.
2009/0241159 A1 9/2009 Campagna et al.
2009/0254471 A1 10/2009 Seidel et al.
2009/0254479 A1 10/2009 Pharris
2009/0254535 A1 10/2009 Eickelmann et al.
2009/0265274 A1 10/2009 Hahn-Carlson et al.
2009/0271265 A1 10/2009 Lay et al.
2009/0271283 A1* 10/2009 Fosnacht .............. G06Q 20/123 705/26.1
2009/0288012 A1 11/2009 Hertel et al.
2009/0307135 A1 12/2009 Gupta et al.
2009/0313132 A1 12/2009 McKenna et al.
2009/0327045 A1 12/2009 Olives et al.
2009/0327088 A1 12/2009 Puthupparambil et al.
2010/0004989 A1 1/2010 Bonalle et al.
2010/0005025 A1 1/2010 Kumar
2010/0009663 A1 1/2010 Chang
2010/0010964 A1 1/2010 Skowronek et al.
2010/0017501 A1* 1/2010 Yen ......................... G06F 21/10 709/219
2010/0023386 A1 1/2010 Avisar et al.
2010/0023455 A1 1/2010 Dispensa et al.
2010/0036741 A1 2/2010 Cleven
2010/0036775 A1 2/2010 Edens
2010/0042456 A1 2/2010 Stinchcombe et al.
2010/0042537 A1 2/2010 Smith et al.
2010/0042540 A1 2/2010 Graves et al.
2010/0049879 A1 2/2010 Leavitt et al.
2010/0063903 A1 3/2010 Whipple et al.
2010/0076873 A1 3/2010 Taylor et al.
2010/0078471 A1 4/2010 Lin et al.
2010/0078472 A1 4/2010 Lin et al.
2010/0082444 A1 4/2010 Lin et al.
2010/0082445 A1 4/2010 Hodge et al.
2010/0082447 A1 4/2010 Lin et al.
2010/0082455 A1 4/2010 Rosenblatt et al.
2010/0082480 A1 4/2010 Korosec
2010/0082481 A1 4/2010 Lin et al.
2010/0082485 A1 4/2010 Lin et al.
2010/0082490 A1 4/2010 Rosenblatt et al.
2010/0082491 A1 4/2010 Rosenblatt et al.
2010/0088188 A1 4/2010 Kumar et al.
2010/0094730 A1 4/2010 Koski
2010/0100480 A1 4/2010 Altman et al.
2010/0121707 A1 5/2010 Goeldi
2010/0125492 A1 5/2010 Lin et al.
2010/0125495 A1 5/2010 Smith et al.
2010/0125803 A1 5/2010 Johnson
2010/0131347 A1 5/2010 Sarptipi
2010/0131415 A1 5/2010 Sartipi
2010/0155470 A1 6/2010 Woronec
2010/0161433 A1 6/2010 White
2010/0174599 A1 7/2010 Rosenblatt et al.
2010/0185505 A1 7/2010 Sprogoe et al.
2010/0185531 A1 7/2010 Van Luchene
2010/0191578 A1 7/2010 Tran et al.
2010/0191622 A1 7/2010 Reiss et al.
2010/0191770 A1 7/2010 Cho et al.
2010/0198626 A1 8/2010 Cho et al.
2010/0211445 A1 8/2010 Bodington
2010/0211452 A1 8/2010 D'Angelo et al.
2010/0211499 A1 8/2010 Zanzot et al.
2010/0217682 A1 8/2010 Chan
2010/0250351 A1 9/2010 Gillenson et al.
2010/0276484 A1 11/2010 Banerjee et al.
2010/0305848 A1 12/2010 Stallman
2010/0306075 A1 12/2010 Drance et al.
2010/0306113 A1 12/2010 Grey et al.
2010/0312645 A1 12/2010 Niekadlik et al.
2010/0312676 A1 12/2010 Muthukumaran
2010/0332262 A1 12/2010 Horvitz et al.
2010/0332283 A1 12/2010 Ng et al.
2011/0047075 A1 2/2011 Fourez
2011/0060663 A1* 3/2011 McPhie .................. G06Q 30/02 705/27.1
2011/0078082 A1 3/2011 Gupta
2011/0082789 A1 4/2011 Boyd
2011/0085667 A1* 4/2011 Berrios ................. G06F 21/445 380/282
2011/0099057 A1 4/2011 Tenyer
2011/0105183 A1 5/2011 Hsiao et al.
2011/0106698 A1 5/2011 Issacson et al.
2011/0137742 A1 6/2011 Parikh
2011/0178896 A1 7/2011 Nakajima et al.
2011/0184827 A1 7/2011 Hubert
2011/0209049 A1* 8/2011 Ghosh .................... G06Q 10/06 715/236
2011/0215146 A1 9/2011 Shams
2011/0218870 A1 9/2011 Shams et al.
2011/0246290 A1 10/2011 Howard et al.
2011/0258123 A1 10/2011 Dawkins et al.
2011/0296508 A1 12/2011 Os et al.
2011/0320344 A1 12/2011 Faith et al.
2012/0011063 A1 1/2012 Killian et al.
2012/0022943 A1 1/2012 Howard et al.
2012/0023026 A1 1/2012 Chen et al.
2012/0030101 A1 2/2012 Boyd
2012/0036071 A1 2/2012 Fulton et al.
2012/0084204 A1 4/2012 Castell et al.
2012/0095895 A1 4/2012 Aston
2012/0101881 A1 4/2012 Taylor et al.
2012/0116966 A1 5/2012 Tan
2012/0118950 A1 5/2012 Belk
2012/0123838 A1 5/2012 Sparks
2012/0136780 A1 5/2012 El-Awady et al.
2012/0166333 A1 6/2012 von Behren et al.
2012/0173431 A1 7/2012 Ritchie et al.
2012/0190386 A1 7/2012 Anderson
2012/0209677 A1* 8/2012 Mehta .................... G06Q 20/12 705/14.16
2012/0215640 A1 8/2012 Ramer et al.
2012/0215650 A1 8/2012 Oba et al.
2012/0215701 A1* 8/2012 Mehta .................... G06Q 20/12 705/75
2012/0221421 A1 8/2012 Hammad
2012/0221502 A1 8/2012 Jerram et al.
2012/0231844 A1 9/2012 Coppinger
2012/0259763 A1 10/2012 Pessin
2012/0304273 A1 11/2012 Bailey et al.
2012/0310826 A1 12/2012 Chatterjee
2012/0323664 A1 12/2012 Klems
2013/0090750 A1 4/2013 Herrman et al.
2013/0151417 A1* 6/2013 Gupta .................. G06Q 20/382 705/65
2013/0268763 A1* 10/2013 Sweet ................. H04L 63/0428 713/176
2013/0290203 A1* 10/2013 Purves ................... G06Q 50/01 705/319
2013/0346302 A1* 12/2013 Purves ................. G06Q 20/102 705/40
2014/0052617 A1* 2/2014 Chawla .................. G06Q 20/12 705/39
2014/0172472 A1* 6/2014 Florimond ............. G06Q 10/02 705/5
2014/0282371 A1* 9/2014 Hirsch ...................... G06F 8/36 717/106
2015/0347989 A1* 12/2015 Kumar ................. G06Q 20/027 705/44
2016/0117780 A1* 4/2016 Semlani ............... G06Q 20/123 705/30
2016/0232515 A1* 8/2016 Jhas ....................... G06Q 30/02
2016/0328693 A1* 11/2016 Mao ................... G06O 20/0855
2017/0193475 A1* 7/2017 Mercille .............. G06Q 20/123
2017/0193490 A1* 7/2017 Mercille .............. G06Q 20/325

(56) References Cited

U.S. PATENT DOCUMENTS

| | | | | |
|---|---|---|---|---|
| 2017/0228711 | A1* | 8/2017 | Chawla | G06Q 20/12 |
| 2017/0278085 | A1* | 9/2017 | Anderson | G06Q 20/227 |

FOREIGN PATENT DOCUMENTS

| | | |
|---|---|---|
| KR | 10-0432430 | 5/2004 |
| KR | 06-0117177 | 11/2006 |
| KR | 07-0104087 | 10/2007 |
| WO | WO01/065502 | 9/2001 |
| WO | WO03023674 | 4/2004 |
| WO | WO10/148737 | 12/2010 |

OTHER PUBLICATIONS

David Breitkopf, "ACS To Take Over Mich. WC Distribution Program", American Banker, New York, NY: Jul. 20, 2006, vol. 171. Issue 138, p. 6.
Gopalan, NP & Selvan, B Siva. TCP/IP Illustrated. Prentice-Hall. 2008. pp. 101-102, 175-176 and 235.
International Preliminary Report on Patentability for PCT/US2010/033229.
International Search Report and Written Opinion for PCT/US11/57173 dated Mar. 15, 2012.
International Search Report and Written Opinion for PCT/US11/57179 dated Jan. 5, 2012.
International Search Report and Written Opinion for PCT/US11/57180 dated Mar. 15, 2012.
International Search Report and Written Opinion for PCT/US12/37597.
International Search Report and Written Opinion for PCT/US12/41437 dated Aug. 24, 2012.
International Search Report and Written Opinion for PCT/US12/55636 dated Nov. 30, 2012.
International Search Report and Written Opinion for PCT/US12/65738 dated Apr. 19, 2013.
International Search Report and Written Opinion for PCT/US2012/027043 dated Jul. 13, 2013.
International Search Report and Written Opinion for PCT/US2012/045601 dated Feb. 1, 2013.
International Search Report and Written Opinion for PCT/US2012/069557 dated Feb. 22, 2013.
International Search Report and Written Opinion for PCT/US2013/020411 dated May 21, 2013.
International Search Report and Written Opinion for PCT/US2013/024538, dated May 31, 2013.
International Search Report and Written Opinion for PCT/US2013/031084, dated Jun. 4, 2013.
International Search Report for PCT/IS12/47092 dated Nov. 26, 2012.
International Search Report for PCT/US09/54921 dated Oct. 21, 2009.
International Search Report for PCT/US11/39178 dated Sep. 16, 2011.
International Search Report for PCT/US11/39178 dated Sep. 2011.
International Search Report for PCT/US11/49393 dated Dec. 5 2011.
International Search Report for PCT/US11/57173 dated Mar. 15, 2012.
International Search Report for PCT/US11/65305 dated Apr. 16, 2012.
International Search Report for PCT/US12/21000 dated May 15, 2012.
International Search Report for PCT/US12/23856 dated Jun. 6, 2012.
International Search Report for PCT/US12/24772 dated Jul. 24, 2012.
International Search Report for PCT/US12/25530 dated Aug. 7, 2012.
International Search Report for PCT/US12/26205, dated May 29, 2012.
International Search Report for PCT/US12/27620 dated Aug. 10, 2012.
International Search Report for PCT/US12/39638 dated Sep. 24, 2012.
International Search Report for PCT/US12/45875 dated Nov. 16, 2012.
International Search Report for PCT/US12/56759 dated Feb. 25, 2013.
International Search Report for PCT/US12/57528 dated Dec. 17, 2012.
International Search Report for PCT/US12/57577 dated Nov. 29, 2012.
International Search Report for PCT/US12/66898 dated Feb. 11, 2013.
International Search Report for PCT/US2010/033229.
International Search Report for PCT/US2010/033547.
International Search Report for PCT/US2010/033861.
International Search Report for PCT/US2010/041860.
International Search Report for PCT/US2010/045445.
International Search Report for PCT/US2010/045500.
International Search Report for PCT/US2010/046833.
International Search Report for PCT/US2010/048344.
International Search Report for PCT/US2011/024941.
International Search Report for PCT/US2011/032093.
International Search Report for PCT/US2011/035268.
International Search Report for PCT/US2011/26734.
International Search Report for PCT/US2011/29790.
International Search Report for PCT/US2011/39178.
International Search Report for PCT/US2011/42062.
International Search Report for PCT/US2011/49393.
Shadrach, D.C. "A Weighted Metric Based Adaptive Algorithm for Web Server Load Balancing." 2009 Third International Symposium on Intelligenr Information Technology Application, http://ieeexplore.ieee.org/xpl/articleDetails.jsp?amumber=5369384, pp. 449-452.
Written Opinion for PCT/US12/27620 dated Aug. 10, 2012.

* cited by examiner

Example Social Wallet Integration

Example Data Flow: Social Wallet Widget Integration

Example Logic Flow: Widget Designer Building, e.g., BWD Component 300

Example Logic Flow: Social Widget Assembly and Population, e.g., PSW Component 400

Example Logic Flow: Social Widget Assembly and Population, e.g., PSW Component 400

Example Data Flow: Social Wallet Widget Checkout

Example Logic Flow: Store Application View Rendering, e.g., RSAV Component 600

Example User Interface: Overloaded Social Checkout Widget Creation and Integration Example Wallet Integration Opportunities in a Content Site Example E-Commerce and Content Integration with Wallet Example Social Media Integration Example Social Media Checkout Example Social Media Checkout Example Social Media Integration Example Social Media Checkout Example Web / Mobile Integration Example Mobile Checkout Example Mobile Integration Example Mobile Checkout Example Catalog Integration Example Catalog Checkout Example Augmented Retail Checkout Example Web Integration Example Web Checkout Example Widget Branding Options Example Widget Integration and Checkout (WIC) Component 1400

Figure 13A
13 00
NOVA
STARTS TONIGHT
THE FABRIC OF THE COSMOS
WITH BRIAN GREENE
PBS
WIRED
GADGET LAB
DELTA
INTRODUCING
FIRST CLASS ON
REGIONAL JETS.
PlugBug USB Charger Piggybacks On MagSafe Adapter
13 05
13 10

Figure 13B
STARTS TONIGHT
NOVA
THE FABRIC OF THE COSMOS
WIRED
GADGET LAB
PlugBug USB Ch
twelve south
13 15
Review and Continue
Shipping Address:
Change
13 15a
Purchase Summary
Show Details
PlugBug iPhone and iPad Charger
$35.00
13 15d
Tax
Shipping
Shipping Type:
Change
13 15b
Total: $44.04
Payment Information:
Change
13 15c
13 15e
Back
Pay
V.me by Visa

Example Data Flow: Dynamic Widget Generation 16 01

Figure 17 Example Logic Flow: Widget Generation (WG) Component 17 01

Example Data Flow: Dynamically Generated Widget Based Purchase 18 01

Example Logic Flow: Buy Widget Based Purchase (WBP) Component 19 01

Example Logic Flow: Buy Widget Based Purchase (WBP) Component 19.01

Example Logic Flow: Buy Widget Based Purchase (WBP) Component 19 01

Example CWI Test Tool 20 01

Example Widget Customization via Test Tool

Example Widget Customization via Test Tool

Example User Interface: Widget Code Generator with Integrated Testing

Customize Widget Skin

Background Color:
#eCCCC  21 13

Your logo file:
http://www.site.com/logo  21 14

Widget Activation Message:
Checkout with v.me  21 15

Widget Badges:  21 16
☒ Privacy Enhanced
☐ Pay by Check
☐ Split bill with friend Run-time Widget Options:
☐ Calculate Shipping / Handling & Tax  21 16a
☐ Quantity (minimum [1 ▼], maximum [None ▼])  21 16b
☐ Load shipping information from consumer's v.me account
☒ Load shipping information from any [third-party (seller's) ▼] server  21 16c Preview Widget:  21 16d
[Vme button]   ☑ Privacy Plus
Address:
[Home Address ▼]
[Home Address ▼]
Quantity: [2]
Total: $9.95   21 16e Other Address:
Address:
City:
State / ZIP: [CA ▼]

[Save Widget for Later] [Bulk Generate Widgets]

21 12

Example User Interface: Widget Skin Customization

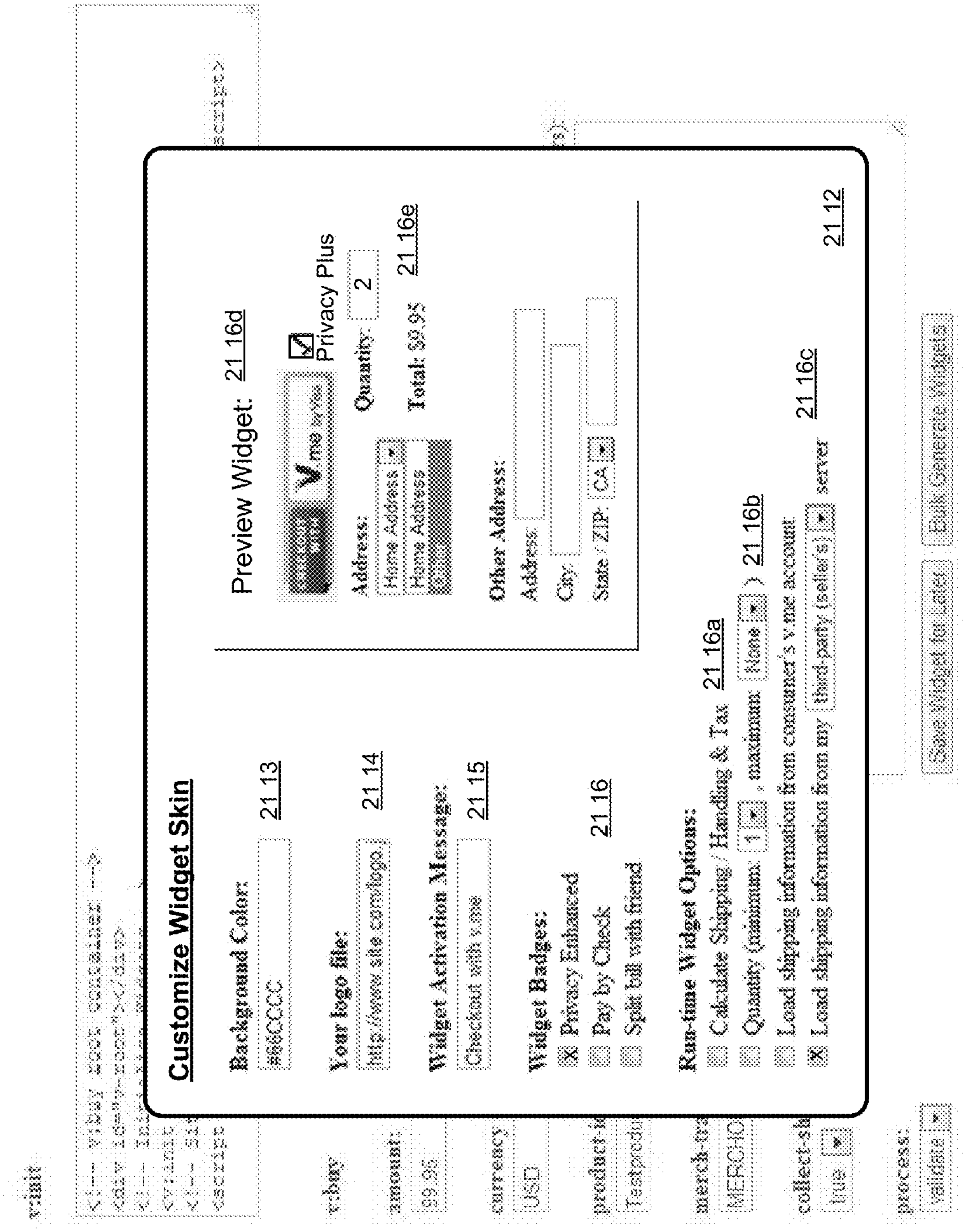

Figure 21B

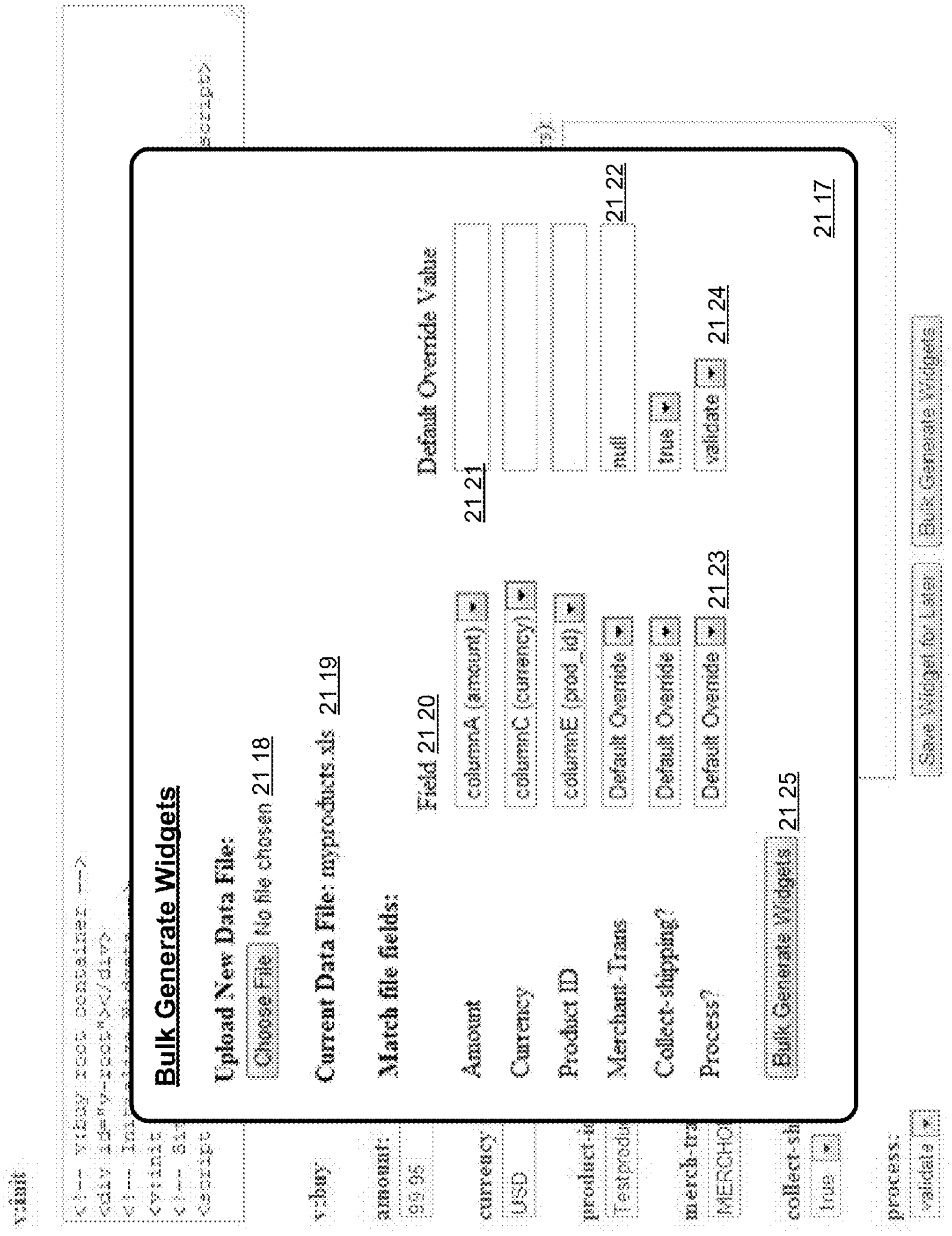

Figure 21C

Example User Interface: Bulk Widget Generation

Figure 21C — Example User Interface: Bulk Widget Generation

Bulk Generate Widgets

Upload New Data File:
Choose File  No file chosen  21.18

Current Data File: myproducts.xls  21.19

Match file fields:

| Field 21.20 | |
|---|---|
| Amount | columnA (amount) ▼ |
| Currency | columnC (currency) ▼ |
| Product ID | columnE (prod_id) ▼ |
| Merchant Trans | Default Override ▼ |
| Collect shipping? | Default Override ▼ |
| Process? | Default Override ▼  21.23 |

Default Override Value  
21.21

21.22 null  
true ▼  validate ▼  21.24

Bulk Generate Widgets  21.25

Save Widget for Later    Bulk Generate Widgets 21.17

```
<!-- v:buy root container -->
<div is=v-buy></div>
<!-- In
 <
 <
</script>

v:init

v:buy
amount:
  99.95
currency:
  USD
product-id:
  Testprod
merch-tr
  MERCHO
collect-sh
process:
  validate ▼
```

Example User Interface: Widget Code Generator with Dynamic Content Retrieval

Example Logic Flow: Widget Code Generator with Dynamic Content Retrieval (e.g., "DCR" Component 2200)

Example Logic Flow: Widget Code Generator with Dynamic Content Retrieval (e.g., "DCR" Component 2200)

SOCIAL CHECKOUT WIDGET GENERATION AND INTEGRATION APPARATUSES, METHODS AND SYSTEMS

PRIORITY CLAIM

This application is a continuation-in-part of, and claims priority under 35 U.S.C. § 120 to: U.S. non-provisional patent application Ser. No. 13/714,090 filed Dec. 13, 2012, entitled "Dynamic Widget Generator Apparatuses, Methods and Systems".

This application claims priority under 35 U.S.C. § 365, 371 to PCT application no. PCT/US2012/069557 filed Dec. 13, 2012, entitled "Dynamic Widget Generator Apparatuses, Methods and Systems".

This application is a non-provisional of and claims priority under 35 U.S.C. § 119 to: U.S. provisional application Ser. No. 61/639,837 filed Apr. 27, 2012, entitled "Checkout Widget Integration Apparatuses, Methods and Systems"; and U.S. provisional patent application Ser. No. 61/639,843 filed Apr. 27, 2012, entitled "Dynamic Widget Generator Apparatuses, Methods and Systems".

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The entire contents of the aforementioned application(s) are expressly incorporated by reference herein.

FIELD

The present innovations generally address payment widget creation, configuration and management, and more particularly, include SOCIAL CHECKOUT WIDGET GENERATION AND INTEGRATION APPARATUSES, METHODS AND SYSTEMS.

BACKGROUND

Online sellers accept digital payments to conduct transactions with buyers. Payment management platforms such as CyberSource and Authorize.Net are available to e-commerce merchants for payment processing.

BRIEF DESCRIPTION OF THE DRAWINGS

The accompanying appendices and/or drawings illustrate various non-limiting, example, innovative aspects in accordance with the present descriptions:

FIGS. 21*a-d* show user interfaces illustrating example widget code generator with integrated testing, in some embodiments of the CWI;

Figure 1:
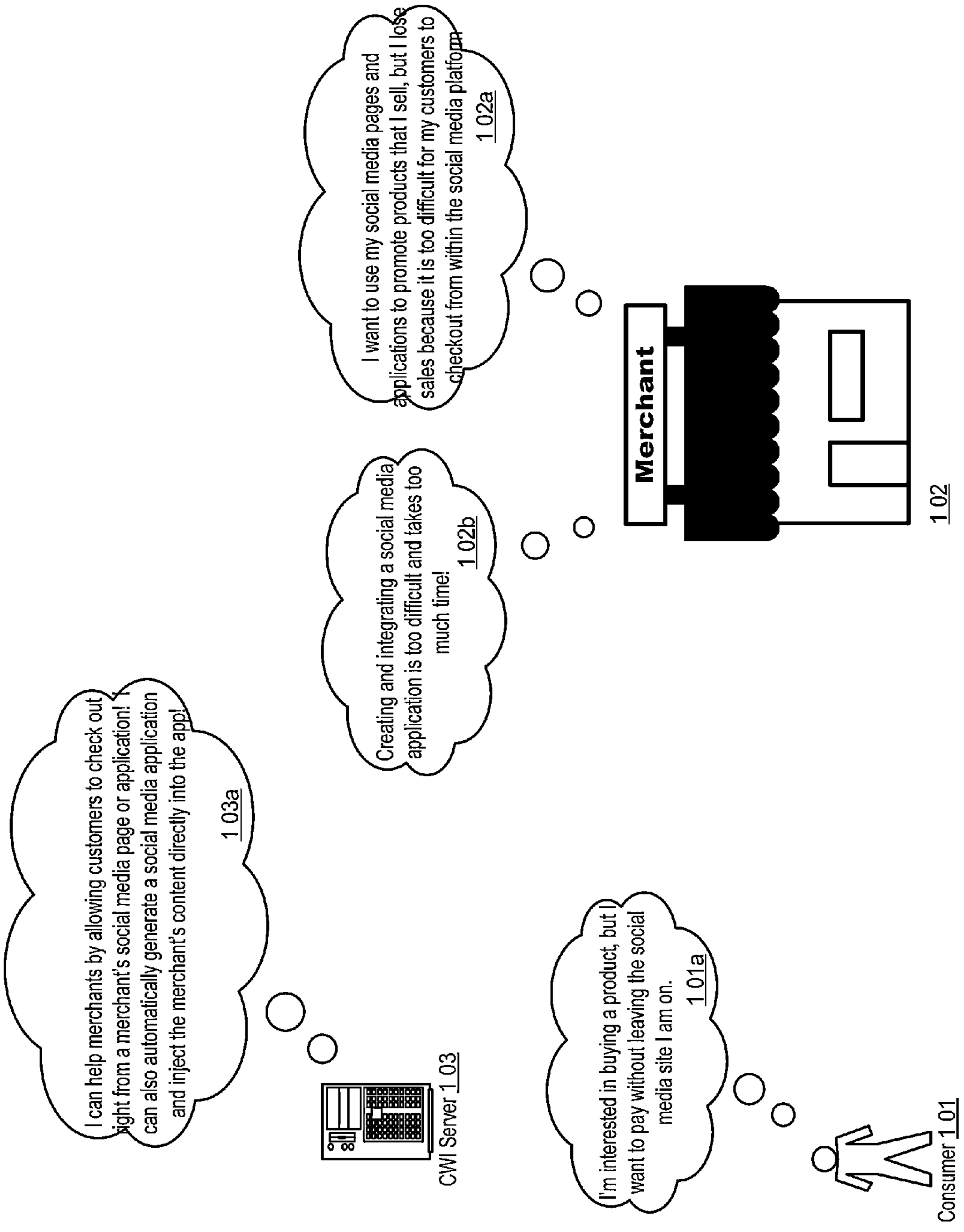
FIG. 1 shows a block diagram illustrating an example social wallet integration, in some embodiments of the CWI.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

CWI

The SOCIAL CHECKOUT WIDGET GENERATION AND INTEGRATION APPARATUSES, METHODS AND SYSTEMS (hereinafter "CWI" user interface) platform facilitates parties such as sellers and/or merchants to add payment acceptance to their applications or websites with a simple integration. In some embodiments, a social payment integration is facilitated that may allow the creation and/or customization of social network applications by CWI components. In one embodiment, the CWI platform allows sellers (or developers working for sellers) to customize payment acceptance using dynamically generated buy buttons or widgets that capture payments from customers.

Various aspects of the CWI facilitates a multi-channel and multi-party merchandising and checkout from content publishing platforms. Examples of publishing platforms include online publishing systems, web and mobile publishing platforms, and/or the like that can support one or more data sources and user interfaces. In one embodiment, the CWI provides content publishers an avenue for monetizing content by offering merchandising and commerce marketplaces to their audiences. In another embodiment, the CWI supports content publishing platforms by providing a checkout solution that enables management of multiple content publishers and participating merchants. In a further embodiment, the CWI supports merchants by providing them a new distribution channel for their storefronts closer to potential customers within the applications or websites where those audiences spend their time online. The CWI may further support merchants by driving customers to their own websites or mobile applications by enabling merchants to embed or inject their storefront within destination applications or sites that their potential customers already use. In yet another embodiment, the CWI may provide digital wallet providers new channels for acquiring consumer enrollments, reselling, merchant acceptance and driving new sources of volume.

In some embodiments, aspects of the CWI provides merchants with a consolidated payment processing integration for all of their transactions and facilitate third parties such as acquirers, processors, payment service vendors, and/or the like to integrate to the transaction processing application programming interface (API) such as V.me transaction processing API to provide reporting and analytics, including federated and/or integrated access to a merchant control panel (e.g., V.me merchant control panel). For example, depending on business and/or technology model, merchants and/or their provider of shopping cart/hosted order page solutions may integrate to a payment widget or checkout widget (e.g., V.me payment widget) using one or more integration methods. In some implementations, follow-on transactions, which may include authorization, capture, reversal, refund, and/or the like, may be sent through the merchant's existing payment processing connection, thereby eliminating the need to support two separate payment APIs and ensure a consolidated view of their transactions.

In some embodiments, aspects of the CWI provides merchants facilities to distribute checkout facilities anywhere and everywhere on the web beyond their primary website, thereby facilitating "instant checkout." For example, merchants, using the facilities of the CWI, can add instant checkout to their FACEBOOK landing page, advertising banners, search results, web and mobile applications, and/or the like. The instant checkout, in some implementations, allows merchants to widgetize and distribute all or part of their e-commerce website to reach potential customers. Furthermore, the instant checkout may facilitate merchants to transform all of their digital and marketing channels into sales channels by providing low friction or instant on-the-spot checkout.

In some embodiments, aspects of the CWI facilitates publishers, content site owners, destination site owners, mobile/web application developers, and/or the like to better monetize their traffic and increase their value proposition to their publishers and sponsors. In one implementation, the facilities of the CWI allow acquisition of distribution and developer partners and merchant by establishing a new channel where the merchants may run a program (e.g., V.me program) within an online, mobile or social campaign without disrupting their primary ecommerce website.

In various embodiments, the CWI may be platform agnostic and may fit in well with mobile, tablet and various other device commerce.

FIG. 1 shows a block diagram illustrating an example social wallet integration, in some embodiments of the CWI. In one embodiment, a consumer 101 may be interested in buying a product without leaving a social media site that they are currently on, e.g., 101*a*. In one embodiment, a merchant 102 may desire to use their social media pages and applications to promote products that they sell but find that customers are lost because of the difficulty in facilitating checkout from a social media platform, e.g., 102*a*. In still other embodiments, a CWI server 103 may provide a capability to merchants, consumers and/or the like that allows consumers to checkout directly from a social media page or application. In one embodiment, the CWI may enable a merchant to create a social media application and inject merchant selected content into the application, e.g., 103*a*.

Figure 2:
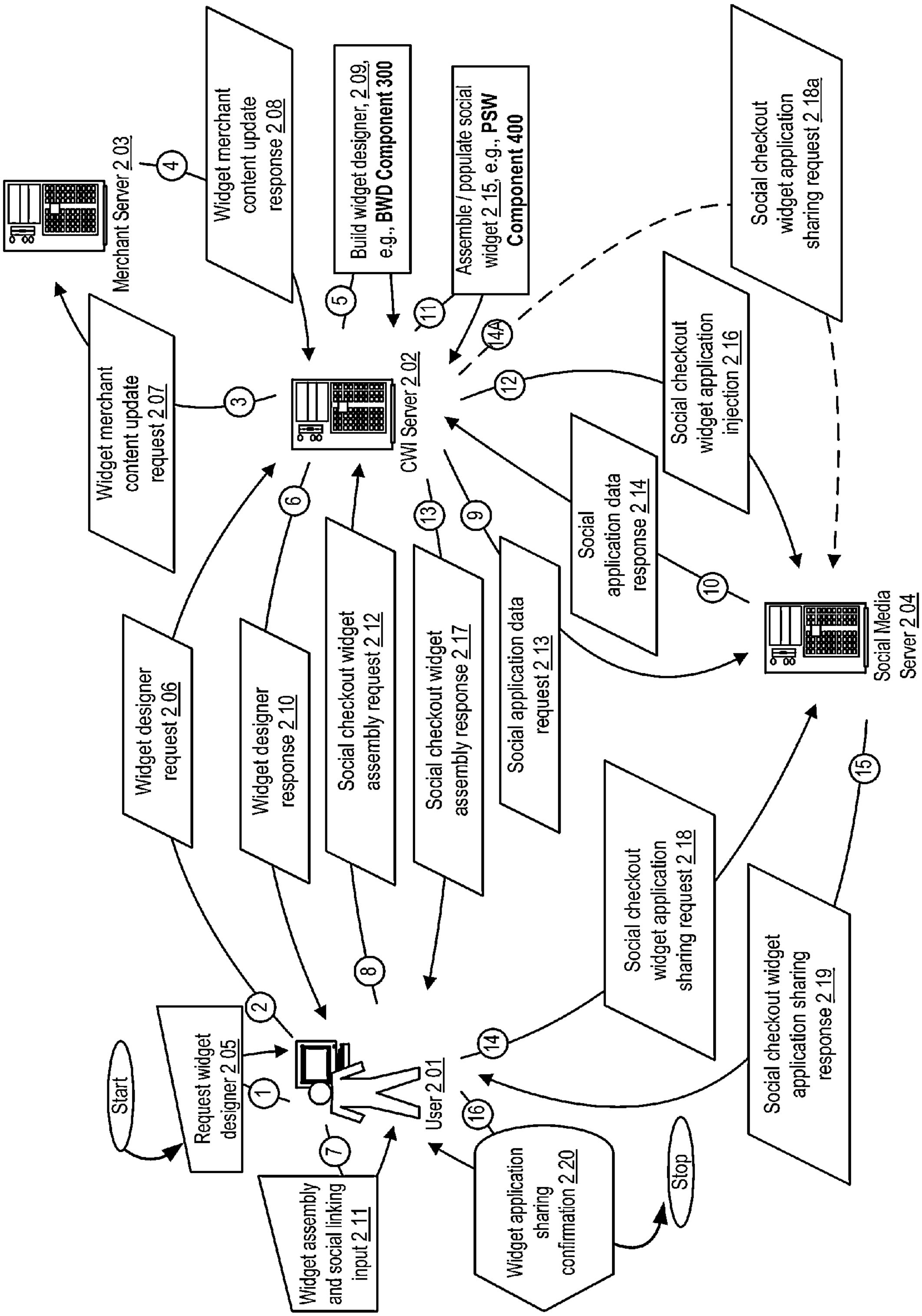
FIG. 2 shows a data flow illustrating an example social wallet widget integration, in some embodiments of the CWI.

FIG. 2 shows a data flow illustrating an example social wallet widget integration, in some embodiments of the CWI. In one embodiment, user 201 may use a client to request a widget designer interface, e.g., 205, configured with capabilities to allow the user to customize a widget, generate a social media application, inject an existing social media application with content, provide widget checkout capabilities from within a social media site or within a social media application, share the user's injected content or social media application on the user's social media feed for viewing by other users who “follow” the user, and/or the like. In one embodiment, the client may generate a widget designer request 206. A widget designer request may be a request to render an interface that allows social media and/or widget customization. An example widget designer request 206, substantially in the form of an HTTP(S) POST message including XML-formatted data, is provided below:

```
POST /widget_designer_request.php HTTP/1.1
Host: www.cwiserver.com
Content-Type: Application/XML
Content-Length: 667
<?XML version = "1.0" encoding = "UTF-8"?>
<widget_designer_request>
  <timestamp>2020-12-12 15:22:43</timestamp>
  <auth>
    <user_id>7654353</user_id>
    <password>secretpass</password>
    <device_id type="Mac">E76565</device_id>
    <user_info>
      <name>John Consumer</name>
      <email>john.consumer@foo.com</email>
      <phone>645-123-4567</phone>
    </user_info>
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <designer val="do_render />
  <merchant_to_query method="web_site_scrape">
    <merchant_id val="5454" />
    <url val="http://www.merchant.com/" />
    <scrape_template id="87564" />
    <item_div val="item" />
    <item_price_div val="sell_price" />
  </merchant_to_query>
  <social_media_credentials>
    <social_media type="facebook" post="auto">
      <user val="myfbusername" />
      <pass val="myfbpass" />
    </social_media>
    <social_media type="twitter">
      <user val="mytwitterusername" />
      <pass val="mytwitterpass" />
    </social_media>
    <social_media>
      ...
    </social_media>
  </social_media_credentials>
</widget_designer_request>
```

In one embodiment, the CWI server 202 may require updated content from the merchant before rendering a widget designer response. For example, the CWI may have pricing or item information that is stale and requires refreshing. In one embodiment, the CWI server may call a merchant provided Application Programming Interface (e.g., a RESTful service, via SOAP, and/or the like) in order to update item information, pricing information, current inventory information, item descriptions, item prices, and/or the like, e.g., 207. In one embodiment, the merchant server 203 may retrieve current pricing information in response to the update request, such as by querying an item and/or pricing database or invoking a pricing procedure stored in memory, and provide the updated information to the CWI server, e.g., a widget merchant content update response 208. An example widget merchant content update response 208, substantially in the form of an HTTP(S) POST message including XML-formatted data, is provided below:

```
POST /widget_merchant_content_update_response.php HTTP/1.1
Host: www.cwiserver.com
Content-Type: Application/XML
Content-Length: 667
<?XML version = "1.0" encoding = "UTF-8"?>
<widget_merchant_content_update_response>
<timestamp>2020-12-12 15:24:43</timestamp>
  <auth>
    <user_id>7654353</user_id>
    <password>secretpass</password>
    <device_id type="Mac">E76565</device_id>
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <store value="online">
    <item sku="8768675" type="physical">
      <inventory quantity="53" packing="1" />
      <current_price value="9.54" />
      <description>An item description</description>
      <shipping_lag_time value="2-days" />
      <backordered value="false" />
    </item>
    <item>
      ...
    </item>
  </store>
  <store value="physical_store">
    ...
  </store>
</widget_merchant_content_update_response>
```

In another embodiment, the CWI server may semi-autonomously obtain the merchant pricing information without a dedicated merchant item/pricing API interface. In so doing, the CWI may for example query a publically available merchant web page (e.g., merchant ecommerce pages) and extract information such as items available, item inventory levels, pricing, description, user reviews, and/or the like. For example, the CWI server may employ a web scraping capability, such as by using Webharvest, Scrappy, and/or the like. Example Scrappy program code suitable for retrieving information from a merchant's web site, substantially in the form of Python executable commands is:

```
#!/usr/bin/env python
from scrapy.spider import BaseSpider
from scrapy.http import Request
from scrapy.http import FormRequest
from scrapy.selector import HtmlXPathSelector
from scrapy import log
class MerchantSpider(Spider):
    name = "merch_spider"
    allowed_domains = ["www.merchant.com"]
    start_urls = [
        "http://www.merchant.com/store/start"
    ]
    def parse(self, response):
        pass
```

In one embodiment, the CWI server may build and/or render the widget designer. For example, the CWI may utilize a widget template and substitute values such as merchant item values retrieved above into the template. Further detail with regard to building the widget designer may be found with respect to FIG. 3, e.g., a BWD Component 300.

Upon building or rendering the widget designer, the CWI server may return the designer to the user device so that the user may interact with the designer and customize widgets and/or applications, e.g., a widget designer response 210. A widget designer response may contain renderable commands substantially in the form of HTML statements, client-executable commands (such as, for example, PHP interpreter commands), or compiled code suitable for execution on a client device (such as Java bytecode capable of rendering a widget designer).

Figure 7:
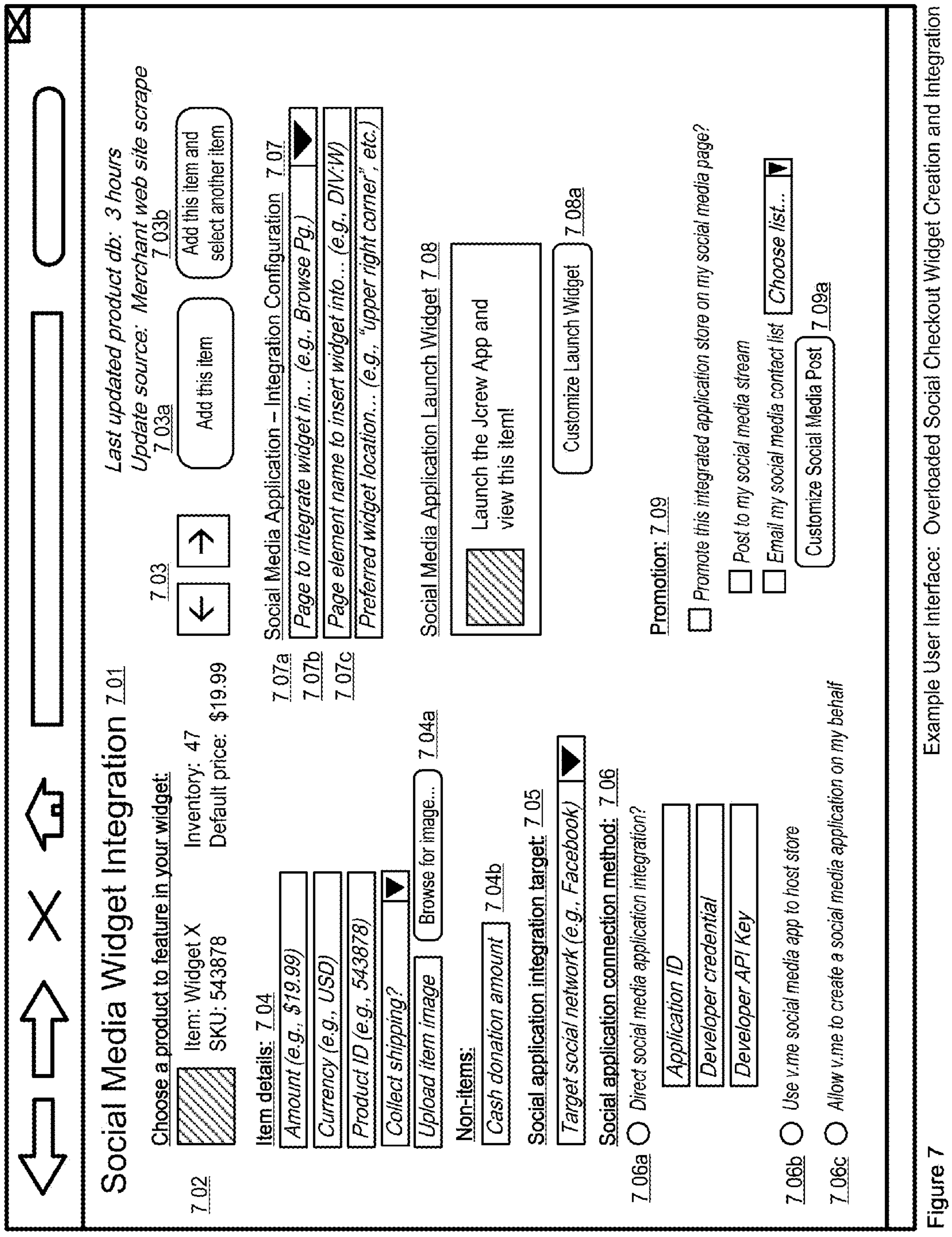
FIG. 7 shows an example user interface illustrating overloaded social checkout widget creation and integration, in some embodiments of the CWI.

In response to the widget designer response, the user's client device may render a widget designer interface, such as that described with respect to FIG. 7. The user may thereafter use the interface in order to customize a widget assembly request and/or a social media linking request, e.g., a widget assembly and social linking input 211. In response to the user's input, the client device may transmit a message to the CWI server requesting that the CWI create a checkout widget, integrate a checkout widget into a user social application, create a new social application on behalf of the user, share information on the user's social media feed, and/or the like, e.g., a social checkout widget assembly request 212. An example social checkout widget assembly request 212, substantially in the form of an HTTP(S) POST message including XML-formatted data, is provided below:

```
POST /social_checkout_widget_assembly_request.php HTTP/1.1
Host: www.cwiserver.com
Content-Type: Application/XML
Content-Length: 667
<?XML version = "1.0" encoding = "UTF-8"?>
<social_checkout_widget_assembly_request>
  <timestamp>2020-12-12 15:26:43</timestamp>
  <auth>
    <user_id>7654353</user_id>
    <password>secretpass</password>
    <device_id type="Mac">E76565</device_id>
    <user_info>
      <name>John Consumer</name>
      <email>john.consumer@foo.com</email>
      <phone>645-123-4567</phone>
    </user_info>
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <widget>
    <widget_type val="inline_html" />
    <widget_target val="social_media_application_integration" />
    <widget_template id="8767" />
    <widget_integration val="facebook_application">
      <social_page_to_integrate_widget
          value="item_display_page"
          populate_template="default_display"
          template_params="item_id:E87753">
      <insert_widget page_location_type="div"
                Page_location="widget_insert_div" />
      <social_application_access_credentials>
        <social_user_id val="667998867" />
        <master_account user="my@email.com" pass="secretpass2">
        <social_application method="key">
          <key>
            TRDTRSERDEFTRED
            CFGRTD6565434YFGT
            KBYTJE3r434WRRDTF
          </key>
        </social_application>
      </social_application_access_credentials>
    </widget_integration>
    <widget_integration>
      ...
    </widget_integration>
    <items_to_feature>
      <item>
        <merchant id="5454" />
        <item id="E87753" />
        <selling_price val="19.99" />
```

-continued

```
        <feature_on_widget type="photo">
          <item_photo id="55" crop="25,65" />
        </feature_on_widget>
      </item>
      <item>
       ...
      </item>
    </items_to_feature>
  </widget>
  <widget>
    ...
  </widget>
</social_checkout_widget_assembly_request>
```

In another embodiment, an example social checkout widget assembly request 212, substantially in the form of an HTTP(S) POST message including XML-formatted data, is provided below:

```
POST /social_checkout_widget_assembly_request.php HTTP/1.1
Host: www.cwiserver.com
Content-Type: Application/XML
Content-Length: 667
<?XML version = "1.0" encoding = "UTF-8"?>
<social_checkout_widget_assembly_request>
  <timestamp>2020-12-12 15:26:43</timestamp>
  <auth>
    <user_id>7654353</user_id>
    <password>secretpass</password>
    <device_id type="Mac">E76565</device_id>
    <user_info>
      <name>John Consumer</name>
      <email>john.consumer@foo.com</email>
      <phone>645-123-4567</phone>
    </user_info>
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <widget>
    <widget_type val="inline_html" />
    <widget_target val="social_media_application_integration" />
    <widget_template id="8767" />
    <widget_integration val="twitter_application">
      <create_application val="true" />
      <sub_application_of val="null" />
      <application_creation_template val="twitter_app4" />
      <developer_api>
        <api_key>T7657568TRDRD</api_key>
        <app_creation_key>876434567</app_creation_key>
      </developer_api>
    </widget_integration>
    <widget_integration>
      ...
    </widget_integration>
    <items_to_feature>
      <item>
        <merchant id="5454" />
        <item id="E87753" />
        <selling_price val="19.99" />
        <feature_on_widget type="photo">
          <item_photo id="55" crop="25,65" />
        </feature_on_widget>
      </items_to_feature>
    </item>
    <item>
      ...
    </item>
  </widget>
  <widget>
    ...
  </widget>
</social_checkout_widget_assembly_request>
```

In one embodiment, if the CWI server determines that the social checkout widget request contains a request to create or inject content into a user's social media application, the CWI may execute a request to a social media server 204 in order to obtain information about the user's current social media applications, e.g., a social application data request 213. In other embodiments, the CWI may host a user's social media application locally in which case a local social media application database may be queried. An example social application data request 213, substantially in the form of an HTTP(S) POST message including XML-formatted data, is provided below:

```
POST /social_application_data_request.php HTTP/1.1
Host: www.socialmediaserver.com
Content-Type: Application/XML
Content-Length: 667
<?XML version = "1.0" encoding = "UTF-8"?>
<social_application_data_request>
  <timestamp>2020-12-12 15:28:43</timestamp>
  <auth type="server_to_server">
    <key>
      TRDTRBKJHujJHGE&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <request type="third_party" />
  <return type="all_active_user_social_applications" />
  <social_application_access_credentials>
    <social_user_id val="667998867" />
    <master_account user="my@email.com" pass="secretpass2">
    <social_application method="key">
      <key>
        TRDTRSERDEFTRED
        CFGRTD6565434YFGT
        KBYTJE3r434WRRDTF
      </key>
    </social_application>
  </social_application_access_credentials>
</social_application_data_request>
```

In one embodiment, social media server 204 may receive the social application data request and query a social application database for applications associated with the social application data request parameters. In other embodiments, the social media server may respond with a package containing a template for creating new social media applications on the platform. For example, the social media server 204 may provide a WSDL file containing the available function calls available to the CWI server (e.g., to be used via a web services call and/or the like) in order to create a social media application. In one embodiment, the CWI server may provide a template itself that contains the application parameters is seeks to map (for example, a checkout container with integrated checkout, a product display page, and/or the like) and the social media server may respond with a mapping of the application parameters to function calls available from the social media server. In so doing, the CWI server may interface with previously unknown social media servers while minimizing the amount of input required from a CWI administrator. An example social application data response 214, substantially in the form of an HTTP(S) POST message including XML-formatted data, is provided below:

```
POST /social_application_data_response.php HTTP/1.1
Host: www.CWIserver.com
Content-Type: Application/XML
Content-Length: 667
<?XML version = "1.0" encoding = "UTF-8"?>
```

-continued

```
<social_application_data_response>
  <timestamp>2020-12-12 15:28:43</timestamp>
  <auth type="server_to_server">
    <key>
      TRDTRBKJHujJHGE&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <applications_registered_for>
    <social_user_id val="667998867" />
  </applications_registered_for>
  <applications>
    <app id="765765">
      <date_created value="2020-01-01" />
      <automatically_created val="false" />
      <created_by val="account_owner" />
      <app_profile>
        <app_capabilities_and_restrictions>
          <restriction type="age_restriction" value="13+" />
          <restriction type="purchase_limits" value="<$100USD" />
          <capability type="revenue_split_on_purchases">
            <split entity="social_network" value="5%" />
            <split entity="pay_network" value="5%" />
            <split entity="merchant" value="90%" />
          </capability>
        </app_capabilities_and_restrictions>
        <page id="1">
          <title val="App Home Page" />
          <is_template_based val="false" />
          <content>
              This is the home page of our merchant
              social media application!
          </content>
        </page>
        <page id="2">
          <title val="App Home Page" />
          <is_template_based val="true" />
          <template id="65445" />
          <widget_insertion_capable value="true" />
          <widget_insertion_point value="widget_div" />
        </page>
        <page>
          ...
        </page>
      </app_profile>
    </app>
    <app>
      ...
    </app>
  </applications>
</social_application_data_response>
```

In one embodiment, the CWI server may receive the social application data response and create a social application, inject a widget (e.g., a checkout widget, an item widget, and/or the like) into an existing social application, prepare a hosted social application (e.g., an application that is hosted on the CWI or a third-party server), share a social application on a user's social media feed, and/or the like. Further detail with respect to the assembly and population of a socially enabled widget and/or social application may be found with respect to FIG. 4, e.g., a PSW Component 400.

In one embodiment, the CWI server may inject a social checkout capability into a social application, e.g., a social checkout widget application injection 216. An example social checkout widget application injection 216, substantially in the form of an HTTP(S) POST message including XML-formatted data, is provided below:

```
POST /social_checkout_widget_application_injection.php HTTP/1.1
Host: www.socialmediaserver.com
Content-Type: Application/XML
```

-continued

```
Content-Length: 667
<?XML version = "1.0" encoding = "UTF-8"?>
<social_checkout_widget_application_injection>
  <timestamp>2020-12-12 15:26:43</timestamp>
  <auth type="server_to_server">
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <application_injection>
    <application>
      <api_key>T7657568TRDRD</api_key>
      <app_creation_key>876434567</app_creation_key>
      <application_pages>
        <page id="1">
          <!-- application pages can be injected -->
          This is the application view content.  The view
          may contain executable code.
        </page>
        <page id="2">
          <page_element
              preferred_location="top_left_above_browser_fold"
              content_to_inject="widget_injection:widget_div">
            <div id="widget_div" />
          </page_element>
          <page_element preferred_location="default">
            Page #2 content...
          </page_element>
        </page>
        <page id="n">
          ...
        </page>
      </application_pages>
      <widget_injection page="2" location="div:widget_div">
        <!-- v:buy root container -->
        <div id="v-root"></div>
        <!-- Initialize Widgets -->
        <v:init apikey="L3KQEBHEJM4HOKCE2XO5"></v:init>
        <!-- Site content and v:buy buttons (see below) -->
        <script type="text/javascript"
              src="https://sandbox-static.
              v.me//js/1/v-widgets.js"></script>
        <v:buy
          apikey = "L3AWQDLKBHYCE2XO5"
          token = "4a752d0bb67f241a2a567"
          custom_widget_skin = "FDSRE"
          amount = "99.95"
          currency = "USD"
          product-id = "Testproduct1"
          merch-trans = "MERCHORDER1234"
          collect-shipping = "true"
          process = "validate">
        </v:buy>
      </widget_injection>
    </application>
</social_checkout_widget_application_injection>
```

In one embodiment, the CWI may then confirm the creation of the social media application, transmit a checkout widget to the user, transmit an interface that allows the user to share details about their widget or application on their social media feed, and/or the like, e.g., a social checkout widget assembly response 217. In one embodiment, the CWI server will facilitate the rendering of an interface on the user's device that enables the user to seamlessly post the update to the social media feed. An example social checkout widget assembly response 217, substantially in the form of an HTTP(S) POST message including XML-formatted data, is provided below:

```
POST /social_checkout_widget_assembly_response.php HTTP/1.1
Host: www.userdevice.com
Content-Type: Application/XML
Content-Length: 667
<?XML version = "1.0" encoding = "UTF-8"?>
<social_checkout_widget_assembly_response>
  <timestamp>2020-12-12 15:26:43</timestamp>
  <auth type="server_to_user_device">
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <response>
    <application_successfully_created val="true" />
    <application_details>
      <application_id val="8765764" />
      <application_title val="Merchant Social App" />
      <application_access_credentials>
        <auth type="cert">
            YTFTRDREDRE
            SR$ESERSEW
            IULKYHGUKTFRD
        </auth>
      </application_access_credentials>
    </application_details>
    <share_request>
      <social_target val="facebook" />
      <share_url val="https://facebook.com/share/api" />
      <content_to_share>
        <text>
            I just added an item to my Facebook store!
            Click here to view it now
        </text>
        <image type="application_preview">
          <source val="www.cwi.com/img/HJFGTR" />
        </image>
      </content_to_share>
    </share_request>
</social_checkout_widget_assembly_response>
```

In one embodiment, the user may then indicate that they wish to share the provided content on their social media site feed, e.g., a social checkout widget application sharing request 218. In some embodiments, the user may share information about the social application, the widget integrated into a social application, and/or the like. In other embodiments, the widget may be shared directly on the user's social media feed, allowing viewers to see the widget's content and, in some examples, checkout using the widget controls. An example social checkout widget application sharing request 218, substantially in the form of an HTTP(S) POST message including XML-formatted data, is provided below:

```
POST /social_checkout_widget_app_sharing_request.php HTTP/1.1
Host: www.socialmediaserver.com
Content-Type: Application/XML
Content-Length: 667
<?XML version = "1.0" encoding = "UTF-8"?>
<social_checkout_widget_app_sharing_request>
  <timestamp>2020-12-12 15:26:43</timestamp>
  <auth type="user_device_to_server">
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <api  type="share_on_my_wall_api">
  <api  key="E8767643456"/>
  <user_id val="7657654"/>
  <post>
    <text>
      I just added an item to my Facebook store!
```

-continued

Click here to view it now
</text>
<image type="application_preview">
<source val="www.cwi.com/img/HJFGTR"/>
</image>
</post>
</social_checkout_widget_app_sharing_request>

In one embodiment, the social media server 204 may confirm that the social media sharing request has been process (e.g., the content has been shared on the user's social media feed), e.g., a social checkout widget application sharing response 219 and the user device may render a confirmation noting the successful sharing event, e.g., a widget application sharing confirmation 220. In other embodiments, the CWI server may itself transmit the content to be posted on the user's social media feed such as by using stored or provided user social media access credentials and/or the like, e.g., 218*a*.

Figure 3:
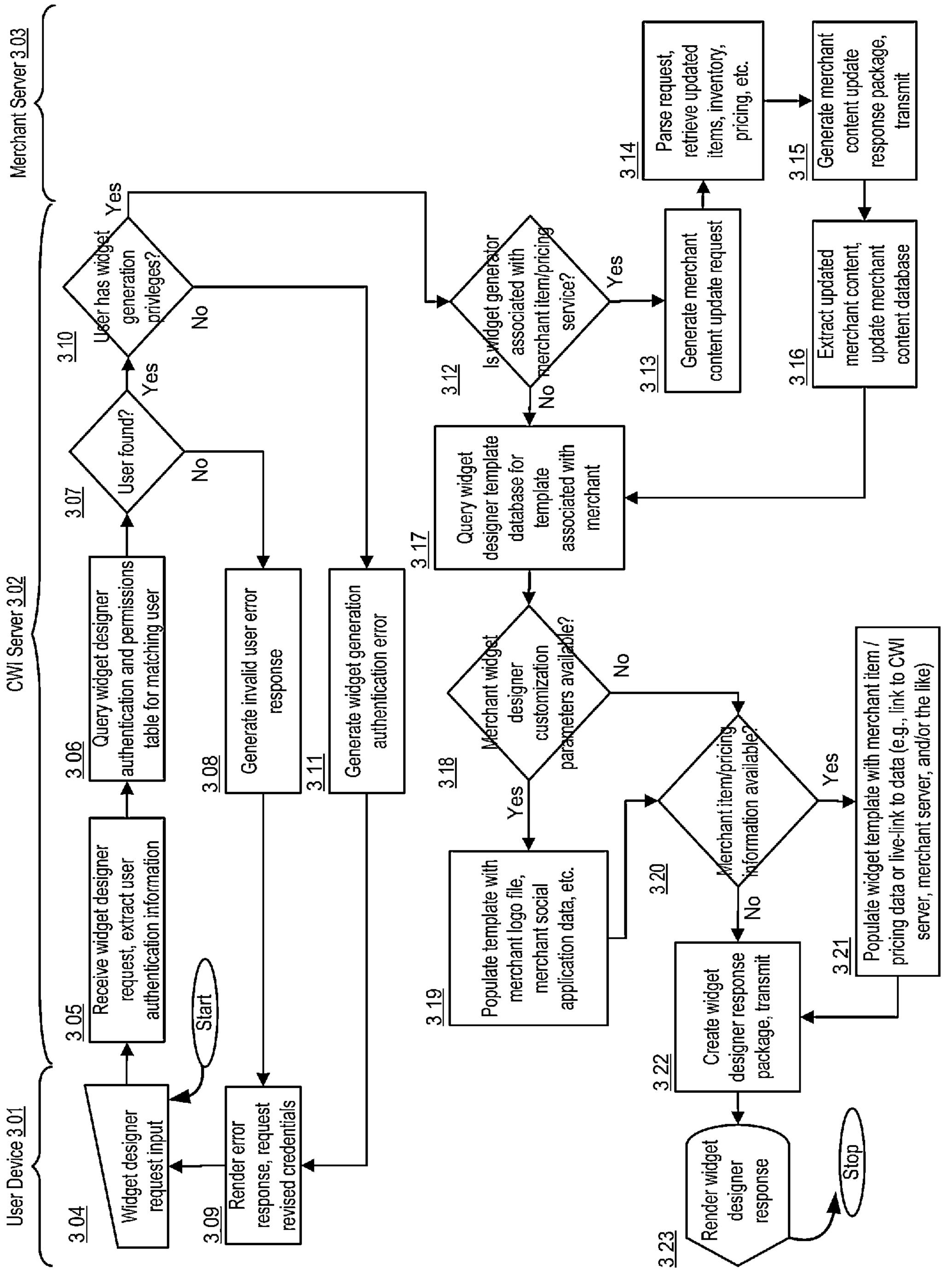
FIG. 3 shows a logic flow illustrating an example widget designer building component, e.g., a BWD Component 300, in some embodiments of the CWI.

FIG. 3 shows a logic flow illustrating an example widget designer building component, e.g., a BWD Component 300, in some embodiments of the CWI. In one embodiment, user device 301 may transmit a widget designer request input, e.g., 304, to a CWI server 302. The CWI server may receive the widget designer request and extract user authentication information, e.g., 305. Authentication information may be in the form of a clear text username/password, a hashed username/password, a cryptographic key, and/or the like. In one embodiment, the CWI server may query a widget designer authentication and permissions table for authorized widget designer users, e.g., 306. If the user is not found, e.g., 307, the CWI server may generate an invalid user error response and transmit the error response to the user device 301. The user device may render the error response and request revised user credentials, e.g., 309.

In one embodiment, if the user is found by the CWI server, the CWI server may determine if the user has widget generation privileges, e.g., 310. For example, users may be permitted by the CWI to generate widgets on behalf of any user or merchant, only a subset of users or merchants, or only on behalf of themselves. If the user does not have the appropriate widget generation privileges (or, after proceeding through any of the component logic, no longer has the required permissions), the CWI server may generate a widget generation authentication error, e.g., 311, which may cause the user device to prompt the user for updated credentials. In one embodiment, the CWI server may determine if the currently active widget generator session is associated with any third party pricing and/or item information services, e.g., 312. A single widget designer session (e.g., a user session) may be associated with one or more item pricing or information services. An item pricing or information service may be a service (e.g., a RESTful web service, a SOAP service, and/or the like) provided by a third party server that enables the CWI server to dynamically update its item and pricing database. In other embodiments, the updating may be in the form of a web crawling of a given web site (such as a merchant's ecommerce web site) and not require a separate item pricing or information service for updating. In still other embodiments, when the user or a merchant does not have goods or services to purchase, the CWI may provide a template item such that the user may populate the template item with, for example, a request for a donation or tip. In other embodiments, if the a user wishes to list items for sale but does not have a web site or online store, the CWI may provide a capability such that the user can upload item image(s) and input item details such as description, inventory, pricing, and/or the like into the CWI and the CWI may therefore act as a merchant server. In one embodiment, the CWI server may generate a merchant content update request, e.g., 313, and transmit the request to merchant server 303. The merchant server may query and parse the request, retrieve updated item information (such as descriptions, inventory stock levels, store locations stocking the item, warehouse locations that can ship the items, backorder status for an item, next expected shipment receive date, and/or the like), e.g., 314. In one embodiment, the merchant server may generate an update response package, e.g., 315, and transmit the package to the CWI server. The CWI server may extract the updated merchant content and update the a local or remote merchant content database, e.g., 316.

In one embodiment, the CWI server may query a widget designer template database for templates that are associated with a given merchant, e.g., 317. In other embodiments, the templates may be associated with a plurality of merchants, with a user, with an item type, and/or the like. If merchant widget designer customization parameters are available, e.g., 318, the template may be populated with a merchant logo file, merchant social application data (e.g., social media credentials, applications running on a social media platform, and/or the like), a description of an item, a description of a merchant or merchant location, dynamically provided user content, and/or the like, e.g., 319. In one embodiment, if merchant item or pricing information is available, e.g., 320, the widget template may be populated with the item pricing or item description data, e.g., 321. In some embodiments, populating the template may include inserting a live-link to the underlying data (e.g., a live CWI or merchant database query link) such that the user device may dynamically retrieve all or portions of the information without having to load all of the information at render time. In one embodiment, a widget designer response package may be generated with the populated widget designer, and transmitted to the user device, e.g., 322, which may render the widget designer response for use by the user, e.g., 323

Figure 4A:
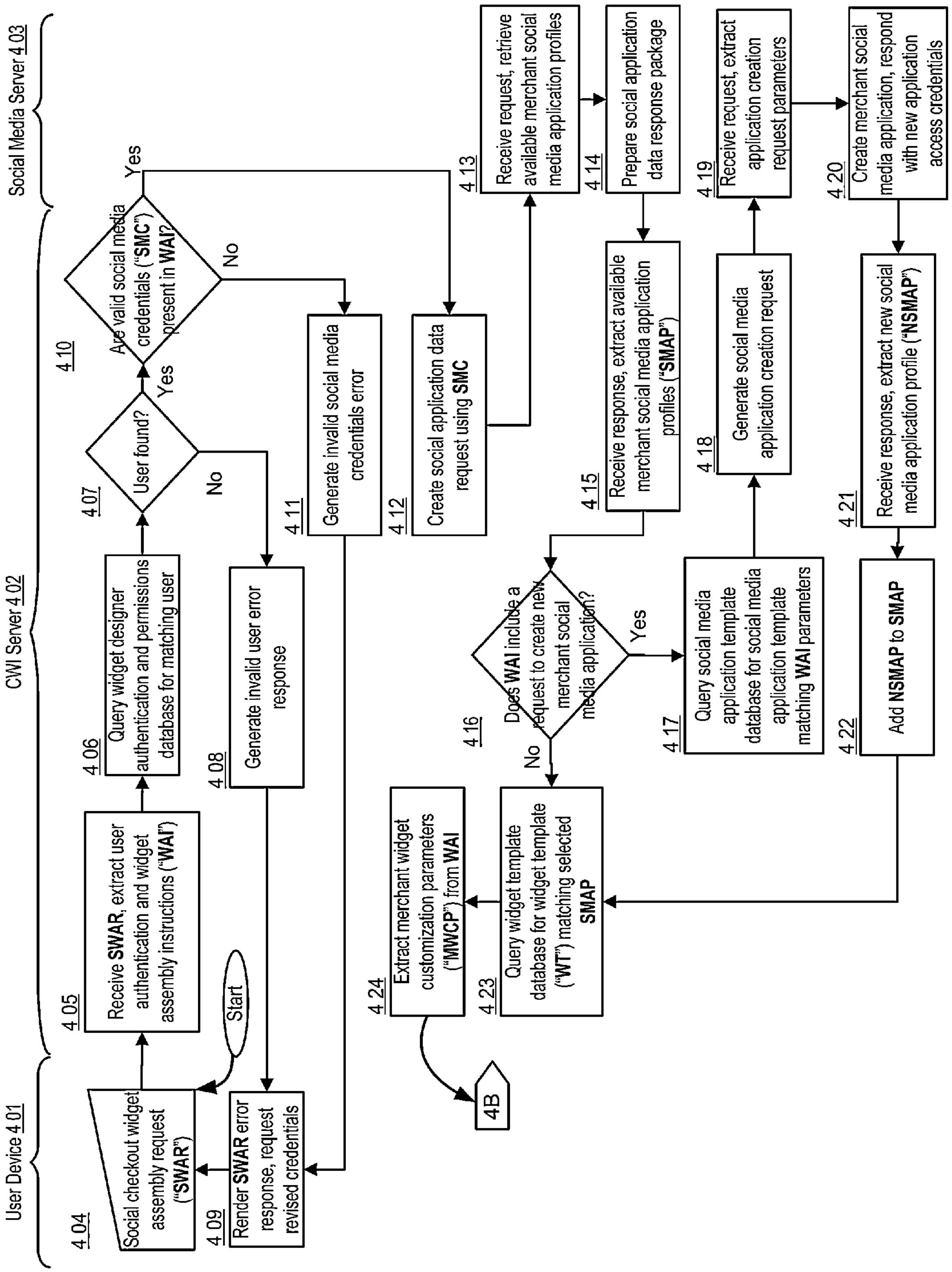
FIGS. 4A-B show a logic flow illustrating an example social widget assembly and population component, e.g., a PSW Component 400, in some embodiments of the CWI.
Figure 4B:
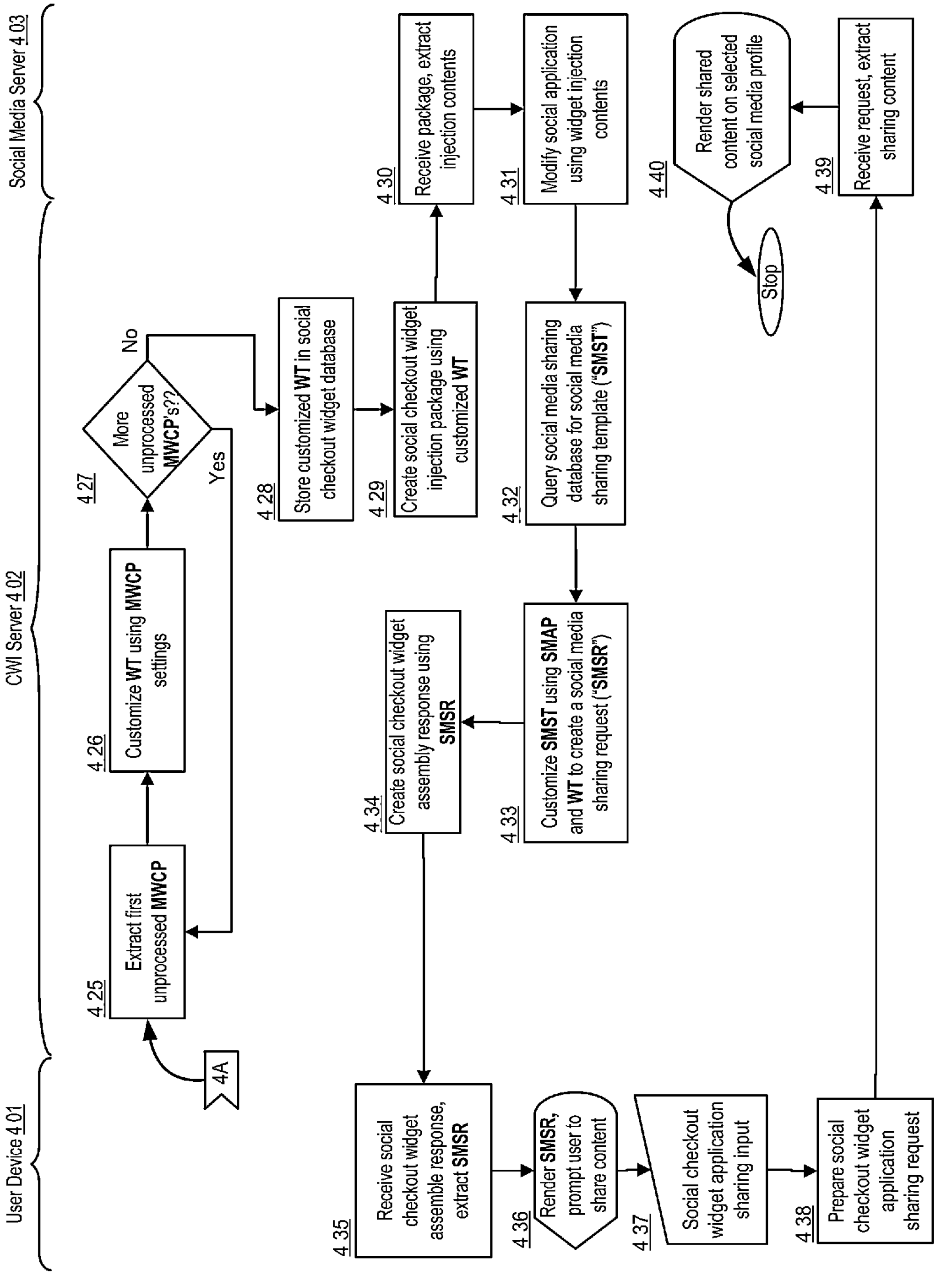

FIGS. 4A-B show a logic flow illustrating an example social widget assembly and population component, e.g., a PSW Component 400, in some embodiments of the CWI. In one embodiment, user device 401 may create a social checkout widget assembly request, e.g., 404, and transmit the request to CWI server 402. In one embodiment, the CWI server may receive the request and extract user authentication information and widget assembly instructions and/or widget configuration parameters, e.g., 405. In one embodiment, the CWI server may query a widget designer authentication and permissions database for a user matching the provided user authentication information, e.g., 406. If the user is not found, e.g., 407, an invalid user error response may be generated, e.g., 408, and forwarded to the user device. The user device may render the error response and request the user to provide updated credentials, e.g., 409. If the user is found, the social checkout widget assembly request may be examined to determine if valid social media credentials (which may be, in some embodiments, credentials to access a user's or third-party's social media feed, to access a user's or third-party's social media application, and/or the like) are present, e.g., 410. If valid credentials are not present, an invalid social media credentials error may be generated, e.g., 411, and transmitted to the user device which may then request updated social media credentials. In some embodiments, the social media credentials may be absent, or may be stored on the CWI server or a third-party server and be retrieved in response to receiving a social checkout widget assembly request. In one embodiment, a social application data request may be created using the social media credentials, e.g., 412. A social application data request may be a request to retrieve a list of social media applications associated with or available using a user or third party's social media credentials. In one embodiment, the social application data request is send to a social media server 403, which may receive the request and retrieve available social media application profiles, e.g., 413. For example, in one embodiment a comma delimited list of all applications include an application name, application permission, application widget integration, and/or the like may be returned. The social media server may prepare a social application data response package using the retrieved social media application profiles, e.g., 414, and transmit the response to CWI server 402. In one embodiment, CWI server 402 may receive the response and extract the available social media application profiles, e.g., 415.

In one embodiment, if the widget assembly instructions include a request to instantiate or create a new social media application, e.g., 416, the CWI server may query a social media application template database for a social media application template matching the required widget assembly instruction parameters (e.g., the proper application capabilities, application permissions, target user demographic profile, and/or the like), e.g., 417. An example social media application template, substantially in the form of XML-formatted data, is provided below:

```
<?XML version = "1.0" encoding = "UTF-8"?>
<social_media_application_template>
  <operation type="create_new_application">
    <required_parameters>
      <param name="application_name" />
      <param name="user_to_create_for" />
      <param name="user_credentials" />
    <required_parameters>
    <optional_parameters>
      <param name="application_view_page"
          types_accepted="PHP,HTML+JavaScript,C++" />
      <param name="application_config_options">
        <config val="user_age_range" type="integer" />
        <config val="ecommerce_enabled_store" type="boolean" />
        <config val="third_party_render_server" type="url" />
      </param>
    </optional_parameters>
    <execute>
      <command seq="1" endpoint="https://merchant.com/info"
        to_post="notice_of_new_social_app_being_created" />
      <command seq="2" endpoint="https://socialmedia.com/newapp"
              include="all_parameters" />
      <expect_return from_seq="2" value="string:'app_created'" />
      <expect_return_param from_seq="2"
              name="new_app_id" type="integer" />
    </execute>
  </operation>
  <operation>
    ...
  </operation>
</social_media_application_template>
```

In one embodiment, the CWI server may generate a social media application creation request, e.g., 418, using the social media application template and the widget assembly instructions, and transmit the request to social media server 403. The social media server may receive the request and extract the application creation request parameters, e.g., 419, and create a social media application based on the request parameters, e.g., 420. In one embodiment, the social media server may respond with access credentials for the new social media application (e.g., an API access key, username/password, and/or the like). In one embodiment, the CWI server may receive the response indicating that the new social media application has been created and extract the new social media application profile including access credentials, e.g., 421. In one embodiment, the new social media application may be added to the available social media applications, e.g., 422.

In one embodiment, the CWI server may query a widget template database for a widget template corresponding to the social media application profile, e.g., 423. For example, depending upon the capabilities or renderable types supported by the social media application, a different widget template may be selected. In one embodiment, widget customization parameters may be extracted from the widget assembly instructions, e.g., 424. Widget customization parameters may include but are not limited to: widget behavior when invoked, widget merchant URL to link to, what checkout or application view to render upon widget invocation, and/or the like. The logic flow may continue with respect to FIG. 4B.

In one embodiment, the CWI server 402 may extract a first unprocessed widget customization parameter, e.g., 425 for use in customizing the widget template. The customization parameter may be applied to the widget template (e.g., insertion of content, selection of an item for display by the widget, a price of an item, a behavior of the widget, an application view to invoke when the widget is engaged, and/or the like), e.g., 426. In one embodiment, if there are more unprocessed widget customization parameters, e.g., 427, the cycle may repeat. In one embodiment, the CWI server may store the customized widget template in a social checkout widget database, e.g., 428, for later use by the CWI server or a third-party server in rendering the widget. As a non-limiting example, a customized widget template may be found with respect to FIG. 21D, e.g., sample updated code 2128. In one embodiment, the widget may additionally be injected directly into a social media application hosted by a social media server 403. In one embodiment, the CWI server may create a social checkout widget injection package using the customized widget template, e.g., 429, and transmit the package to a social media server 403. In one embodiment, the social media server may receive the package and extract the contents for processing, e.g., 430, and may in turn modify a social media application using the widget injection package contents, e.g., 431. Modifying a social media application may include injecting widget content into a social media application (such as at a given placeholder or DIV element), the creation or removal of a social media application page or view, the rendering of an application view either partially or fully, otherwise configuring the social media application, and/or the like.

In one embodiment, the CWI server may query a social media sharing database for a social media sharing template, e.g., 432. A social media sharing template may contain information (e.g., content skeletons, social media parameters to include in a sharing request, and/or the like) that may be used to create a social media sharing request (e.g., a request for a user to share content on a social media site). In one embodiment, the social media sharing template may be customized using the social media application profile (e.g., by injecting or making available a social media application launch button, and/or the like) and/or the customized widget template, e.g., 433. In one embodiment, the CWI server may create a social checkout widget assembly response using the customized social media sharing request, e.g., 434, and transmit the request to the user device 401.

In one embodiment, the user device may receive the social checkout response containing the sharing request, e.g., 435, and prompt the user to share the included content, e.g., 436. In one embodiment, the user may accept the request and/or provide a social checkout widget application sharing input, e.g., 437, in order to share the social media application integration information on a social media feed. In one embodiment, the user device may prepare a social checkout widget application sharing request, e.g., 438, and transmit the request to social media 403. The social media server may receive the request and extract the content for sharing, e.g., 439, and render the shared content on a user or third-party's social media feed, e.g., 440.

Figure 5:
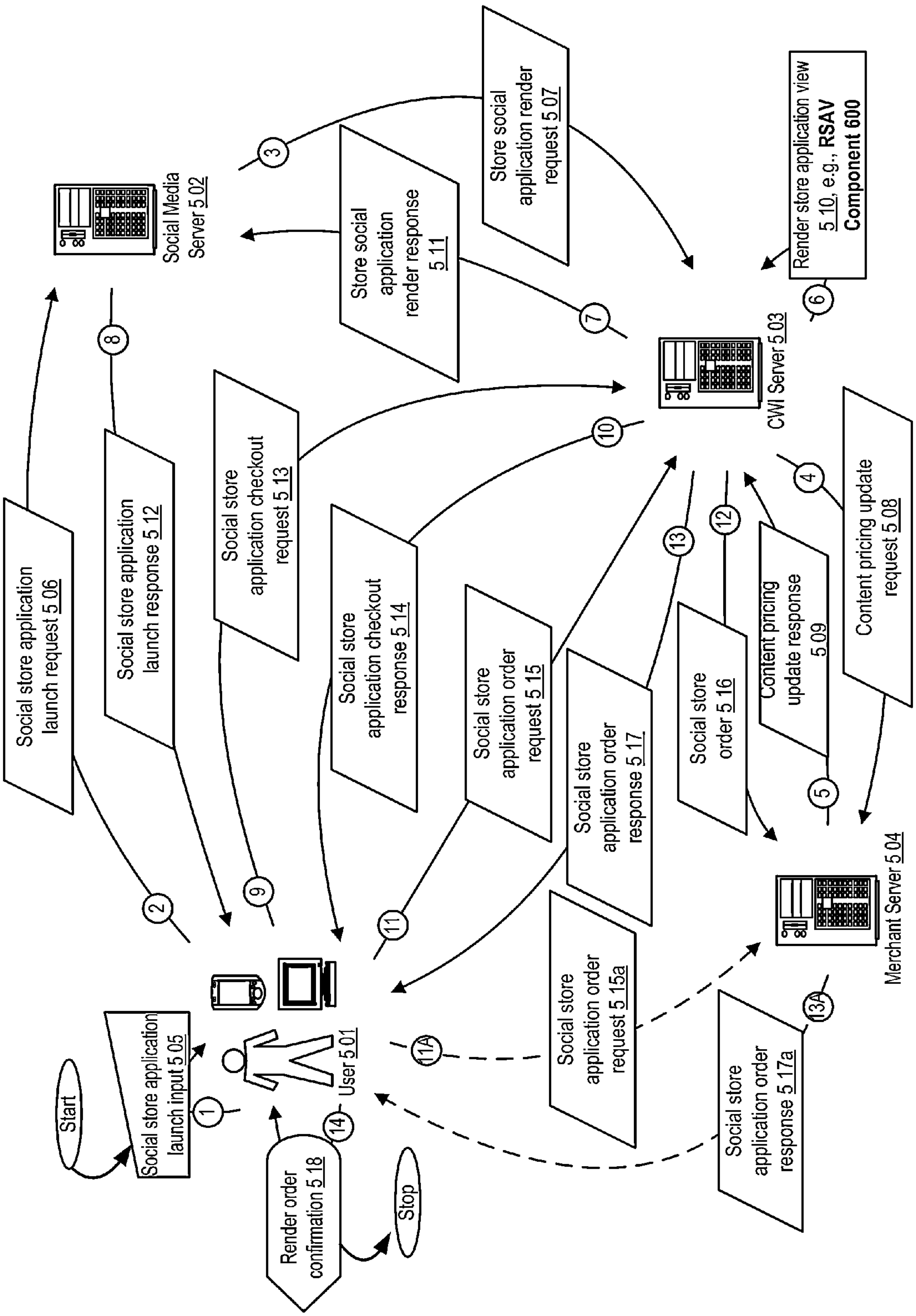
FIG. 5 shows a data flow illustrating an example social wallet widget checkout, in some embodiments of the CWI.

FIG. 5 shows a data flow illustrating an example social wallet widget checkout, in some embodiments of the CWI. In one embodiment, user 501 may launch a social media application using their client or mobile device, e.g., social store application launch input 505. The user's device may transmit a request to launch the social media application to social media server 502, e.g., a social store application launch request 506. An example social store application launch request 506, substantially in the form of an HTTP(S) POST message including XML-formatted data, is provided below:

```
POST /social_store_application_launch_request.php HTTP/1.1
Host: www.socialmediaserver.com
Content-Type: Application/XML
Content-Length: 667
<?XML version = "1.0" encoding = "UTF-8"?>
<social_store_application_launch_request>
  <auth>
    <user_id>7654353</user_id>
    <password>secretpass</password>
    <device_id type="iPhone">EIN8876565</device_id>
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <application_to_launch val="merchant_social_app" />
  <application_page_to_view val="new_item_display" />
  <application_page_parameters val="item:E18786" />
</social_store_application_launch_request>
```

In one embodiment, social media server 502 may retrieve a social application record from a social application database stored in communication with the server. The application record may specify an endpoint server that may be used to render the application page(s). For example, the social media server may contact the CWI server 503 with a request to render an application page. In other embodiments, the social media server may utilize merchant server 504, a third-party server, and/or the like to render the application view. In still other embodiments, the social media server may itself store the information required to render a social application view on behalf of a third party independently. For example, the third-party may have previously uploaded content to the social media server, the social media server may be in communication with a merchant server 504, the social media server may screenscrape or otherwise parse a merchant's web page (such as, for example, using an integrated parsing function as described herein with respect to FIG. 23. In one embodiment, the social media server may contact the CWI server 503 and request that the CWI render a social media application containing an integrated ecommerce capability, e.g., a store social application render request 507. An example store social application render request 507, substantially in the form of an HTTP(S) POST message including XML-formatted data, is provided below:

```
POST /store_social_application_render_request.php HTTP/1.1
Host: www.CWIserver.com
Content-Type: Application/XML
Content-Length: 667
<?XML version = "1.0" encoding = "UTF-8"?>
<store_social_application_render_request>
  <auth type="requesting_user">
    <key>
      YTGFTYFRYTFYTGFVHUJYTYEXERJHG
      987YHTRFDCTRFGCDYWFDGFTRTD
      YY&&GTFDTGRFDXTRFRERSEW%
    </key>
  </auth>
  <auth type="social_media_server">
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <application_to_launch val="merchant_social_app" />
  <application_page_to_view val="new_item_display" />
  <application_page_parameters val="item:E18786" />
</store_social_application_render_request>
```

In one embodiment, the CWI server may determine that in order to render the store social application, updated information (e.g., item pricing, inventory levels, descriptions, store locations, and/or the like) is required from merchant server 504. In one embodiment, CWI server 503 may initiate a content pricing update request 508 in order to obtain updated item information. The merchant server may retrieve the requested information, such as by querying an item inventory/pricing database, and forward the updated item information as a content pricing update response 509. An example content pricing update request 508 may be substantially in the form of that described with respect to FIG. 2, e.g., a widget merchant content update request 207. An example content pricing update response 509 may be substantially in the form of that described with respect to FIG. 2, e.g., a widget merchant content update response 208.

In one embodiment, the CWI server 503 may then render a store application view. For example, the CWI server may retrieve a view page template and execute logic to apply the received merchant content to the template. The CWI may then generate widget launch code and insert the generated widget launch code into the rendered store application view. In other embodiments, the CWI server may query a third-party source (e.g., a stock market index service, a weather service, and/or the like) in order to render the page view. Further detail regarding rendering a store application view may be found herein and particularly with reference to FIG. 6, e.g., an example RSAV Component.

In one embodiment, the CWI server 503 may respond with a rendered application view embedded with a widget checkout capability, e.g., a store social application render response 511. In other embodiments, the CWI server may only return the widget and the social media server may insert the widget into a larger view rendering. An example store social application render response 511, substantially in the form of an HTTP(S) POST message including XML-formatted data, is provided below:

```
POST /store_social_application_render_response.php HTTP/1.1
Host: www.socialmediaserver.com
Content-Type: Application/XML
```

-continued

```
Content-Length: 667
<?XML version = "1.0" encoding = "UTF-8"?>
<store_social_application_render_response>
  <auth type="cwi_server">
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <rendered_application_view id="6565">
    <page val="new_item_display" />
    <page_parameters val="item:E18786" />
    <page id="1">
      <title val="Item Display Page" />
      <content style_sheet="merchant_custom_styles.css">
        <div id="description">
          This is the item description. You can buy the
          product now from directly in the social
          application. Just click the widget button to
          launch the checkout widget!
        </div>
        <div id="widget">
          <div id="v-root"></div>
          <v:init apikey="L3KQEBHEJM4HOKCE2XO5"></v:init>
          <script type="text/javascript"
                src="https://sandbox-static.
                v.me//js/1/v-widgets.js"></script>
          <v:buy
            apikey = "L3AWQDLKBHYCE2XO5"
            token = "4a752d0bb67f241a2a567"
            custom_widget_skin = "FDSRE"
            amount = "99.95"
            currency = "USD"
            product-id = "Testproduct1"
            merch-trans = "MERCHORDER1234"
            collect-shipping = "true"
            process = "validate">
          </v:buy>
        </div>
    </page>
    <page id="n">
      ...
    </page>
  </rendered_application_view>
  <rendered_application_view>
    ...
  </rendered_application_view>
</store_social_application_render_response>
```

In one embodiment, the social media server may then manipulate the returned store social application render response, such as by wrapping the response into a larger response, by applying a template to the response, filtering out non-sharable data, inserting social data into the response (e.g., by replacing placeholders inserted by the CWI server, by appending social data to the response, and/or the like), and/or the like. The social media server may then transmit the social application embedded with a checkout widget functionality to the user device, e.g., a social store application launch response 512.

In one embodiment, the user may then utilize the rendered application interface to view the requested content. For example the user may be presented with an interface in which to learn about an item that the merchant sells without leaving the social media application. In one embodiment, the user may indicate that they wish to purchase an item from within the social application by clicking the rendered widget checkout button. In so doing, the user device may transmit a checkout request to the CWI server 503, e.g., a social store application checkout request 513. In another embodiment, the checkout request may be sent directly to a merchant server, to a social media server, and/or the like. An example social store application checkout request 513, substantially in the form of an HTTP(S) POST message including XML-formatted data, is provided below:

```
POST /social_store_application_checkout_request.php HTTP/1.1
Host: www.CWIserver.com
Content-Type: Application/XML
Content-Length: 667
<?XML version = "1.0" encoding = "UTF-8"?>
<social_store_application_checkout_request>
  <timestamp>2020-12-12 15:22:43</timestamp>
  <auth>
    <user_id>7654353</user_id>
    <password>secretpass</password>
    <device_id type="iPhone">EIN8876565</device_id>
    <user_info>
      <name>John Consumer</name>
      <email>john.consumer@foo.com</email>
      <phone>645-123-4567</phone>
    </user_info>
    <key>
      TRDTRBKJHujJHG&^%BKJBJHVTYEXERJHG
      VXDHJVRTDERJUHYLOPOOIUCFGWFDGFTRTD
      )TRDREWQTFRGCDYUG{UYTFTYDFGRERSEW%
    </key>
  </auth>
  <checkout_request>
    <request_type val="render_checkout_lightbox" />
    <request_source val="social_application_widget" />
    <items>
      <item id="Testproduct1"
            price="99.95" />
      <item id="E765765"
            Price="18.45" />
    </items>
    <device_lightbox_overlay_capabilities>
      <supports_css4 val="true" />
      <supports_html5 val="true" />
      <supports_flash val="false" />
    </device_lightbox_overlay_capabilities>
  </checkout_request>
</social_store_application_checkout_request>
```

In one embodiment, the CWI server may generate a checkout page, such as an HTML page rendered within an IFRAME, a user client specific checkout overlay, and/or the like, e.g., a social store application checkout response 514. The CWI server may thereafter transmit the generated response to the user device and the user device may render the response. In one embodiment, the consumer may then connect to their virtual wallet, input payment account information directly into the rendered checkout interface, and/or the like. In one embodiment, the user device may initiate an order by transmitting the entered user payment information as well as information regarding what the consumer is ordering (e.g., item numbers, quantities, and/or the like) to the CWI server, e.g., a social store application order request 515. An example social store application order request 515, substantially in the form of an HTTP(S) POST message including XML-formatted data, is provided below:

```
POST /social_store_application_order_request.php HTTP/1.1
Host: www.CWIserver.com
Content-Type: Application/XML
Content-Length: 667
<?XML version = "1.0" encoding = "UTF-8"?>
<social_store_application_order_request>
  <timestamp>2020-12-12 17:22:43</timestamp>
  <auth>
    <user_id>7654353</user_id>
    <password>secretpass</password>
    <device_id type="iPhone">EIN8876565</device_id>
    <user_info>
      <name>John Consumer</name>
      <email>john.consumer@foo.com</email>
```

-continued

```
        <phone>645-123-4567</phone>
      </user_info>
      <key>
        TRDTRBKJHujJHG&^%BKJBJHVTYEXERJHG
        VXDHJVRTDERJUHYLOPOOIUCFGWFDGFTRTD
        )TRDREWQTFRGCDYUG{UYTFTYDFGRERSEW%
      </key>
    </auth>
    <order>
      <shipping>
        <name>John Consumer</name>
        <addr>500 Main St.</addr>
        <citystatezip>Anytown, CA 90254</citystatezip>
      </shipping>
      <payment>
        <virtual_wallet id="E7657664" />
        <virtual_wallet_account id="act#2" />
        <backup_payment type="payment_card">
          <card_num val="1234123412341234" />
          <card_exp val="12-2028" />
        </backup_payment>
      </payment>
      <items>
        <item sku="765765" quantity="2" price="10.00">
          DVD Player
        </item>
        <item sku="111111" quantity="1" price="5.00" />
          Donate $5 to charity or friend
        </item>
      </items>
      <total order="15.00" shipping="3.00" final_total="18.00" />
    </order>
  </social_store_application_order_request>
```

In one embodiment, the CWI server may process the order (e.g., charge the users payment account) and forward the order to the merchant, e.g., a social store order 516. An example social store, substantially in the form of an HTTP (S) POST message including XML-formatted data, is provided below:

```
  POST /social_store_order.php HTTP/1.1
  Host: www.merchantserver.com
  Content-Type: Application/XML
  Content-Length: 667
  <?XML version = "1.0" encoding = "UTF-8"?>
  <social_store_order>
    <timestamp>2020-12-12 17:23:43</timestamp>
    <auth type="server_to_server_preexchangedkey">
      <key>
        TRDTRDTRDHG&^%BKJBJHVTYEXERJHG
        BJHJUYTYFTYGERJUHYLOPOOIUCFGWFDGFTRTD
        IYUTFRDETFGYHCDYUG{UYTFTYDFGRERSEW%
      </key>
    </auth>
    <order type="social_media_widget_order">
      <shipping address="verified_by_social_media_site">
        <name>John Consumer</name>
        <addr>500 Main St.</addr>
        <citystatezip>Anytown, CA 90254</citystatezip>
      </shipping>
      <order_amount>
        <total_order_value val="18.00" />
        <total_items_value val="10.00" />
        <total_non_items_value val="5.00" />
        <total_shipping_value val="3.00" />
        <revenue_share type="social_media_site" val="2.00" />
        <revenue_share type="payment_network" val="1.00" />
        <status val="paid_in_full_account_charged" />
        <merchant_total_revenue_from_order val="15.00" />
      </order_amount>
      <items_to_ship>
        <item sku="765765" quantity="2" price="10.00">
          DVD Player
        </item>
        <item sku="111111" guantity="1" price="5.00" />
```

-continued

```
          Donate $5 to charity or friend
        </item>
      </items_to_ship>
    </order>
  </social_store_order>
```

In one embodiment the CWI server may then respond to the user device with a confirmation that the order has been processed, e.g., a social store application order response 517. In other embodiments of the CWI, the user device may directly initiate an order with a merchant server, a social media server, and/or the like, e.g., 515*a*, 517*a*.

Figure 6:
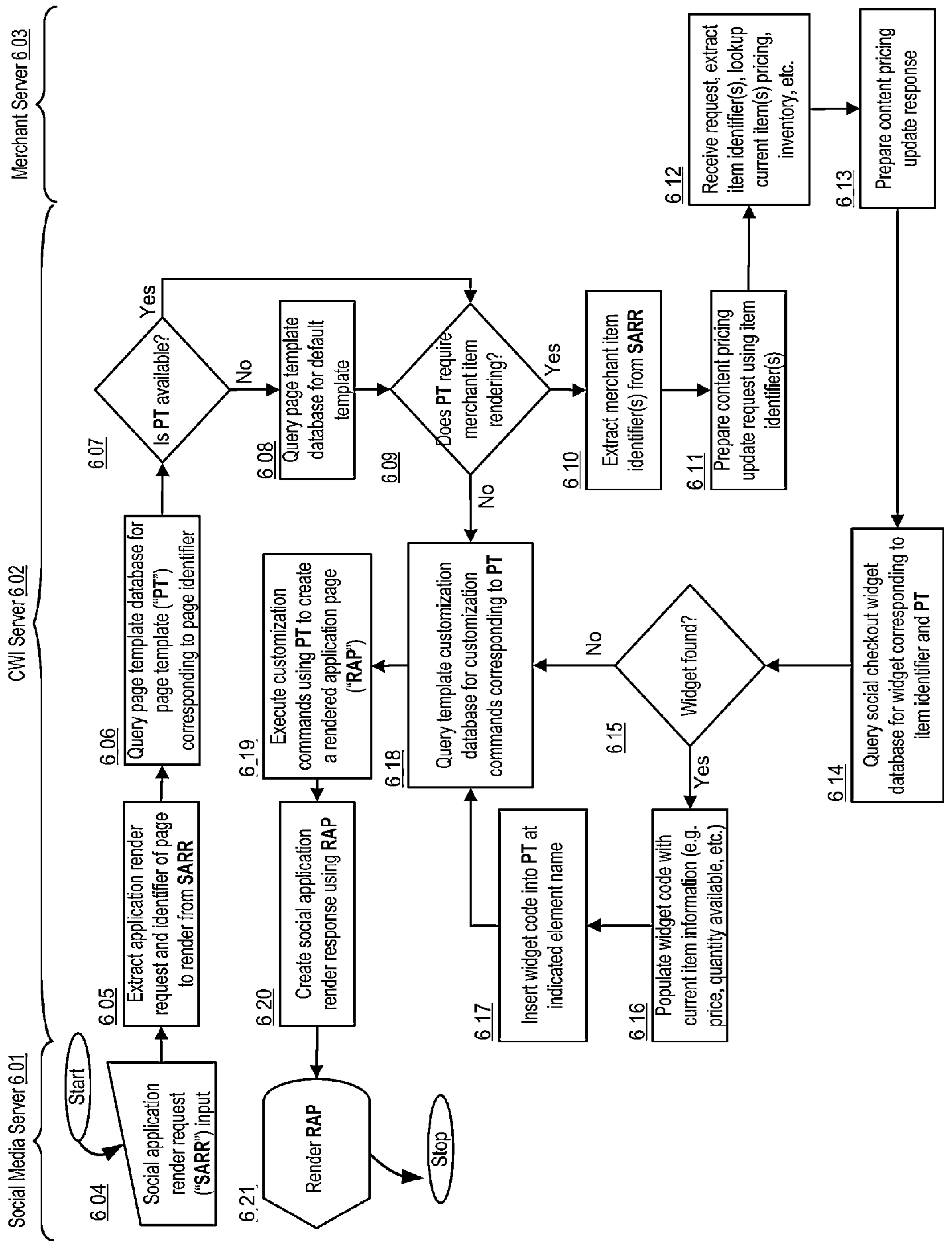
FIG. 6 shows a logic flow illustrating an example store application view rendering component, e.g., a RSAV Component 600, in some embodiments of the CWI.

FIG. 6 shows a logic flow illustrating an example store application view rendering component, e.g., a RSAV Component 600, in some embodiments of the CWI. In one embodiment, social media server 601 may transmit a social application render request to CWI server 602, e.g., 604. A social application render request may be a request from the social network to render a view for an application hosted by the social media server. For example, in some embodiments, the social media server may have application shells that define a subset of all of the application logic for an application available to users of the social media platform. The application shells may indicate that certain portions of an application view should be rendered by contacting a third-party server, such as CWI server 602, and requesting that the third-party server render portions of the application view. An application view may be substantially in the form of HTML, may be in the form of a combination of HTML and executable scripting commands (e.g., Javascript, and/or the like), may be in a format native to the social media application, and/or the like. In other embodiments, the social media server may itself contain the full application logic necessary to render a social media application view on behalf of a merchant or on behalf of a CWI server. Stated another way, the portion of component execution that is shown as being performed by the CWI server 602 or merchant server 603 may in fact be performed by the social media server 601 or a third-party server not shown, either independently or in communication with the CWI server and/or the merchant server.

In one embodiment, CWI server 602 may extract the application render request and an identifier of a page to render, e.g., 605. A page templates database may be queried for a page corresponding to the page identifier, e.g., 606. In other embodiments, the page template may be associated with the social application, the current user of the application, the social media server, and/or the like. In one embodiment, if a page template is not available, e.g., 607, a default template may be loaded from the page template database or another source, e.g., 608. In one embodiment, if the page template requires merchant item rendering, e.g., 609, one or more merchant item identifiers may be extracted from the social application render request, e.g., 610. For example, if the application page view render template has a placeholder to represent the selected item, the CWI may substitute the placeholder element for the item information while rendering the application view. In so doing, social media application render requests may be handled by a minimal number of templates and templates may themselves be multifunctional. In one embodiment, the CWI server may determine that the selected item or items for inclusion in the template require updated content such as pricing, inventory, and/or the like. In one embodiment, the CWI server may prepare a content pricing update request 611, and transmit the request to a merchant server 603. In one embodiment, the merchant server may receive the request, extract the item identifiers, and retrieve the current item information by querying a database in communication with the merchant server, e.g., 612. In one embodiment, the merchant server 603 may generate a content pricing update response containing the updated item information, e.g., 613, and transmit the response to the CWI server 602.

In one embodiment, the CWI server may query a social checkout widget database for any generated widgets corresponding to the item or items being included in the application view, e.g., 614. In other embodiments, the widgets may correspond to the social application, the social application request, the user currently engaged with the social application, and/or the like. If a widget for inclusion is found, e.g., 615, the widget code may be populated with information relating to the current item (e.g., price, description, quantity, and/or the like), e.g., 616 and the widget code may be inserted into the page template at a designated point, e.g., 617. In one embodiment, a template customization database may be queried for customization commands corresponding to the page template, the merchant, the user of the social media application, the social media application itself, and/or the like, e.g., 618. The commands may include but are not limited to instructions to insert a merchant's logo, insert images from a third party server, insert links to a merchant's web site, and/or the like. In one embodiment, the customization commands are executed on the page template to create a rendered application page suitable for use by the social media server or direct rendering by a user device, e.g., 619. In one embodiment, the CWI server may create a social application render response using or containing the rendered application page, e.g., 620, and may transmit the response to social media server 601 which may render the application page either directly or as part of a larger application view that the social media server is rendering, e.g., 621.

FIG. 7 shows an example user interface illustrating overloaded social checkout widget creation and integration, in some embodiments of the CWI. In one embodiment, a social media integration interface may be displayed, e.g., 701. A social media integration interface may allow a user to create a payment widget and inject the widget's content into a social media hosted application, a third-party hosted application, or directly into the user's social media feed (e.g., the user's "Facebook Wall", "Twitter Stream," and/or the like). In one embodiment, a user may choose a product or product to feature in the integration, e.g., 702. Multiple products may be loaded from a third party web site via a web services call (e.g., a RESTful call, a SOAP session, and/or the like). In one embodiment, the user may view various items within the interface, e.g., 703, and select one or more items for integration. In one embodiment, the user may select to add only the current item to the social media widget integration, 703*a*. In other embodiments, the user may select to add the current item and then select another item in addition to the first item (e.g., up to n-items), e.g., 703*b*. In one embodiment, the social media widget integration interface may pre-populate item information/item details, e.g., 704, in response to the user's selection of an item for integration. In some embodiments, the user may override the default text or selections by entering a specific value or values to be used in the particular integration. The user may also upload an image for a product, e.g., 704*a*. In some embodiments, the user may build an item entry directly without having any fields pre-filled. In still other embodiments, the item may in fact be a "non-item" such as a cash donation, a tip jar, and/or the like that may solicit money from a user instead of selling a good or service to the user, e.g., 704*b*. In one embodiment, the user may choose a social application integration target platform, which is the social media platform or platforms that the user wishes to integrate the widget and/or social media application views into, e.g., 705. In one embodiment, the user may choose a social media application connection method, e.g., 706. The connection method is the means by which the widget designer/CWI server may gain access to a user's social media applications so that content may be injected. For example, the user may provide social application connection credentials directly into the interface, e.g., 706*a*. In other embodiments, the user may elect to have a third-party server (such as the CWI server, a merchant server, the social media server itself, and/or the like) host the social media application with or without the injected content, e.g., 706*b*. In one embodiment, the user may indicate that they desire for the CWI server to create a new social media application on the user's behalf, e.g., 706*c*. For example, the CWI server may have predefined profiles for creating a social media application with various social media providers. In other embodiments, the CWI server may prompt the user for details regarding the requirements to create an application on the social media server (e.g., to provide a WSDL file and/or the like). In still other embodiments, the CWI server may autonomously or semi-autonomously scan a social media provider and deduce the requirements for creating an application (e.g., by locating a web services definition file through a web search, by querying standard locations for interface specifications on a social media provider, and/or the like). In one embodiment, the user may configure the social media application configuration, e.g., 707, by choosing a page or view within the social media application on which to integrate a widget, e.g., 707*a*, an element within which the CWI server should insert or make available the rendered widget, e.g., 707*b*, a preferred location for the widget to be inserted into the page in (e.g., "lower left", "below element x", "above the browser fold", and/or the like), e.g., 707*c*, and/or the like.

In one embodiment, the user may be presented with an interface that allows them to customize the launch button to launch the social media application and optionally navigate to the injected content page or view, e.g., 708. In one embodiment, the user may click a customize button, e.g., 708*a*, to be presented with an interface that allows the user to specify an item to feature on the launch button, the text to include, a merchant logo, the page within the social application to navigate to when a user clicks the social media application launch button, and/or the like. In one embodiment, the user may choose to promote the newly available integration on one or more social media feeds, e.g., 709. For example the user may desire to post the integration availability on their social media stream directly, post on the streams of their connections, email their social media connections, message their social media connections through an integrated social media messaging network, and/or the like. In one embodiment, the user may customize the content (e.g., the image, text, and/or the like) to be posted, emailed or messaged to their social network, e.g., 709*a*. In one embodiment, the user may have an option to specify the social media feed of a third party, such as a corporate social media feed, on which to post the promotion.

Figure 8A:
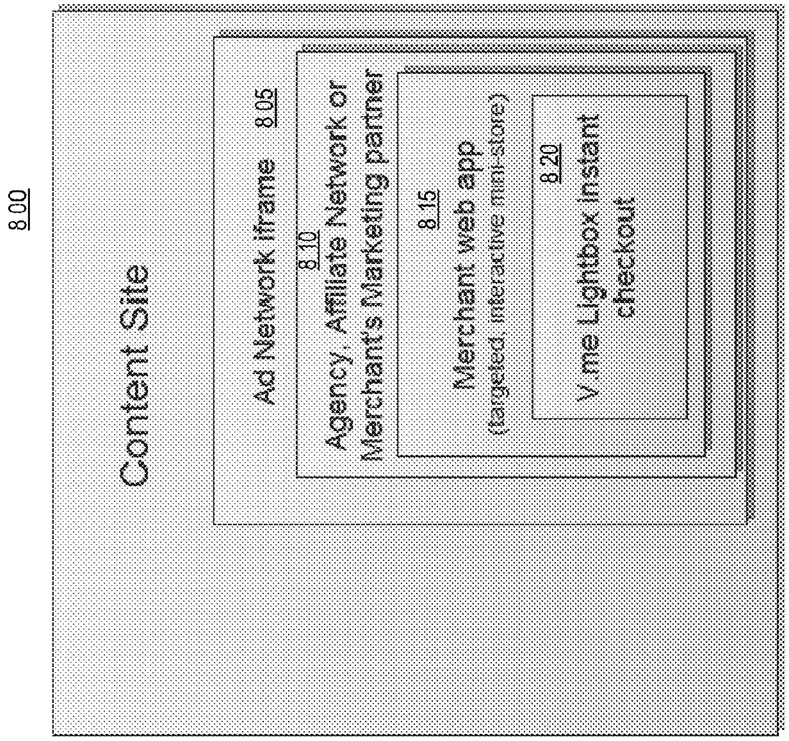
FIG. 8A shows a block diagram illustrating example digital marketing value chain, in some embodiments of the CWI.

FIG. 8A shows a block diagram illustrating example digital marketing value chain in some embodiments of the CWI. As shown, the CWI digital marketing value chain may include various content providers, distributors and/or other partners, and each layer of the value chain may provide opportunities for wallet integration and/or distribution partnerships. For example, it may include a content site 800 (e.g., wired.com, facebook.com, etc.). Each site may support advertisements via ad network iframe, JAVASCRIPT and/or image ad tags 805. Within the content site and/or the ad network iframe, merchant web applications 810 may be supported. The merchant web applications may be targeted, interactive mini stores that are embedded within the site or ad network iframe. Further within the content site, ad network iframe or merchant web application, a payment widget may be embedded to facilitate wallet lightbox instant checkout 820.

Figure 8B:
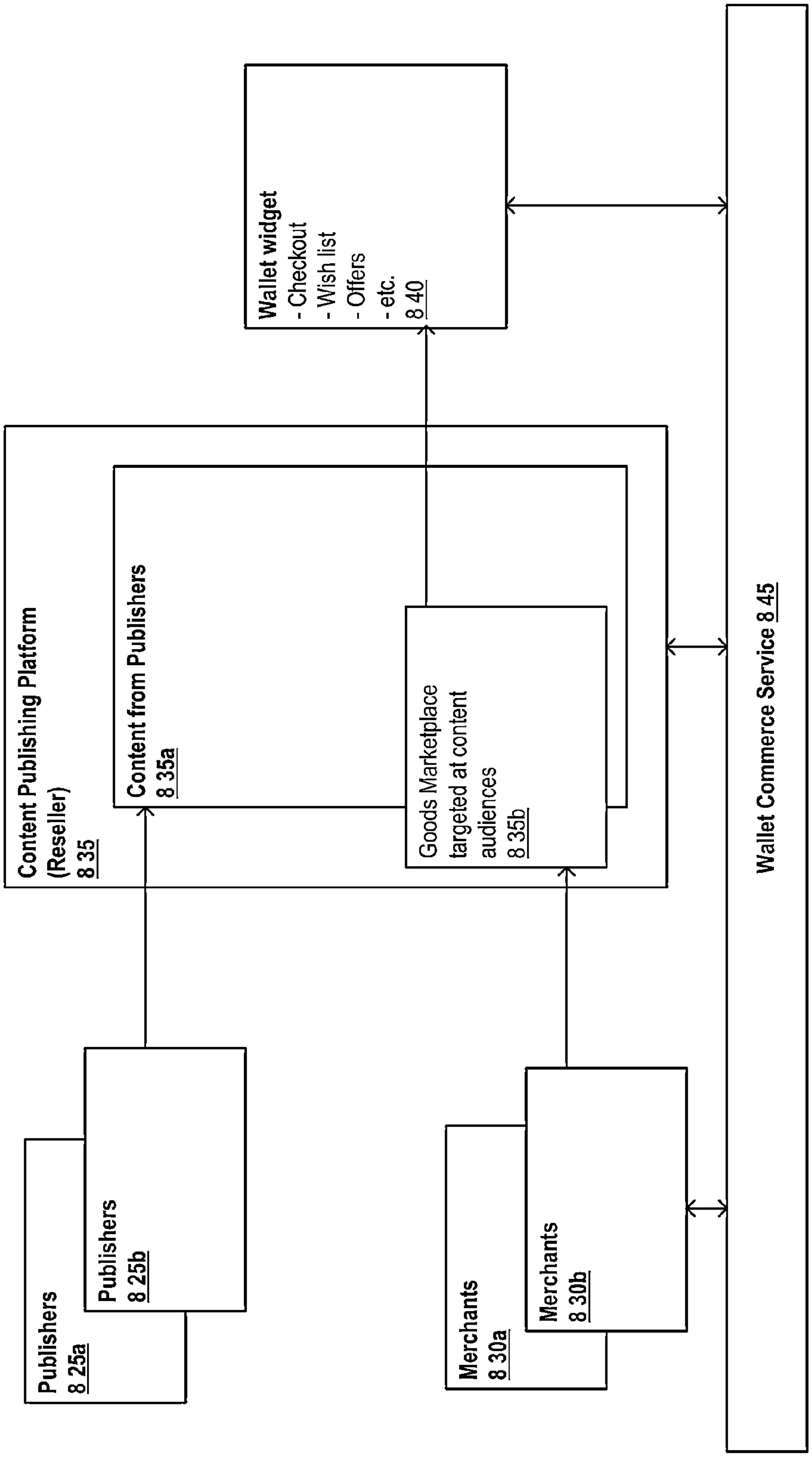
FIG. 8B shows a block diagram illustrating example e-commerce and content integration with wallet, in some embodiments of the CWI.

Publishers of print, TV, radio, online media brands, etc., either build and manage their own websites, mobile and tablet applications or rely on third party publishing platform vendors to distribute their digital content. In either case, and particularly in mobile or tablet environments, content is usually monetized through freemium, subscription, or ad-supported models with no integration with direct merchandizing or commerce. Various embodiments of the CWI may assist publishing platforms in building a complete commerce solution to publishers and merchants. FIG. 8B shows a block diagram illustrating an example content monetization structure in some embodiments of the CWI. As shown, such a structure may connect merchants (830*a*, 830*b*), publishers (825*a*, 825*b*) and content publishing platforms 835 to checkout widget 840 and wallet commerce service layer 845, and thereby allow integration of several components needed to facilitate commerce in content publishing channels.

The CWI provides a safe, common, low-friction checkout experience for consumers from a trusted brand, using payment and authentication credentials they already have on file (e.g., if they are v.me wallet subscribers). It allows publishers or their platform vendor to resell wallet merchant acceptance services to merchants and track sales, allows publishing platforms to participate and/or resell wallet value-added services including offers (clipping offers or redeeming offers), integration with wallet wish list for tracking and affiliate revenue schemes for goods added to a wish list from a content site but purchased later through wallet in another channel. For example, in some implementations, the CWI may facilitate aggregation of merchants within a targeted marketplace 835*b* (e.g. beauty products and apparel merchants) within a content site (e.g., a fashion magazine iPad application), and provide widget checkout solution to the targeted marketplace, thereby providing a convenient commerce solution to the content publishers and/or merchants. In one implementation, content publishers may leverage the CWI facilities to select partnerships with sponsor brands or advertisers to sell a specific promoted good or service. In another implementation, the CWI may allow advertisers to monetize their marketing by enabling complete checkout within advertisements. The CWI checkout facilities may also be leveraged by classified-like business or person-to-person (P2P) posting for goods and services, publishers acting as merchant themselves, selling their own premium services or subscriptions to their audience at better economics than offered by an application store, selling their own merchandise (e.g., branded t-shirts mugs etc.), and/or the like.

Figure 9A:
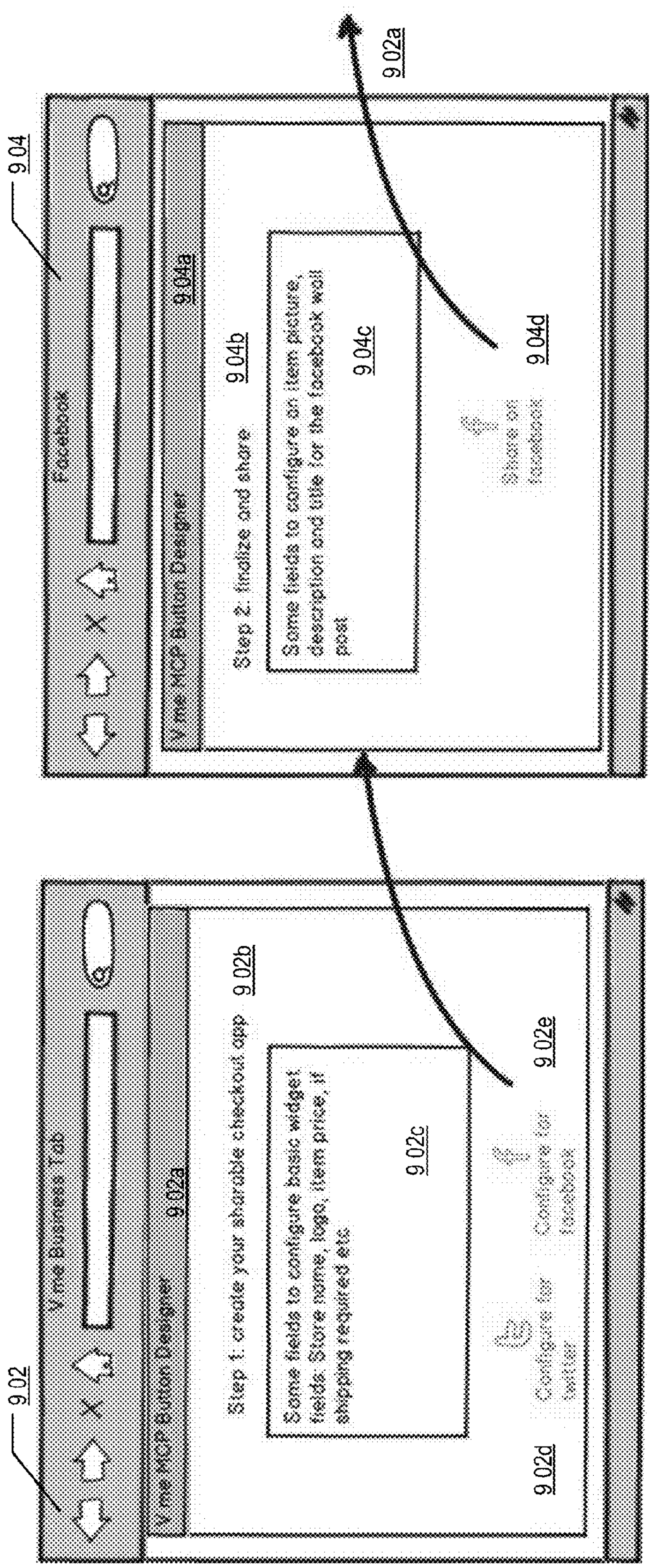
FIG. 9A shows user interfaces illustrating example integration of checkout widget in social media (e.g., FACEBOOK), in some embodiments of the CWI.

FIG. 9A shows user interfaces illustrating example integration of checkout widget in social media (e.g., FACEBOOK) in some embodiments of the CWI. In one implementation, the CWI may provide a user such as a publisher, merchant, or any party desiring to engage in commerce tools to create, customize and share checkout widget in channels outside of their traditional e-commerce site. In one implementation, a user interface 902 (e.g., V.me Business Tab) may be provided for configuring and integrating a checkout widget in various social media and other channels. The user interface 902 may include an option to launch a wallet merchant control panel (MCP) button designer user interface component 902*a* ("button designer wizard") that allows the user to pre-configure a checkout widget for a particular Stock Keeping Unit (SKU) item (e.g., a deal of the day, pre-order a product, a donation to a cause, etc.). The component 902*a* may request the user to enter information for basic checkout widget fields such as store name, logo, item price, item description, SKU, shipping information, and/or the like in one or more fields 902*c* provided to create and configure the checkout widget. Social media options (e.g., 902*d*, 902*e*) where the checkout widget may be distributed or shared may also be provided for selection by the user. In one implementation, when the user selects "configure for FACEBOOK" option 902*e*, the user may be redirected to their FACEBOOK page 904, from where the user may continue with the button design. For example, the button designer wizard may request the user to finalize and share (e.g., 904*b*) the checkout widget. The user may input item picture, description, title and other information in the fields 904*c* provided.

When the user selects the "Share on FACEBOOK" option 904*d*, the button designer wizard may provide the merchant a unique URL for that checkout which they can share by the selected social media channel.

Figure 9B:
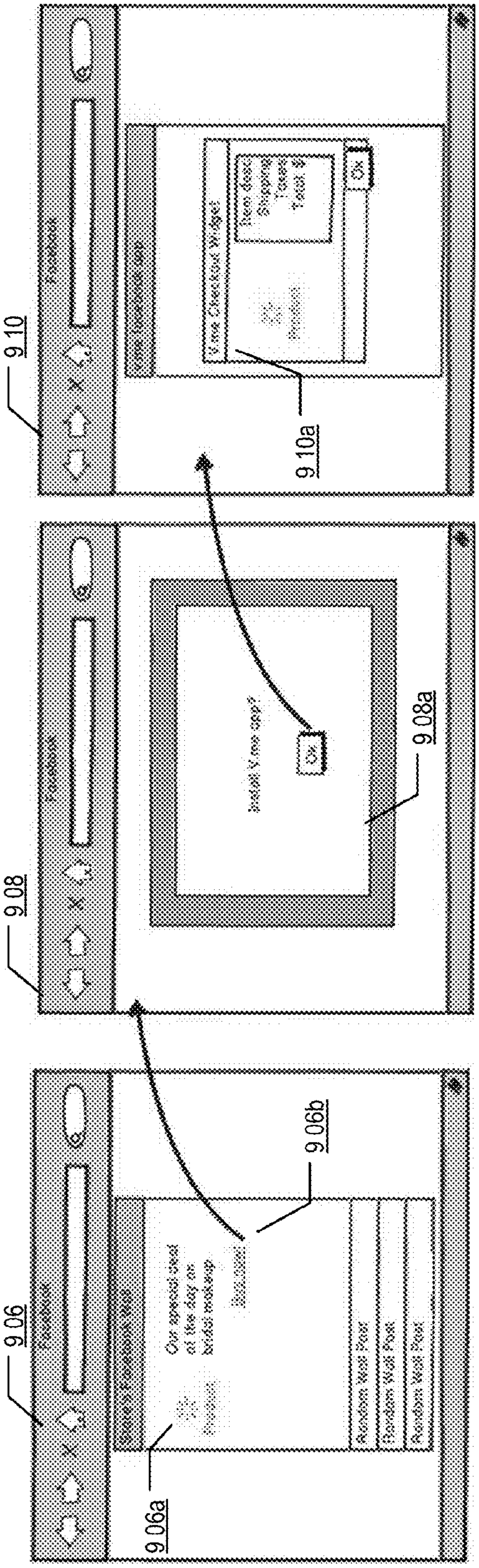
FIGS. 9B-C shows user interfaces illustrating example widget checkout in social media (e.g., FACEBOOK), in some embodiments of the CWI.

FIG. 9B shows user interfaces illustrating example widget checkout in social media (e.g., FACEBOOK) in some embodiments of the CWI. For example, as shown, a wall post 906*a* including a link 906*b* to the product for sale may be published in the user's FACEBOOK page 906. Once the link to the product is posted, it may be clicked by any consumer to initiate instant checkout. For example, as shown, when a consumer clicks on the checkout link 906*b*, a pop up message 908*a* may be displayed in the FACEBOOK site 908 to request the consumer to install a wallet (e.g., V.me) application. When the consumer agrees, a native FACEBOOK application 910*a* may be installed in the consumer's FACEBOOK page 910. A wallet landing page that takes the unique link 906*b* and spawns an appropriate checkout widget 910*b* for the user and the item 910*c* may be embedded into the wallet native FACEBOOK application. The consumer may provide wallet credentials or other payment information to the checkout widget and complete a purchase without leaving their FACEBOOK page. Further, consumer may only have to install one wallet FACEBOOK application to checkout from any user or merchant on FACEBOOK.

Figure 9C:
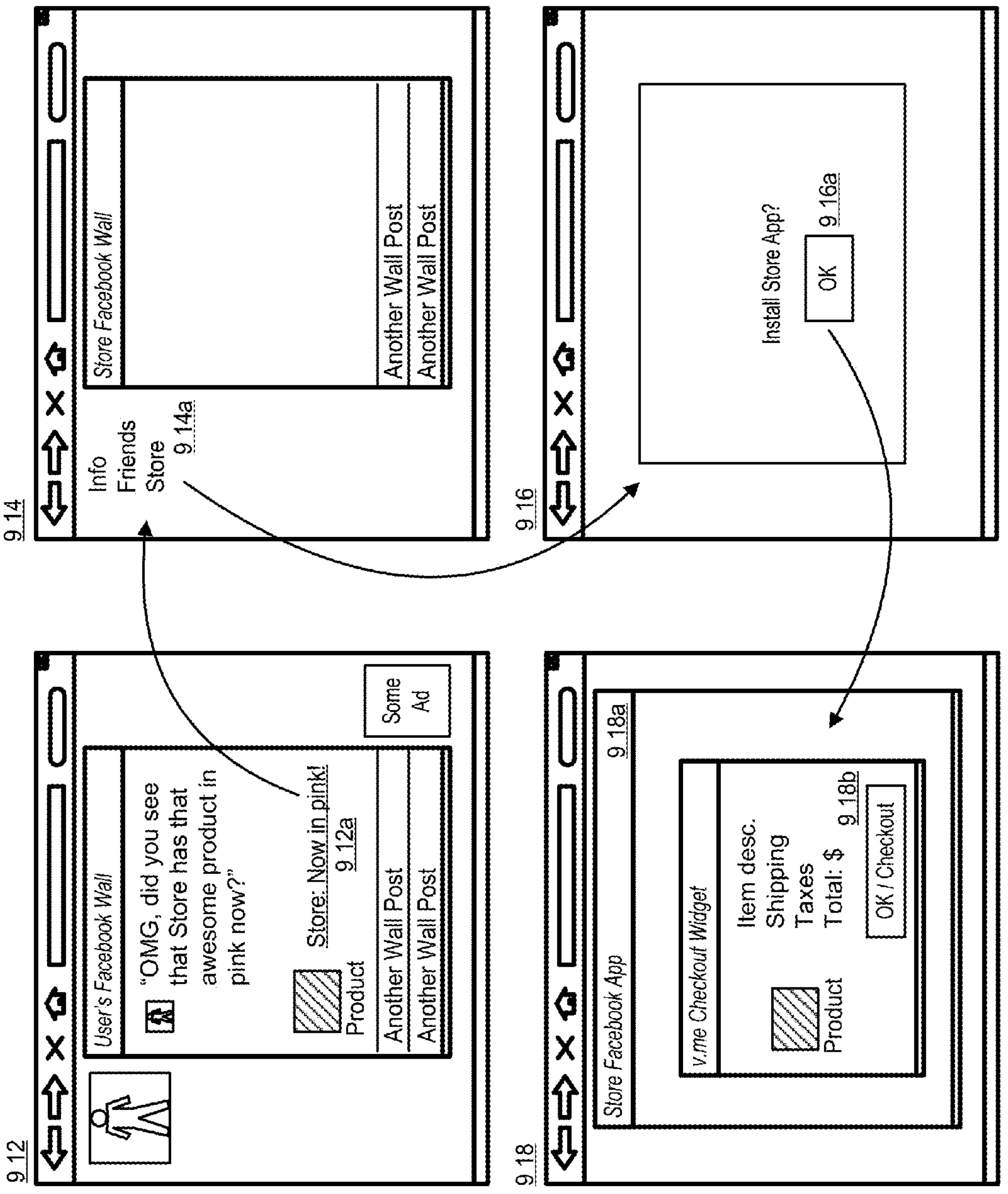

FIG. 9C shows user interfaces illustrating example widget checkout in social media (e.g., FACEBOOK) in some embodiments of the CWI. As shown, a link 912*a* to a product or store may be generated by the wizard and may be posted in a message on a consumer's social network page 912. The link, when clicked, may redirect to a merchant store landing page 914 on a social network (e.g., FACEBOOK). From the merchant's social network landing page, a consumer may launch a merchant store application using a link 914*a*. In other embodiments, clicking the link 912*a* may immediately launch the merchant's social store application (e.g., 918*a*). Upon clicking the link 914*a*, a message window 916*a* may pop up in the browser, e.g., 916, requesting the consumer's permission to install a merchant store application. Upon installation, the merchant store application 918*a* may be rendered as an iframe within the merchant store social network landing page 918. In a further implementation, the initially selected item 912*a* may be displayed to the consumer in the store application 918*a*, from where the consumer may add the item to a shopping cart (e.g., V.me shopping cart) and checkout. The consumer may also browse through other items in the store application and add one or more items in the shopping cart. When the consumer is ready to check out the items in the shopping cart, the consumer may click on a checkout widget 918*b* (e.g., V.me checkout widget) integrated within the store application 918*a*. The consumer may simply enter his wallet credentials (e.g., V.me wallet), or information corresponding to other forms of payment such as credit card, debit card, prepaid card, gift card, online account such as PAYPAL account, and/or the like. In some implementations, the consumer may also provide shipping and any other details necessary to conclude the transaction. In this way, by facilitating consumer purchase of products and/or services within a social network framework, the CWI opens up a new sales channel for merchants and provides consumers the convenience of anytime and anywhere checkout.

Figure 9D:
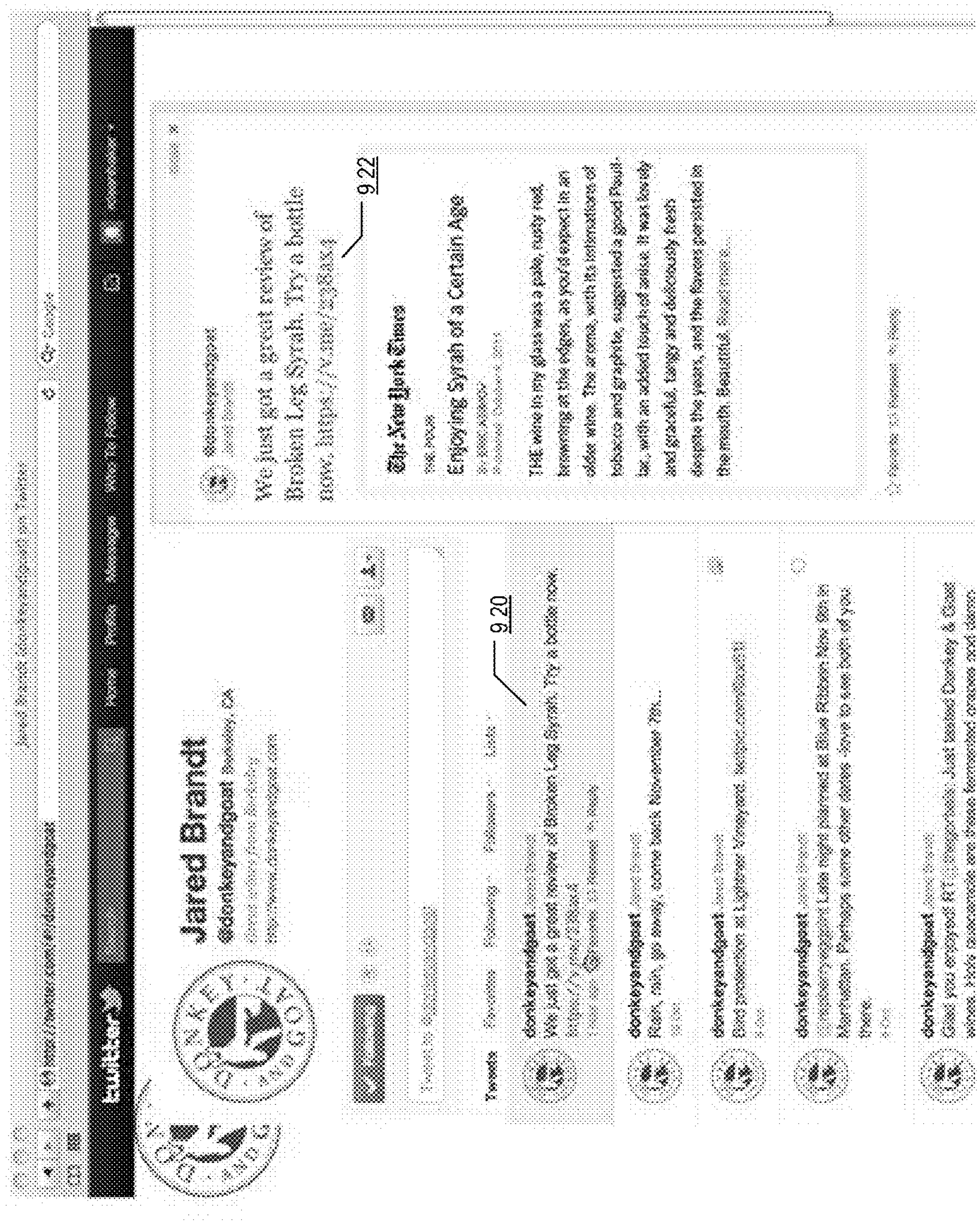
FIG. 9D shows a screenshot diagram illustrating example integration of checkout widget in social media (e.g., TWITTER), in some embodiments of the CWI.

FIG. 9D shows a screenshot diagram illustrating example integration of checkout widget in social media (e.g., TWITTER) in some embodiments of the CWI. In one implementation, a merchant (or other users) may use TWITTER to tweet/retweet 920 a unique link 922 (e.g., https://v.me/238ax4) to a product or service. In one implementation, the link 922 may be a shortened Universal Resource Locator (URL) generated by the merchant using the button designer wizard.

Figure 9E:
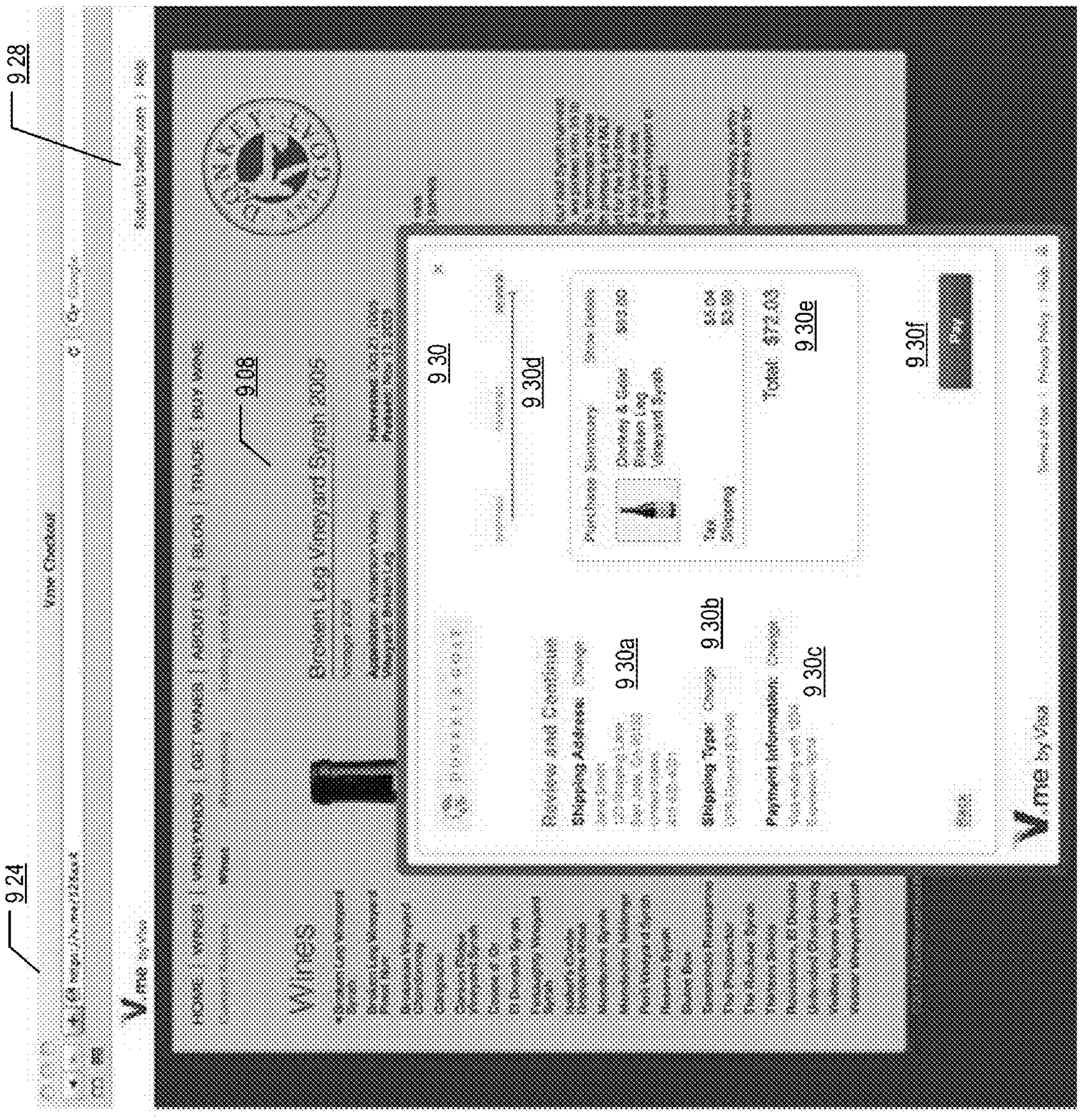
FIG. 9E shows a screenshot diagram illustrating example widget checkout in social media (e.g., TWITTER), in some embodiments of the CWI.

FIG. 9E shows a screenshot diagram illustrating example widget checkout in social media (e.g., TWITTER) in some embodiments of the CWI. As shown, a consumer may click on the link 922 (shown in FIG. 9D), which may direct the consumer to a landing page 924 (e.g., V.me checkout page), where the merchant's website 908 may be displayed as an iframe. The consumer may then go back the previous page by selecting the link 928 (e.g., return to twitter.com) or may select a checkout widget (not shown). When the checkout widget is clicked or selected, an overlay similar to overlay 930 may be displayed where the consumer may enter their wallet login credentials. The consumer provided login credentials may be authenticated by the wallet server, and upon successful authentication, an overlay 930 may be displayed. As shown, the overlay 930 may display the consumer's shipping address 930*a* on file, shipping type preference 930*b* on file, payment information on file 930*c*, purchase summary 930*d*, total amount 930*e*, and/or the like. In one implementation, the overlay may include an option to change any of the information displayed prior to placing the order. In a further implementation, any change of information provided on the overlay may be linked to the information on file at the wallet server, thereby allowing the consumer to update information on the fly. The overlay may also include a pay button 93 of to place order. Upon placing the order, a confirmation message may be displayed in the same overlay. The consumer may then return to their TWITTER page by clicking on the link 928.

Figure 10A:
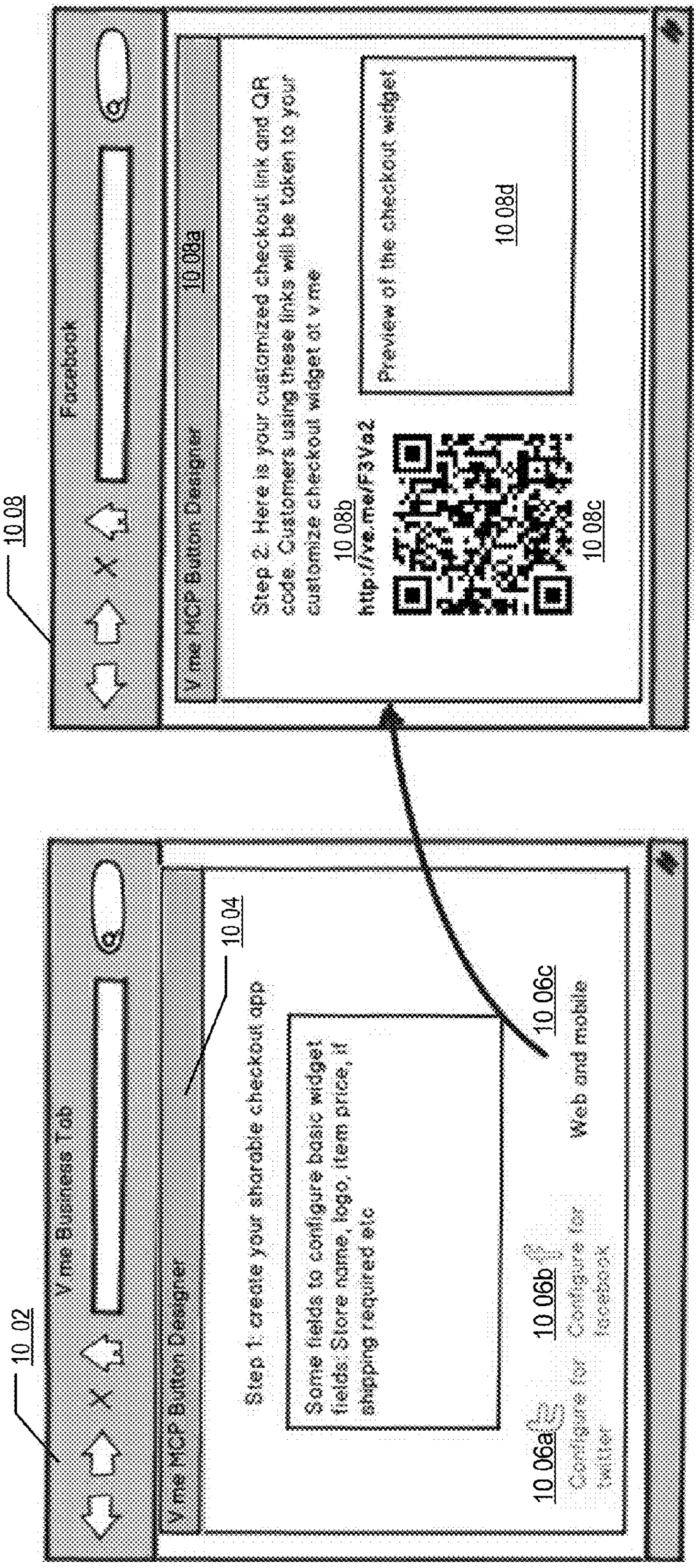
FIG. 10A shows user interfaces illustrating example integration of checkout widget in web/mobile channels, in some embodiments of the CWI.

FIG. 10A shows user interfaces illustrating example integration of checkout widget in web/mobile channels in some embodiments of the CWI. In one implementation, a merchant control panel 1002, similar to those shown in FIGS. 9A and 9C may be provided to a merchant. The merchant control panel may include, among other things, a merchant control panel button designer component wizard 1004 that allows the merchant to create a shareable checkout application. In one implementation, the merchant may be requested to provide button parameters such as store name, logo, item price, if shipping required, shipping methods, product ID, and/or the like necessary to create and customize a checkout widget. In some implementations, an API key and token may also be required to create the checkout widget. The API key may identify the general API access configuration settings, and the token may be an encrypted token for the merchant account. The merchant may have the option to configure the checkout application for various channels including social network (1006*a*, 1006*b*) and web and mobile 1006*c*. In one implementation, when web/mobile configuration is selected, the wizard may generate and provide to the merchant a customized checkout link and/or code such as a bar code, a quick response (QR) code, and/or the like. For example, as shown, the wizard iframe 1008*a* may display a shortened URL link 1008*b* and/or a QR code 1008*c*. In some implementations, a preview 1008*d* of the checkout widget customized according to the button parameters provided by the merchant may be displayed. In one implementation, the link 1008*b* may be shared using communication channels including social media channels, email, SMS, MMS, content site and/or the like.

Figure 10B:
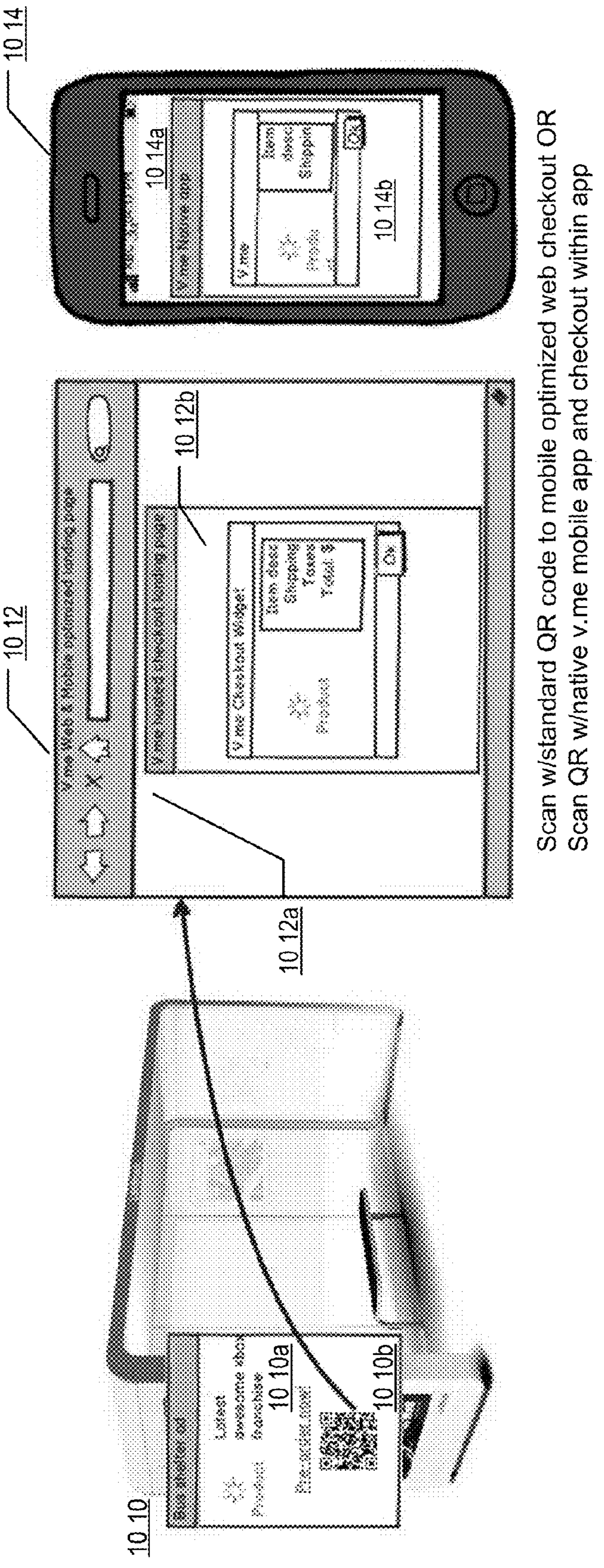
FIG. 10B shows user interfaces illustrating example widget checkout in web/mobile channels, in some embodiments of the CWI.

FIG. 10B shows user interfaces illustrating example widget checkout in web/mobile channels in some embodiments of the CWI. In some implementations, the QR code generated by the wizard may be used for advertisements in print or online. For example, as shown, the QR code 1010*b* along with product or service information 1010*a* may be used in a bus shelter advertisement 1010. In one implementation, a consumer may scan the QR code using their mobile device which directs the consumer to a wallet web and mobile optimized landing page 1012. The landing page may display a wallet hosted checkout landing page 1012*a*. The landing page 1012*a* may display product/service and/or merchant information, and a checkout widget (not shown). When the checkout widget is selected, a wallet checkout window or iframe 1012*b* may be displayed where the user may enter wallet credentials, payment and/or shipping information, view purchase details and place order. In an alternate implementation, the landing page may be embedded within a wallet native mobile application 1014*a*, thereby allowing the consumer to install one wallet mobile application to enable checkout from any merchant accepting mobile checkout. In some implementations, the checkout experience may be optimized for speed, for embedded security, and for a standardized user experience across all merchants on the platform.

Figure 11A:
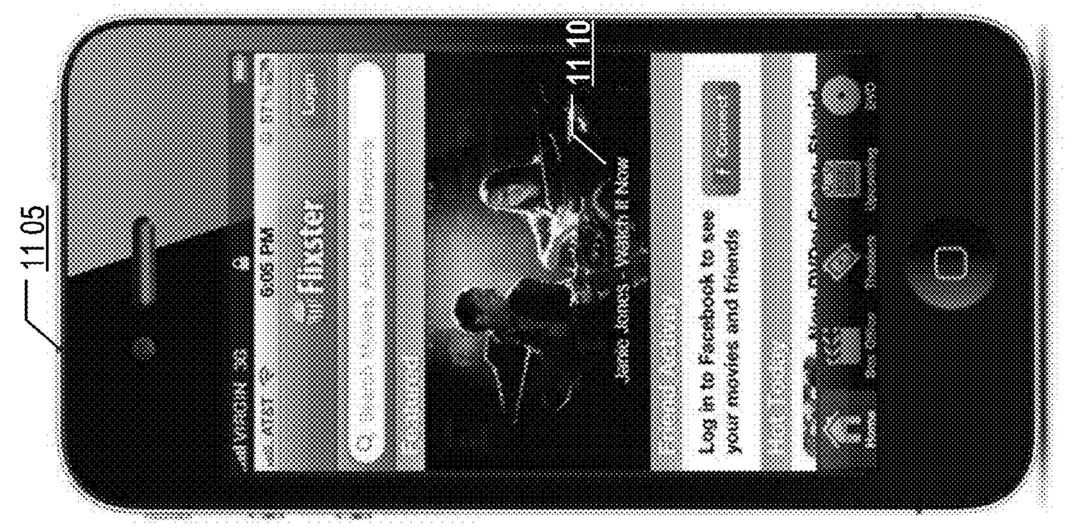
FIG. 11A shows user interfaces illustrating example integration of checkout widget in a mobile application, in some embodiments of the CWI.

FIG. 11A shows user interfaces illustrating example integration of checkout widget in a mobile application in some embodiments of the CWI. In one implementation, a mobile application 1105 may be integrated with wallet checkout via a link 1110 on a content on the mobile application.

Figure 11B:
FIG. 11B shows user interfaces illustrating example widget checkout in a mobile application, in some embodiments of the CWI.

FIG. 11B shows user interfaces illustrating example widget checkout in a mobile application in some embodiments of the CWI. When a consumer clicks on the link 1110 (shown in FIG. 11A), a user interface 1115 including a checkout button 1115*a* may be displayed. The consumer may initiate purchase of the content by clicking on the checkout button 1115*a*. In one implementation, selection of the checkout button may launch an iframe 1120 that displays the consumer's preferred payment information. The consumer may also change payment information directly from the checkout user interface 1120. The checkout user interface may additionally include product information 1120*b* and a pay button 1120C to place the purchase order. In an alternate implementation, instead of launching the checkout user interface 1120 when the checkout button 1115*a* is selected, a native mobile wallet application may be launched. The purchase may then be completed using the wallet application.

Figure 12A:
FIG. 12A shows user interfaces illustrating example integration of checkout widget in a digital catalog, in some embodiments of the CWI.

FIG. 12A shows user interfaces illustrating example integration of checkout widget in a digital catalog in some embodiments of the CWI. The user interface 1200 shows a number of products 1205*a-h* aggregated from one or more merchants and saved under favorites 1215 or wish list. A checkout widget 1210 may be integrated with such a multi-merchant catalog to allow checkout directly from the catalog, favorites or wish list, without having to visit each of the merchants' stores or application individually.

Figure 12B:
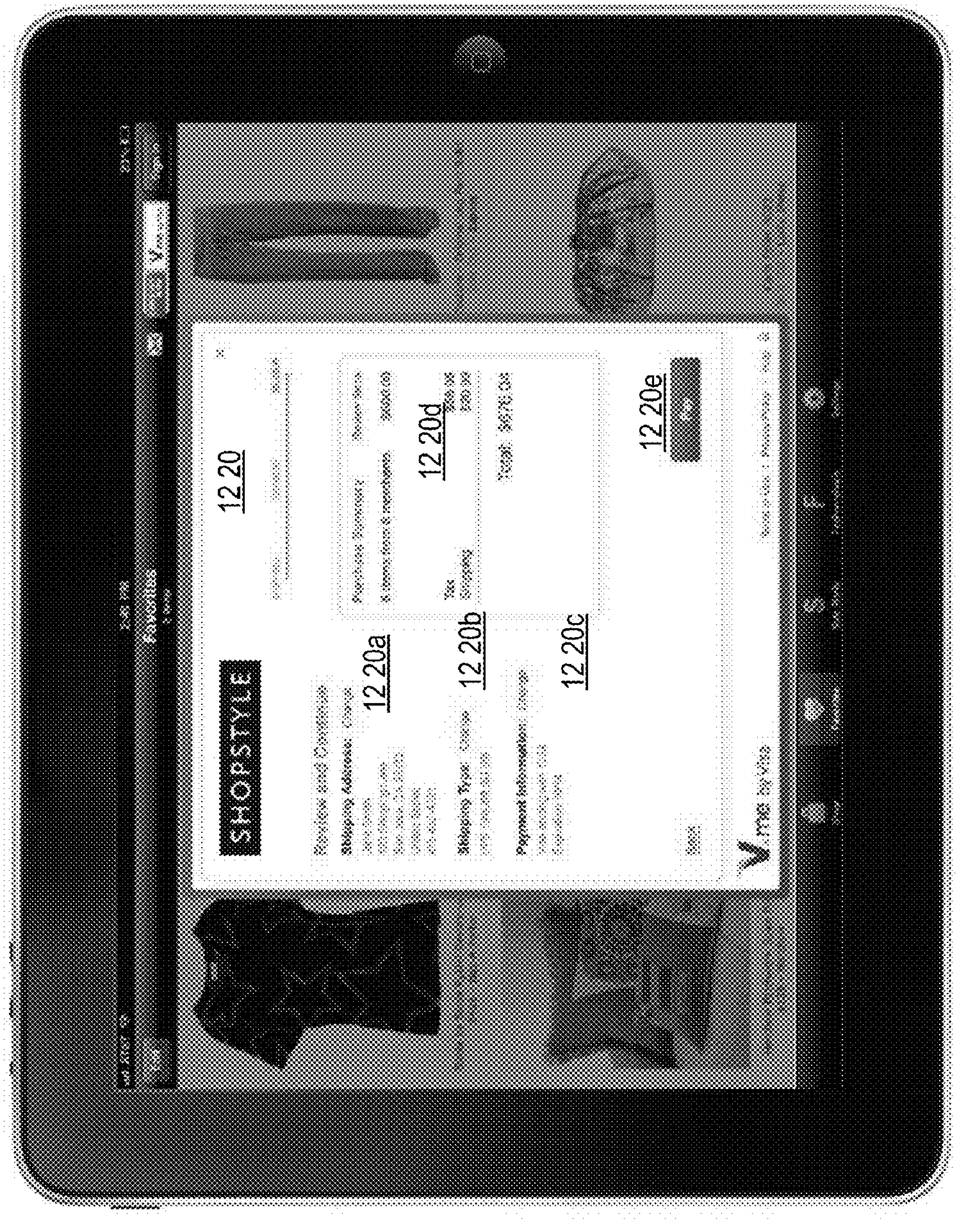
FIG. 12B shows user interfaces illustrating example widget checkout in a digital catalog, in some embodiments of the CWI.

FIG. 12B shows user interfaces illustrating example widget checkout in a digital catalog in some embodiments of the CWI. In one implementation, when the checkout widget is clicked, a lightbox 1220 may be launched. Such lightbox may be branded using logo and other information provided by the catalog publisher. The lightbox may include information such as shipping address 1220*a*, shipping type 1220*b*, payment information 1220*c*, purchase summary 1220*d*, and/or the like retrieved from the consumer's wallet. Such information may also be changed from the same interface, in accordance with permissions and controls for bi-directional federation set up in the wallet. The consumer may then complete the purchase by selecting the pay button 1220*d*.

Once the purchase transaction has been authorized, and one or more wallet commerce service components communicate with the merchants to provide information regarding purchase, and in some implementations, obtain information regarding products (e.g., inventory information, fulfillment, etc.). In some implementations, the CWI may provide facilities for crediting the aggregated seller such as the catalog publisher for initial lead that results in an interest and/or purchase.

Figure 12C:
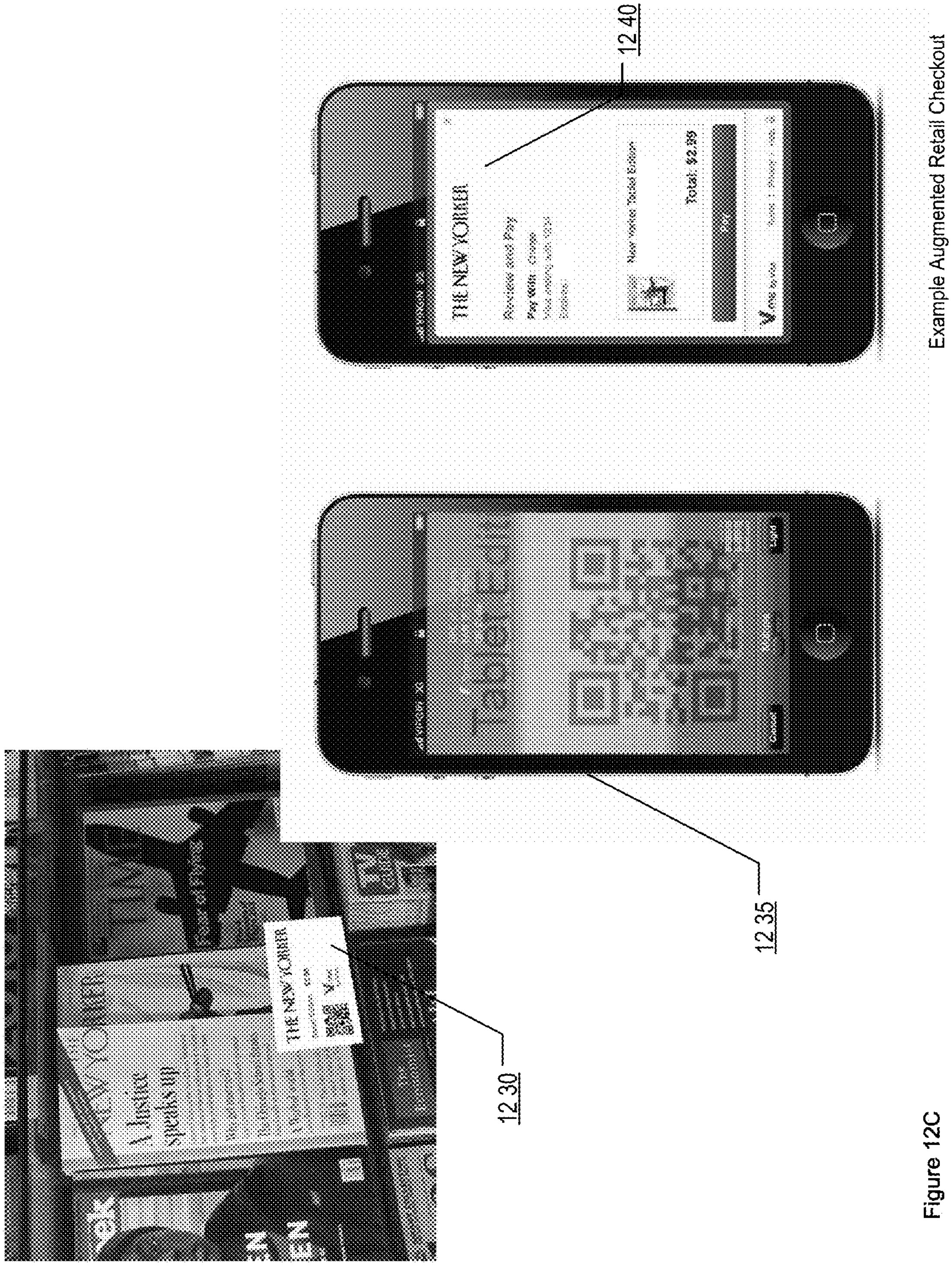
FIG. 12C shows user interfaces illustrating example augmented retail checkout, in some embodiments of the CWI.

FIG. 12C shows user interfaces illustrating example augmented retail checkout in some embodiments of the CWI. In some implementations, retail stores selling retail or digital version of the same product may be credited for the initial lead resulting in interest and/or purchase of the digital version of the product. For example, a bookstore that sells "The New Yorker" magazine, may also place a QR code 1230 for purchasing a digital version of the magazine, the retail store effectively becoming a show room for online products. A consumer who wishes to purchase the digital copy of the magazine, instead of the print copy, may scan the QR code using their tablet or mobile devices 1235. The QR code may launch a landing page, a lightbox, or wallet application 1240 where the consumer may enter payment information or wallet credentials to complete the purchase and download a digital copy to their tablets or other mobile devices. At the backend, the wallet services component may identify the merchant associated with the code that was used for the purchase, and may provide a cut or commission for the sale of the digital magazine. In one implementation, any cut or commission may be determined based on agreements between various parties such as the retailer, the publisher, the wallet service provider, and/or the like.

Figure 13A:
FIG. 13A shows a screenshot diagram illustrating example integration of checkout widget in a content site, in some embodiments of the CWI.

FIG. 13A shows a screenshot diagram illustrating example integration of checkout widget in a content site in some embodiments of the CWI. As shown, a content site 1300 may publish an article 1305 reviewing a product ("USB charger"). The content site may integrate the product review with a checkout widget 1310 to facilitate purchase of the product directly from the review page.

Figure 13B:
FIG. 13B shows a screenshot diagram illustrating example widget checkout in a content site, in some embodiments of the CWI.

FIG. 13B shows a screenshot diagram illustrating example widget checkout in a content site in some embodiments of the CWI. When the checkout widget 1310 is clicked, a lightbox 1315 may be displayed overlaying on top of the site. The lightbox may include shipping information 1315*a*, shipping type 1315*b*, payment information 1315*c*, purchase summary and details 1315*d*, and/or the like. In some implementations, the lightbox may request wallet credentials from the consumer to retrieve consumer information relating shipping and payment information on file with the wallet. The consumer, upon agreement with the information on the lightbox, may place an order by clicking on the pay button 1315*e*. Once the purchase transaction is authorized, the wallet services component may, in some implementations, provide the content publisher credit for monetizing the product via product review on the content site.

Figure 13C:
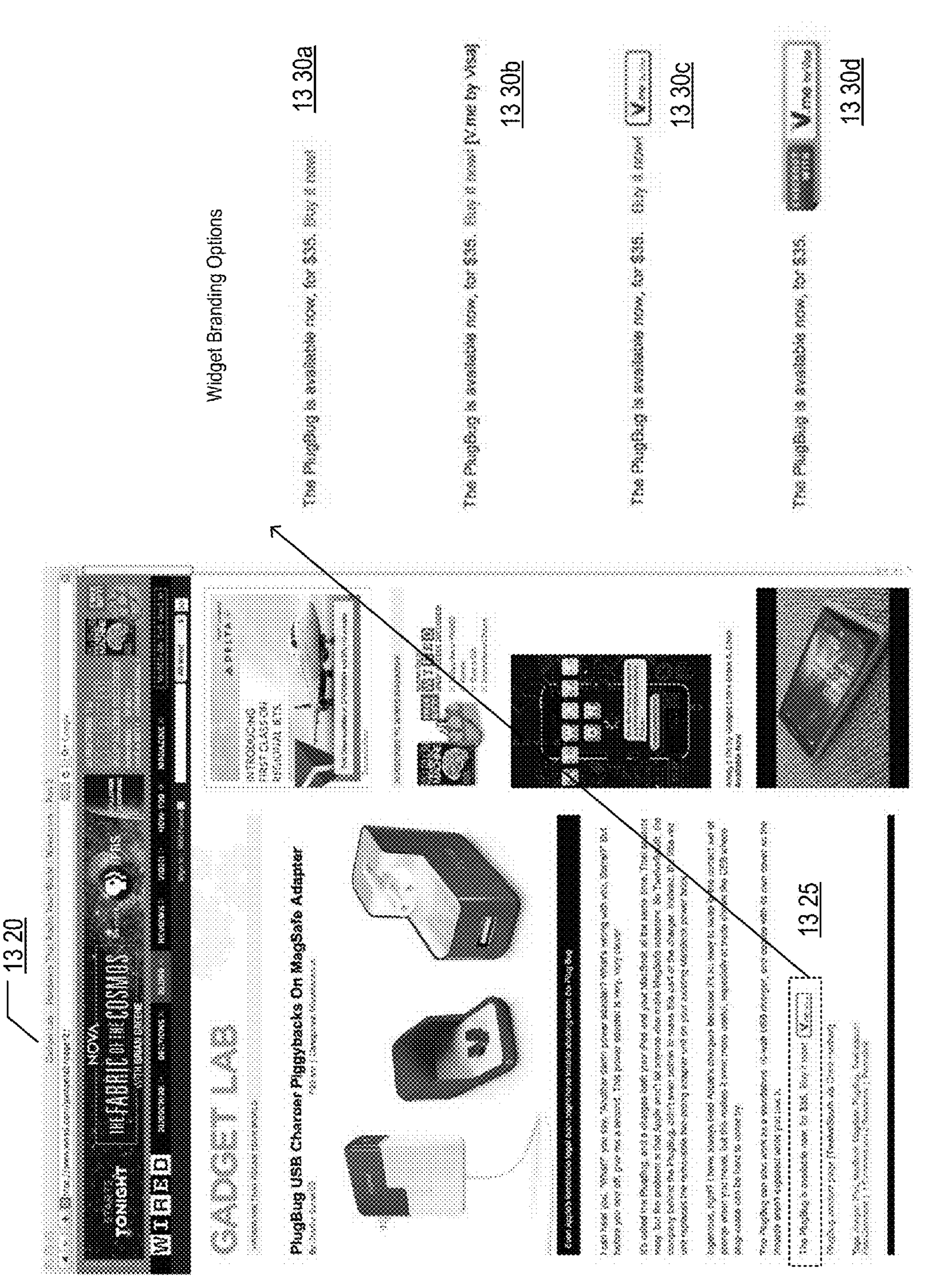
FIG. 13C shows diagrams illustrating example checkout widget branding options, in some embodiments of the CWI.

FIG. 13C shows diagrams illustrating example checkout widget branding options in some embodiments of the CWI. As shown, a content site 1320 may link content with product and facilitate checkout of the product directly from the content site. In one implementation, the checkout widget 1325 on the content site may be branded in multiple ways. In one implementation, the product may be advertised for checkout simply as a link 1330*a* with no branding. In some other implementations, the checkout may be implemented as a link with additional description 1330*b*, a link with a wallet branding 1330*c*, a checkout widget with wallet branding 1330*d*, a checkout widget with merchant, issuer, or site publisher branding, and/or the like.

Figure 14:
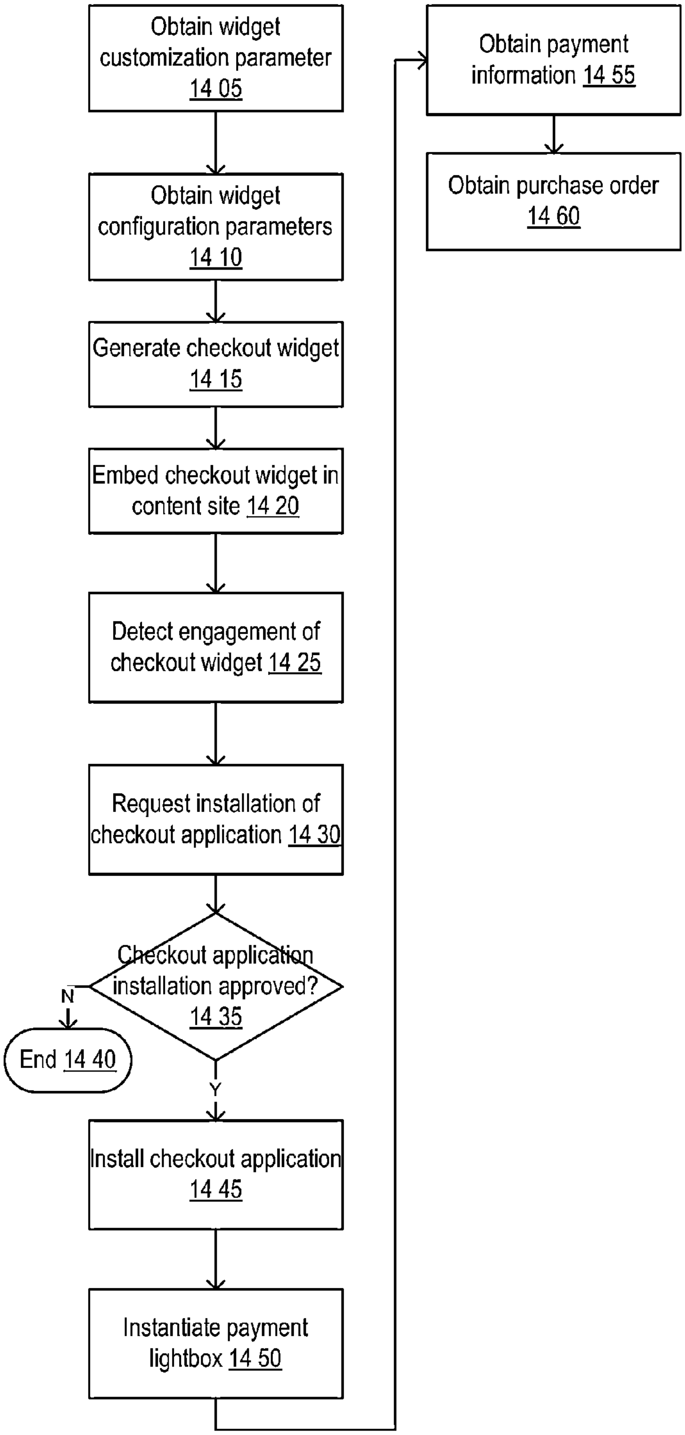
FIG. 14 shows a logic flow diagram illustrating example widget integration and checkout, in some embodiments of the CWI.

FIG. 14 shows a logic flow diagram illustrating example widget integration and checkout in some embodiments of the CWI. In one implementation, the CWI may obtain widget customization parameters from a merchant at 1405. The widget customization parameters in some implementations may include parameters for creating a checkout widget, a checkout link, a checkout post or tweet, a URL, a QR code, and/or the like. The customization parameters may be embedded or associated with the widget. At 1410, the CWI may obtain widget configuration parameters. The widget configuration parameters in some implementations include identification of a channel where the widget is to be embedded. For example, a social media channel, a web channel, a mobile channel, a content site channel, a retail channel, and/or the like. At 1415, the CWI may generate a checkout widget using the customization and configuration parameters. At 1420, the CWI may embed the widget in a content site. In some implementations, code snippets of the widget may be provided via APIs to a developer of the site for embedding. In other implementations, the user may copy and paste the widget. At 1425, the CWI may detect engagement of the widget by a consumer who may wish to checkout a product corresponding to the widget. In one implementation, at 1430, the CWI may request the consumer's permission to install a checkout application (e.g., a wallet application). If the installation is not approved at 1435, the consumer may need to use alternate ways to checkout (e.g., FIG. 9B) or the process may end at 1440. If the installation is approved at 1435, the CWI may install the application at 1446. At 1450, a payment lightbox 1450 may be instantiated to process the purchase transaction. In some implementations, a buy button on the installed application may need to be engaged to launch the payment lightbox. In one implementation, the payment light box may request the consumer's wallet credentials if the consumer has an existing wallet account and wishes to use information in the wallet to conduct the purchase transaction. Additionally, the consumer may input payment and other details necessary for the purchase in various fields in the lightbox. At 1455, the CWI may obtain the payment information and other details necessary for the checkout to be completed. At 1460, the CWI may obtain a purchase order for the consumer confirming the checkout.

Figure 15:
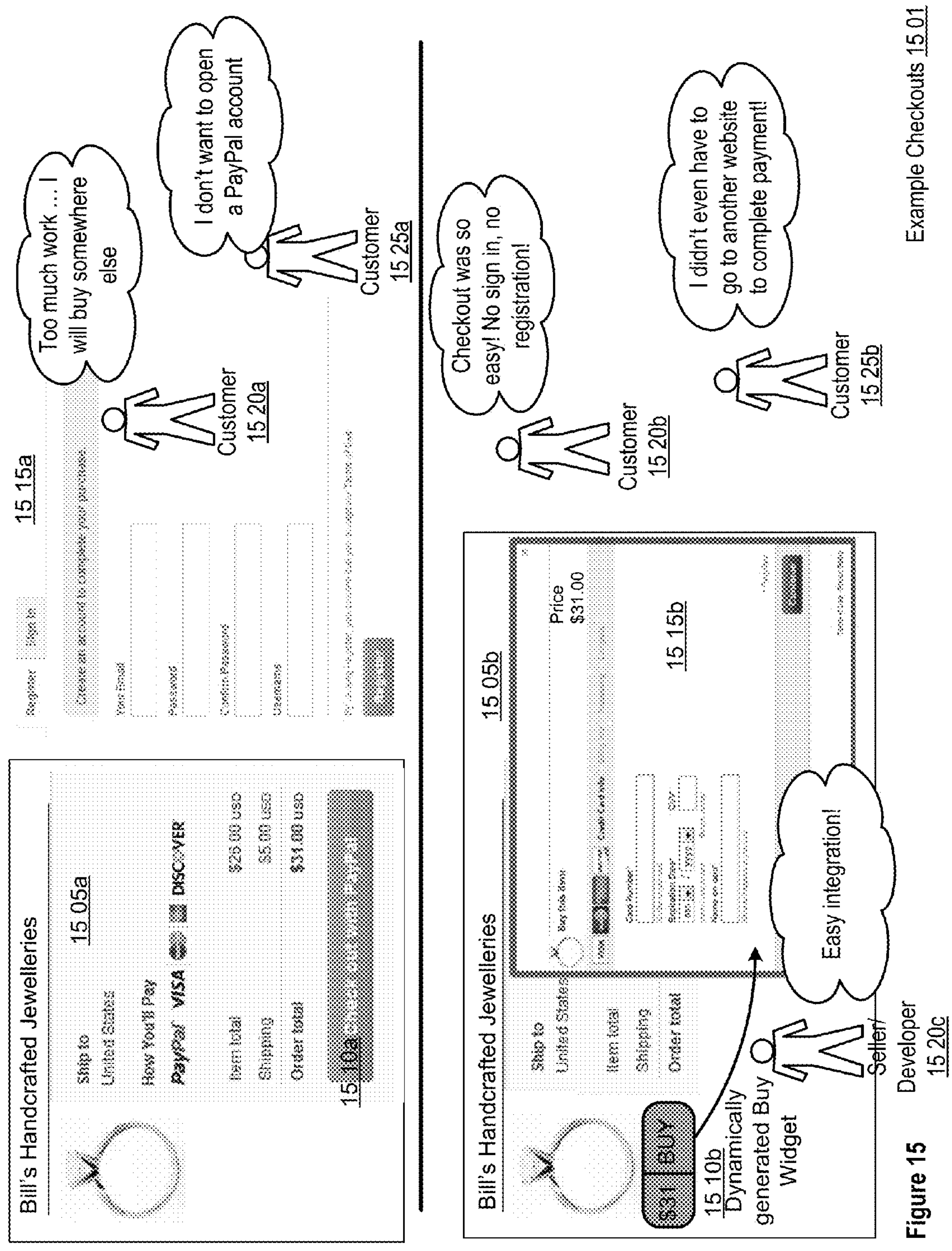
FIG. 15 shows a block diagram illustrating example checkouts, in some embodiments of the CWI.

FIG. 15 is block diagram illustrating an example checkouts in some embodiments of the CWI. As shown in the figure, a web page 1505*a* has a checkout option using PayPal. Customers 1520*a*, 1525*a* may click on the "Check out with PayPal" button 1510*a* to initiate the transaction. The clicking of the button 1510*a* may take the customers 1520*a*, 1525*a* to another page 1515*a* where the user may need to register for a new account or sign in. For customers 1520*a* and 1525*a*, such a checkout option may be inconvenient and thus may lead to the customers abandoning their shopping carts before completing the purchase.

On the other hand, an example web page 1505*b*, also shown in FIG. 15, may have an integrated payment acceptance that allows easy checkout. For example, customers 1520*b* and 1525*b* visiting web site or in an application 1505*b* may want to buy an item. In this case, he or she may click a buy button 1510*b* (e.g., V.me buy button) that is dynamically generated and coded into the web page. A payment application 1515*b* (e.g., a lightbox) may be invoked and may be overlayed on top of the web page 1505*b*. The customers may select a payment method and enter payment information on the payment window 1515*b* to complete the purchase. The checkout process is thus made simpler for the customer, with no registration or signing in required. In instances where there is a card on file, a wallet functionality may be invoked by the buy button, and the purchase may be completed in one click or action via the wallet. The customer may then receive the item, and the transaction may be settled through the merchant's account.

In addition to the ease of checkout for customers, the seller and/or developer may have obtain the advantages of easy integration of payment acceptance as the seller needs to insert a few CWI platform tags and a few code snippets to generate a buy button that accepts various forms of payments including customer's wallet and gets the seller paid. In some implementations, sellers and/or merchants may obtain and analyze buying trends and other analytics through data collected from the buy widget based purchases.

Figure 16:
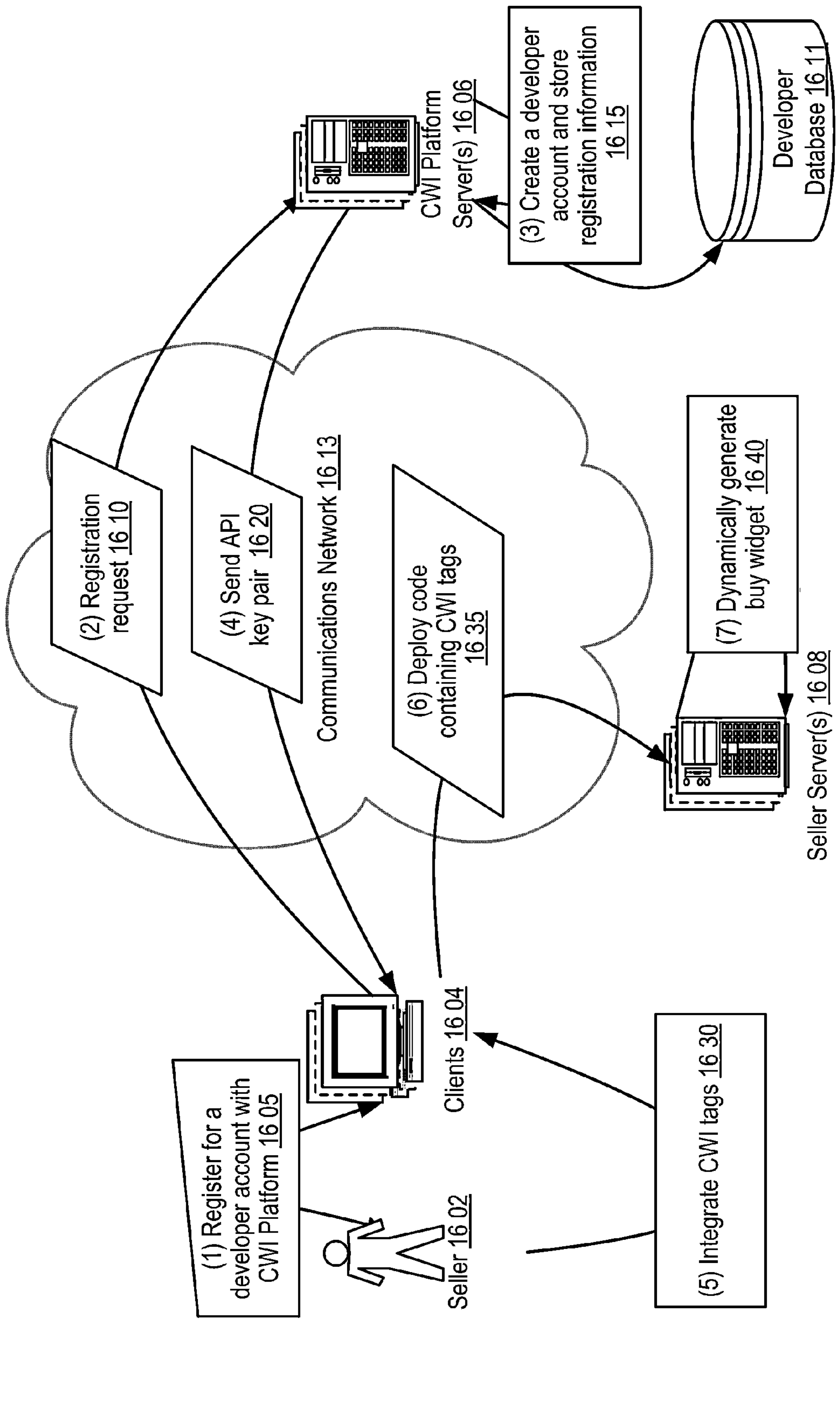
FIG. 16 shows a data flow diagram illustrating dynamic widget generation, in some embodiments of the CWI.

FIG. 16 shows a data flow diagram illustrating dynamic widget generation in some embodiments of the CWI. In one embodiment, a seller 1602 (or a developer) may use a client 1604 to register as a developer in the CWI Platform at 1605. During registration, the seller may provide login and/or other identifying information such as a name, country, currency, email address, password, userid, postback URL, and/or the like. The client 1604 may then generate a registration request 1610 using the information supplied by the user during registration. An example registration request 1610, substantially in the form of an HTTP(S) POST message including XML-formatted data, is provided below:

```
POST /registration_request.php HTTP/1.1
Host: www.v.me
Content-Type: Application/XML
Content-Length: 667
<?XML version = "1.0" encoding = "UTF-8"?>
<registration_request>
        <request_ID>4NFU4RG94</request_ID>
        <timestamp>2011-12-12 15:22:43</timestamp>
    <user_details>
        <user_ID>JDoe</user_ID>
        <password>JDoeloves2sing</password>
        <firstname>Joe</firstname>
```

-continued

```
        <lastname>Doe</lastname>
        <email>JDoe@gmail.com</email>
        <country>Canada</country>
        <currency>Canadian dollars</currency>
        <postback_URL>http://billsjewellery.com/response
</postback_URL>
        <client_detail>
            <client_IP>192.168.23.126</client_IP>
            <client_type>smartphone</client_type>
            <client_model>HTC Hero</client_model>
            <OS>Android 2.2</OS>
            <app_installed_flag>true</app_installed_flag>
        </client_detail>
    </user_details>
</registration_request>
```

Upon receiving the registration request from the seller, the CWI platform server may, at 1615, create a developer account and store the details of the account in a developer database 1611. The CWI platform server may further generate and/or provide an API key pair to the client 1604 at 1620. In one implementation, the API key pair may include a public key and a shared secret key. The public key may be used as an apikey parameter value in an initialization tag and buy button tag discussed in further detail below. The shared secret key may be used to generate encrypted tokens necessary for authenticating the seller with the CWI platform server. Example tags which use the shared secret key as one of the parameters are shown below:

| Tag/Widget | Parameters | Description |
|---|---|---|
| v:init | sharedsecretkey, userid | |
| v:buy | sharedsecretkey, amount, currency, product-id | This token may be generated with these required parameters for each product with a buy button in an app, as the parameters will vary. |

At 1630, upon receiving the API key pair from the CWI platform server(s) 1606, the developer may begin coding. Coding may involve inserting a root tag (v-root) just below the <body> tag of the application or website code. In one implementation, the root tag may be placed elsewhere in the page. In another implementation, the root tag may need to be placed just below the body tag to facilitate proper loading of the lightbox. The placement of the root tag may be relative to the root element in the Document Object Model (DOM) document. An example root tag, substantially in JavaScript, is provided below:

```
<body>
    <div id="v-root"></div>
```

The developer may then add an initialize tag (v:init) below the root tag (v-root) and before any buy button tags. The initialize tag may identify the user and page attributes for handling events using various parameters. For example, the initialize tag may set the API key and token to authenticate the seller with the CWI. Exemplary parameters for the initialize tag include, without limitation, apikey, token, userid, logo-url, country and callback. The apikey may be a string value that identifies the general API access configuration and developer settings for the site or application.

The token may be the encrypted token for the user account. It may be a string that is created by the MD5 Message Digest Algorithm hash of API secret shared key and userid. In one implementation, the parameters to the hash may not include any spaces, quotes or delimiters. These tokens may also be used as values for tokenid in CWI's buy button parameters. A CWI MD5 hash may be generated by running an appropriate function on a concatenated string of particular parameter values such as the shared secret key and userid in a proper sequence. In one implementation, the sequence may not have any spaces or delimiters. Example CWI MD5 hash syntax for languages such as JAVA, PHP, RUBY and PYTHON is provided below:

| Language | Standard Syntax for Generating MD5 Hash |
|---|---|
| Java | import org.apache.commons.codec.digest.*;<br>hash = DigestUtils.md5Hex(string1+string2+string3...); |
| PHP | $hash = md5($string1.$string2.$string3...); |
| Ruby | require 'digest/md5'<br>hash = Digest::MD5.hexdigest(string1+string2+string3...) |
| Python | import md5<br>hash = md5.new(string1+string2+string3...) |

The userid parameter is an application or game user registered and/or developer authenticated parameter. The userid may be a string representing a unique non-changing user in the developer's system. The logo-url is a string that indicates the absolute path to an image to be displayed in the payment widget. The logo-url in some implementations may be optional. The country parameter may be a string that sets the country where the application is running and may be auto-detected. The default value may be set to, for example, the United States. The callback parameter may be a string function that listens for events triggered by CWI platform widgets. The callback parameter may, in one implementation, be a globally accessible static JavaScript function. An example initialize tag, substantially in JavaScript, including one or more of the above described parameters is provided below:

```
<v:init apikey = "bbb8aae57c104cda40c9"
        token = "ed0f2847b36f27e19e5613e9e73aeda1"
        userid = "JDoe1970"
        callback="handleVmeEvents">
</v:init>
```

The initialize tag may also include the userid of the developer and a callback function discussed in further detail below. The developer may continue coding by inserting a script tag just above the </body> tag. The script tag may link to the CWI platform JavaScript Software Development Kit (SDK) for loading the CWI platform JavaScript SDK library into the application or web page. In one implementation, the library may scan a web page for buy button tags and replace them with buy buttons customized for the product items in an application or site. An example script tag, substantially in JavaScript, is provided below:

```
<script type="text/javascript"
    src="http://api8.ultimatepay.com/js/1/v-widgets.js"></script>
</body>
```

The developer may also add a CWI platform buy button tag (v:buy) to dynamically generate a buy button or widget that allows a customer to buy selected products. A number of parameters may be included in the buy button tag. Example parameters include apikey, token, amount, currency, product-id, product-desc, merch-trans, dom-id, callback, and/or the like. These parameters may be of string type. In some implementations, parameters such as product-desc, merchant-trans, dom-id and callback may be optional. An apikey key may identify API access configuration and developer settings for an application and may be the key that is provided during the on-boarding process. A token is an encrypted purchase token for a purchase. It may be created by the md5 hash of API secret shared key, amount, currency, product-id, and/or the like. An amount is the price of an item being purchased. In one implementation, the value of the amount may be displayed on the widget and is the payment that is requested from the customer's account on behalf of the seller. A currency is a parameter that sets the currency for display. A product-id is a unique non-changing identifier for an item or product in the seller's catalog or store. A product-desc is an end user friendly description of goods or services corresponding to a product-id. A merch-trans may be a transaction id for tracking purchase activity. This id may pass through the system and may be available to developers in all status replies. A dom-id may be a DOM element id that is used as a trigger for a purchase action. For example, if a valid dom-id is specified, the default or themed CWI platform buy widget may not be displayed. A callback is a globally accessible static JavaScript function that listens for events triggered by CWI platform widgets. An example buy button or widget tag, substantially in JavaScript, and including some of the parameters discussed above, are provided below:

```
<v:buy apikey = "aK2Leiv89j2A1_lOn4s1"
       token = "12f049788f4b67dc9cc58529769fb9d2"
       amount = "100"
       currency = "USD"
       product-id = "sku856781"
       callback = "handleVmeEvents">
</v:buy>
```

At 1630, the developer may inset these tags (v:root, v:init, script and v:buy) to the existing code. The completed code may then be deployed to the seller server(s) 1608 at 1635. At 1640, the inserted code snippets may dynamically generate a CWI platform buy button or widget. In some embodiments, the buy button tag may be dynamically generated server-side in the code. For basic product offerings with no changes to any of the values, the buy button may be generated once and used many times. Using a test tool (e.g., such as is described herein and with respect to FIG. 20), the developer may generate static buy button tags for a site. In some other embodiments, the test tool may be used to check the hashing algorithm in the code, or simply to become better accustomed to the CWI platform buy button fields. In yet other embodiments, the buy button widget may be customized with a logo-url (e.g., in the initialize tag), product description, and/or the like.

Figure 17:
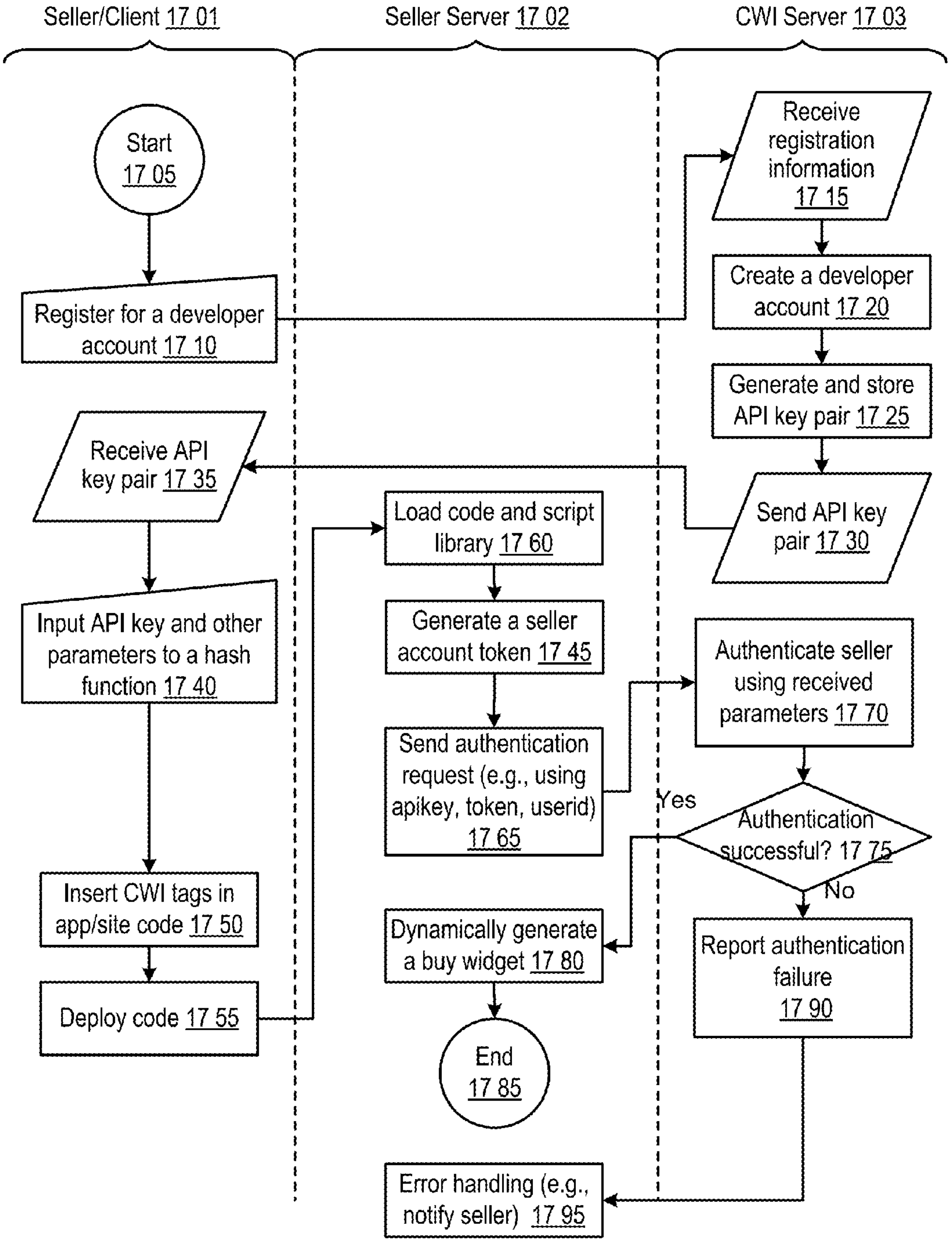
FIG. 17 shows a logic flow diagram illustrating dynamic widget generation component, in some embodiments of the CWI.

FIG. 17 shows a logic flow diagram illustrating dynamic widget generation component in some embodiments of the CWI. In one embodiment, starting at 1705, the seller using his or her client device 1701 registers for a developer account with the CWI server 1703 at 1710. The registration includes the seller supplying registration information such as name, email, userid, password, country, currency, postback URL, and/or the like. The registration information is received at 1715 by the CWI server 1703. The CWI server 1703 may then parse the received information and use the parsed information to create a developer account at 1720. At 1725, an API key pair including a public key and a shared secret key may be generated and stored in association with the seller account in one or more databases and/or tables. The API key pair may then be transmitted to the seller at 1730. The seller may, upon receiving the API key pair at 1735, input the shared secret key and other parameters to a hash function (e.g., MD5 hash) at 1740. The seller may, at 1750, insert tags (v:root, v:init, script and v:buy) in his or her app or site code. The completed code may then be deployed at 1755 to the seller server(s) 1702.

The seller server(s) 1702 may load the code and JavaScript libraries at 1760. At 1745, the seller account token may be generated for each product item listed in the application or site. At 1765, an authentication request may be sent to the CWI server(s) 1703 to authenticate the seller. The authentication request may include parameters such as apikey, token, userid, and/or the like. The CWI server(s) 1703 may receive the request and may authenticate the seller using the received parameters at 1770. If the authentication is successful at 1775, the CWI server(s) may transmit a successful authentication message and the seller server(s) 1702 may dynamically generate a buy widget at 1780, ending the process at 1785. If, however, the authentication is unsuccessful, the CWI server(s) 1703 may report authentication failure to the seller server(s) 1702 at 1790. The seller server(s) 1702 receiving authentication failure message may invoke processes for handling error, such as notifying the seller by email, or logging the error.

Figure 18:
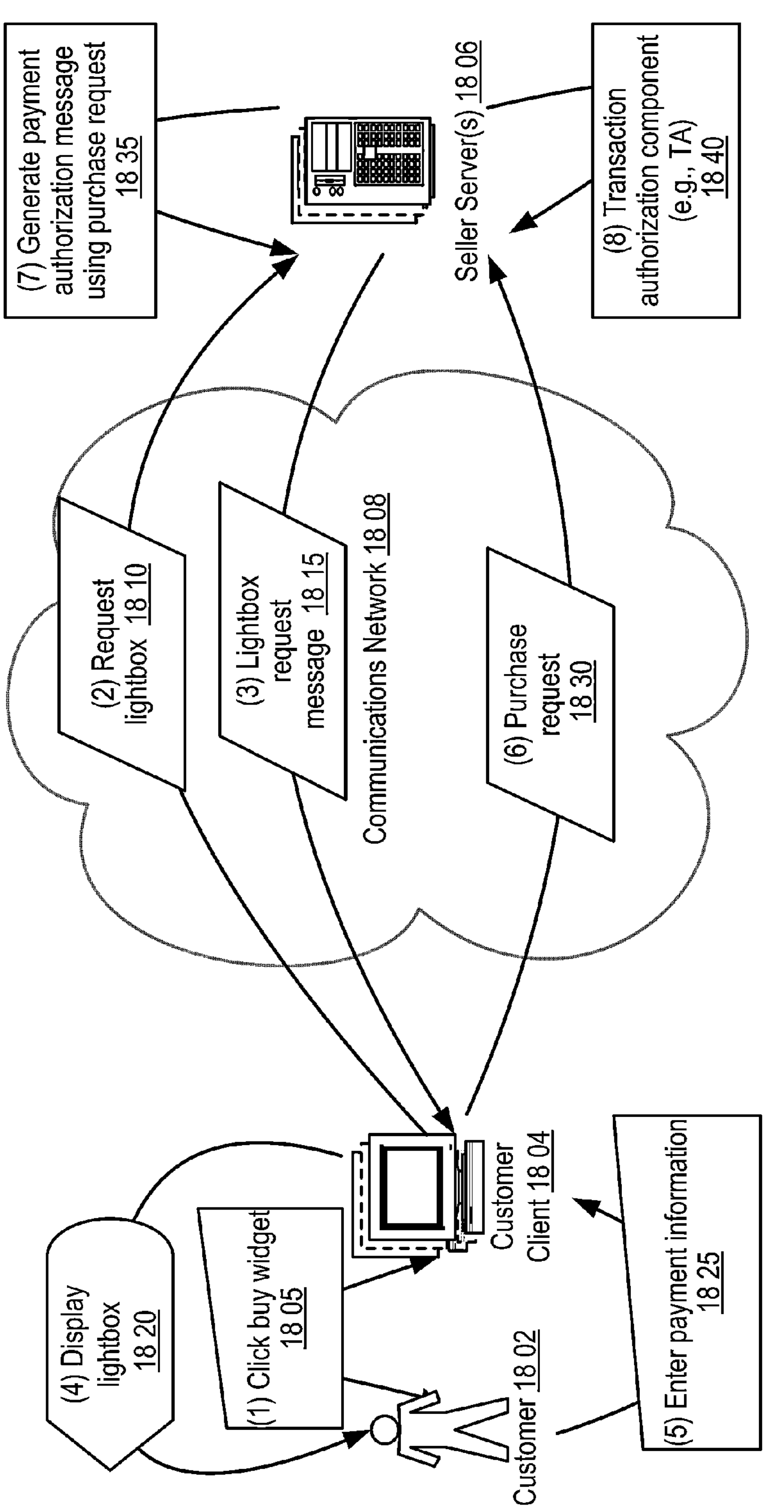
FIG. 18 shows a data flow diagram illustrating dynamically generated widget purchase, in some embodiments of the CWI.

FIG. 18 shows a data flow diagram illustrating dynamically generated widget based purchase in some embodiments of the CWI. A customer 1802 may wish to check out a product from a seller's web site. The customer may click the buy widget on the seller's web site at 1805 to initiate purchase. The customer's client device 1804 may then generate and send a payment widget (e.g., lightbox) request at 1810 to the seller's server 1806. An example payment widget request 1810, substantially in the form of an HTTP (S) POST message including XML-formatted data, is provided below:

```
POST /paymentwidget_request.php HTTP/1.1
Host: www.bobsjewelleries.com
Content-Type: Application/XML
Content-Length: 667
<?XML version = "1.0" encoding = "UTF-8"?>
<paymentwidget_request>
        <timestamp>2011-12-12 15:22:43</timestamp>
        <amount>100</amount>
        <currency> USD</currency>
        <product-id> sku856781</product-id>
   <client_detail>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
        </client_detail>
   </client_detail>
</paymentwidget_request>
```

The seller's server 1806 may respond with a payment widget (e.g., lightbox) at 1815. The payment widget (e.g., lightbox) may then be displayed at the client 1804 at 1820. The customer may then enter payment information into the displayed payment widget at 1825. At 1830, the client 1804 may take the entered payment information, and generate a purchase request message for transmission to the seller server(s) 1806 at 1830. An example purchase request 1830, substantially in the form of an HTTP(S) POST message including XML-formatted data, is provided below:

```
POST /purchase_request.php HTTP/1.1
Host: www.bobsjewelleries.com
Content-Type: Application/XML
Content-Length: 667
<?XML version = "1.0" encoding = "UTF-8"?>
<purchase_request>
        <timestamp>2011-12-12 15:22:43</timestamp>
        <nameoncard>John Doe</nameoncard>
        <creditcard_number>4444444444444448</creditcard_number>
        <expiration_month>05</expiration_month>
        <expiration_year>2014</expiration_year>
        <cvv>2345</cvv>
        <street_address>22 Pleasantville</street_address>
        <city>Beverley Hills</city>
        <zipcode>90210</zipcode>
   <client_detail>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
        </client_detail>
   </client_detail>
</purchase_request>
```

The seller server(s) may generate a payment authorization message using the purchase request at 1835. Further, at 1840, the seller server(s) may invoke purchase transaction authorization component which facilitates payment processing via payment gateway and settlement of funds between associated acquirers and issuers.

Figure 19A:
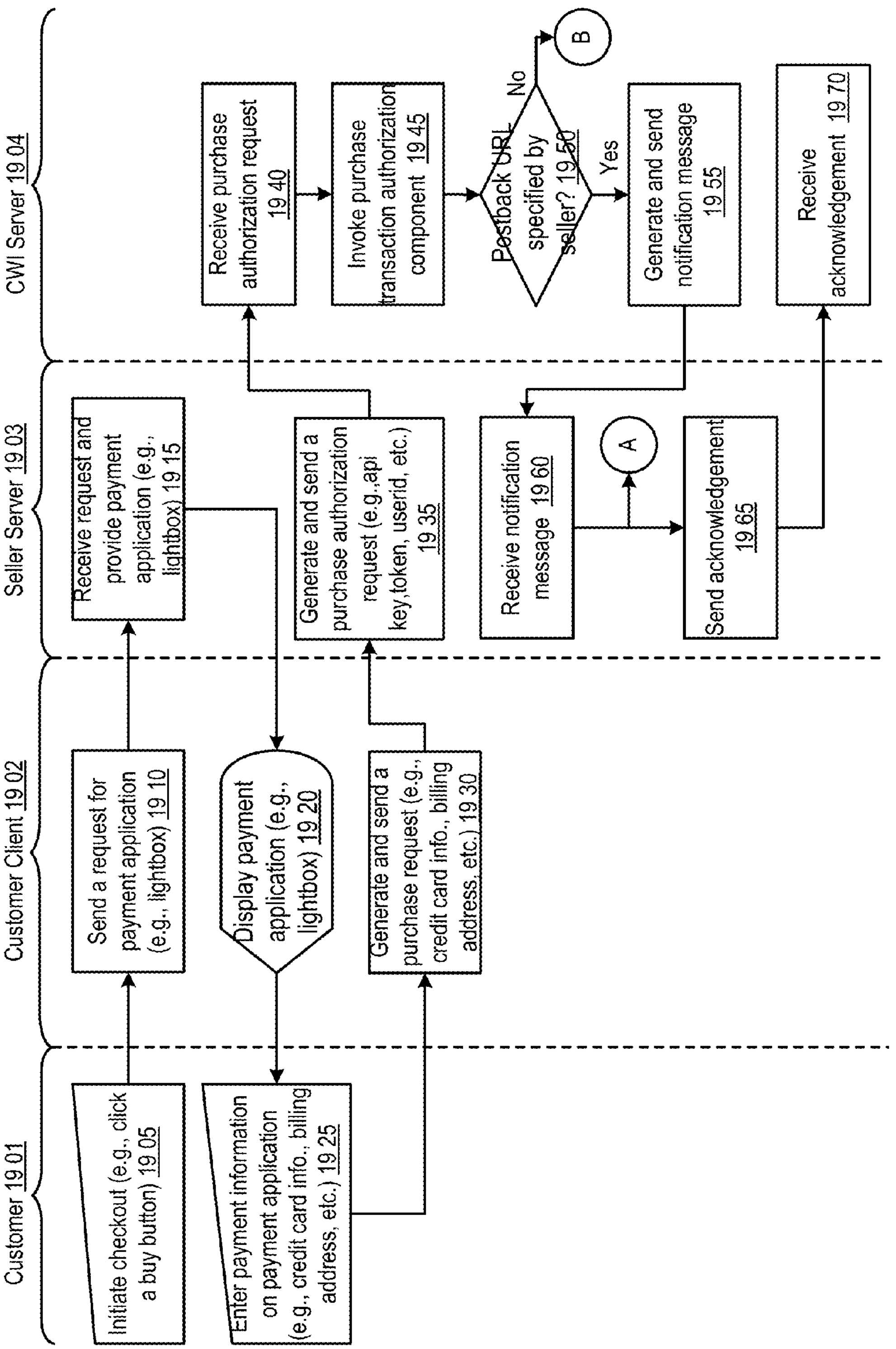
FIGS. 19*a-c* show logic flow diagrams illustrating dynamically generated widget purchase, in some embodiments of the CWI.
Figure 19B:
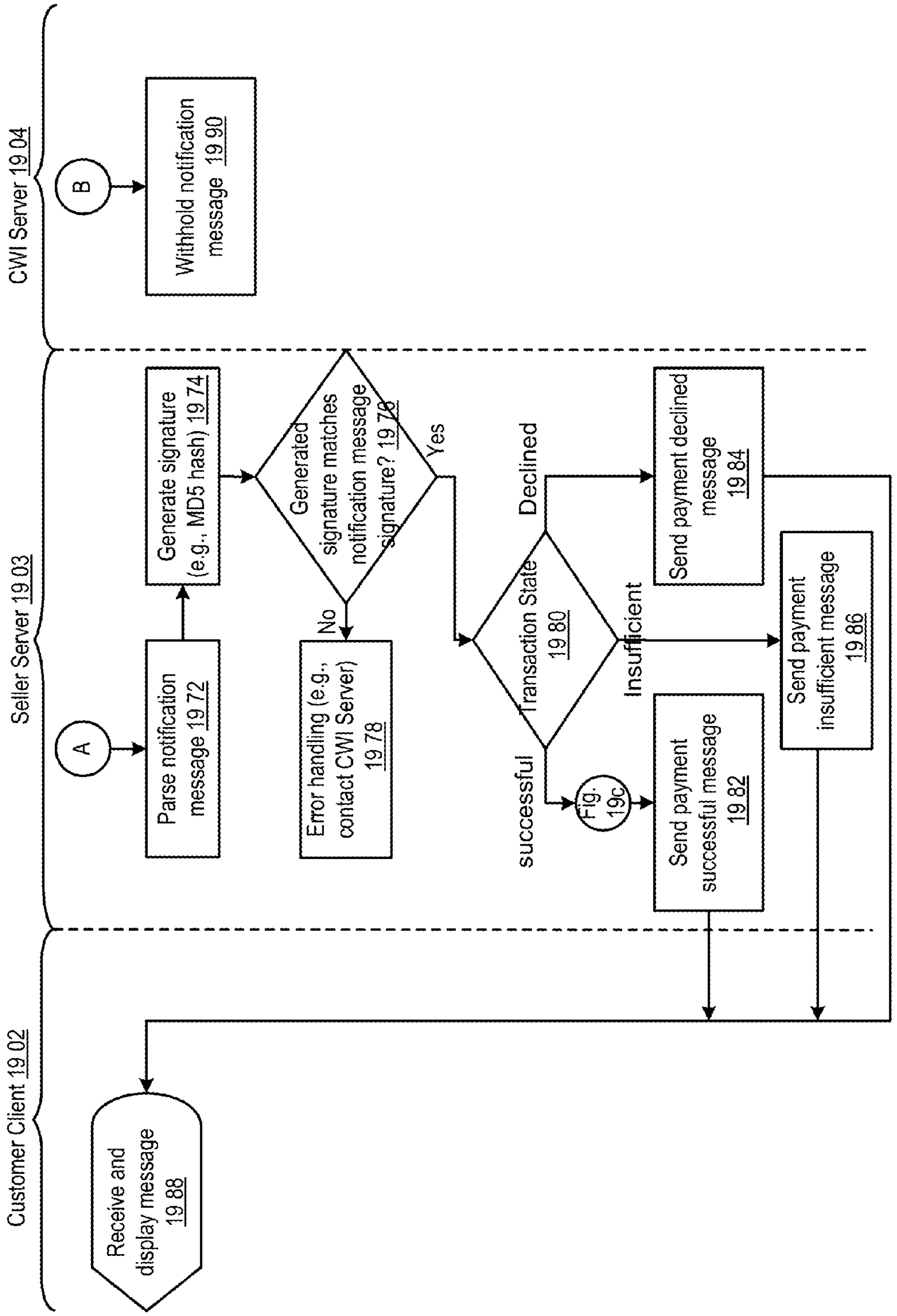

FIGS. 19*a-b* show logic flow diagrams illustrating dynamically generated widget purchase in some embodiments of the CWI. In one embodiment, a customer 1901 may initiate checkout of an item from a seller site at 1905. The checkout may be initiated by clicking or tapping on a buy widget using a customer client 1902. The click on the buy widget may generate a request for a payment application (e.g., a lightbox) at 1910 from seller server(s) 1903. At 1915, the seller server(s) 1903 may receive the request and may provide the requested payment application to the customer client 1902 at 1915. The customer client 1902 may display the payment application at 1920. When the payment application is displayed on the customer client 1902, the customer 1901 may enter payment information in one or more fields of the payment application at 1925. Credit card information, billing address, and/or the like may be provided by the customer to complete purchase. The customer client may then take the customer payment information and generate a purchase request at 1930. The purchase request may then be sent to the seller server(s), which may generate a purchase authorization request and send the request to the CWI server(s) 1904 at 1935. The CWI server(s) may receive the purchase authorization request at 1940, and may invoke a purchase transaction authorization component at 1945.

Some embodiments of the CWI platform may handle notifications and callbacks. The notifications and callbacks may facilitate customization of payment experience, data collection and a better user experience. Notifications may be available from the CWI platform for each transaction. There are multiple options for receiving a notification. One of these options are callback functions. Some of the callback methods are discussed in further detail below.

At 1950 the CWI server(s) may determine whether a postback URL has been specified by the seller. If a postback URL has been specified, the CWI server(s) may generate and send a notification message at 1955. The notification message may be received at 1960 by the seller server(s). Upon receiving the notification message, the seller server(s) may send an acknowledgement back to the CWI server(s) at 1965 to confirm receipt of the message. In some implementations, the CWI server(s) may resend the notification message a finite number of times until an acknowledgement is received. If the seller has not set up a postback URL, the CWI server may not be able to communicate any notifications to the seller, and the notification may be withheld at 1990.

After receiving the notification message at 1960, the example logic flow of FIG. 19*a* continues at FIG. 19*b*, where the seller server(s) parses the notification message at 1972 to extract fields of information including a signature in the notification message. At 1974, the seller server(s) may generate a signature key in the same way the CWI generated the signature key in the notification message. At 1976, the two signatures are compared to determine if they match. If there is no match, error handling processes may be invoked at 1978. For example, the seller may need to contact the CWI server(s) to resolve the issue. On the other hand, if the two signature keys match, the notification message is authenticated. At 1980, the seller server(s) may determine the state of the transaction by examining the parsed notification message. When the transaction state is insufficient or declined, messages 1986 and 1984 respectively may be sent to the client device for display. If the transaction state in the message is successful, the logic flow may continue with respect to FIG. 19*c*.

Figure 19C:
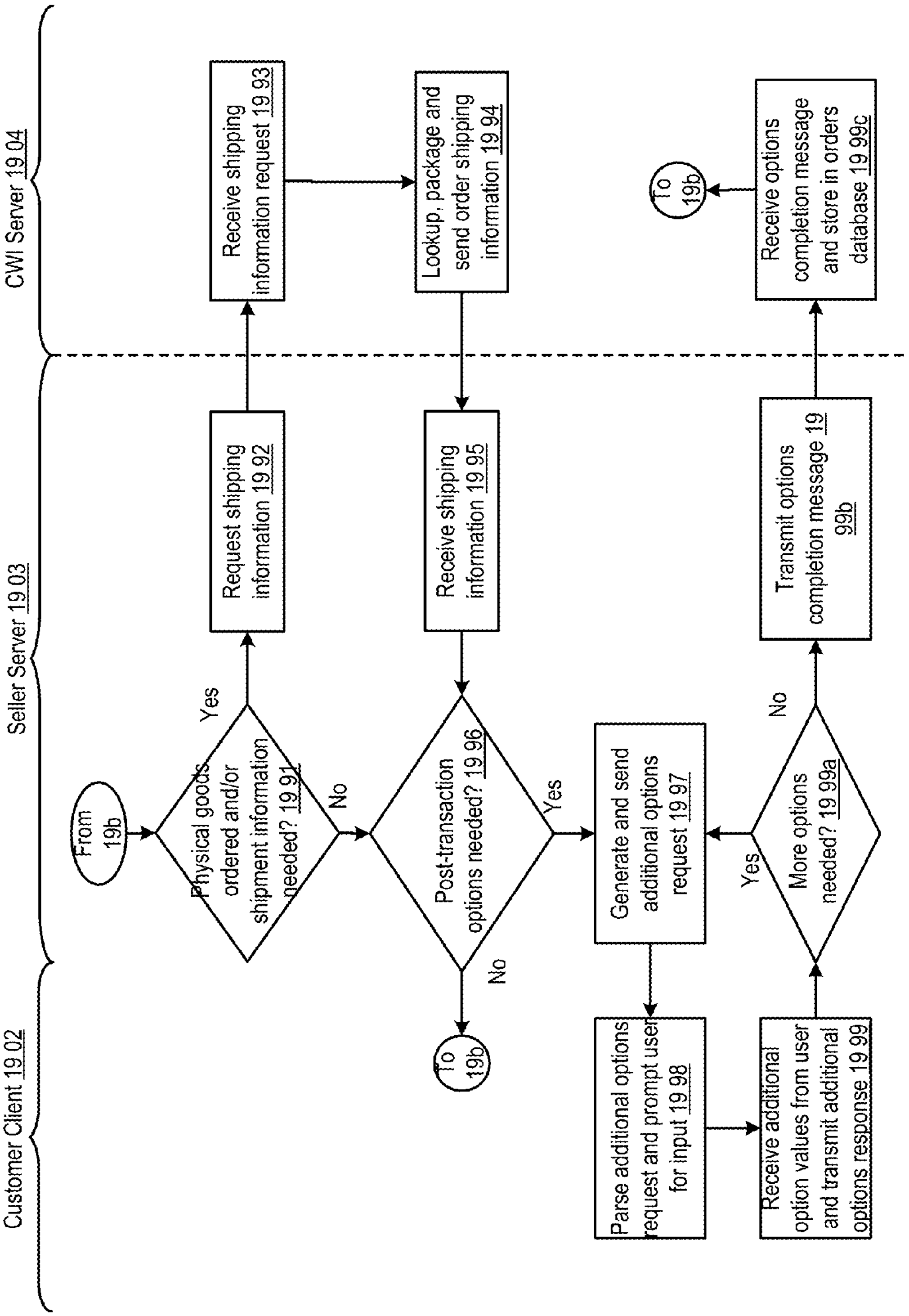

With respect to FIG. 19C, the seller server may determine if the goods that have been ordered are physical goods or goods that may require the seller to retrieve a shipping address. An example of physical goods may be a DVD player, a product delivered by a commercial carrier such as UPS or FedEx, a hand delivered product such as a gift basket, and/or the like. If physical goods are being ordered, the seller server 1903 may poll the CWI server 1904 for shipping information. For example, the seller server 1903 may issue a request for shipping information, e.g., 1992. In one embodiment, the shipping information request 1992 may be in the form of a web services call, such as SOAP, XML-RPC, or REST. An example shipping information request 1992, substantially in the form of an HTTP(S) POST message including XML-formatted data, is provided below:

```
POST /shipping_info_request.php HTTP/1.1
Host: www.server.com
Content-Type: Application/XML
Content-Length: 667
<?XML version = "1.0" encoding = "UTF-8"?>
<transaction_detail_request>
  <paytxnid>6565E324756</paytxnid>
  <adminid>7643</adminid>
</transaction_detail_request>
```

In one embodiment, the CWI server will then receive the shipping information request, e.g., 1993. The CWI server 1904 may send the shipping information request to a third-party server for processing or may process the request locally. For example, the CWI server may extract the identifier specifying the order for which shipping information is requested, e.g., paytxmid and/or the like, or may look-up the order in an orders database using session information and/or the like. The CWI server may then reply to the seller server with shipping information for the order, and/or other information available about the order. In one embodiment, shipping information is not requested and instead other information about an order processed at the CWI server or elsewhere is requested. For example, user information, session information, product information, and/or the like may be requested. In one embodiment, the response from the CWI server may be sent to the seller server 1903. An example shipping information response, e.g., 1994, 1995, substantially in the form of an HTTP(S) POST message including XML-formatted data, is provided below:

```
POST /response.php HTTP/1.1
Host: www.server.com
Content-Type: Application/XML
Content-Length: 667
<?XML version = "1.0" encoding = "UTF-8"?>
<transaction_detail_response>
  <status>CAPTURED</status>
  <call-id>114564353</call-id>
  <paytxnid>101440637</paytxnid>
  <amount>49.95</amount>
  <currency>USD</currency>
  <products>
    <product>
      <product-id>1234</product-id>
      <product-descrp>Sony DVD Player</product-descrp>
    </product>
    <product>
      <product-id>5478</product-id>
      <product-descrp>14-inch Tablet PC</product-descrp>
    </product>
    <product>
      ...
    </product>
  </products>
  <state-of-transaction>NY</state-of-transaction>
  <reconciliation-id>54874</reconciliation-id>
  <amount_detail>
    <amount>49.95</amount>
    <shipping>5.95</shipping>
    <handling>2.00</handling>
    <shippingHandling>7.95</shippingHandling>
    <tax>8.52</tax>
  </amount_detail>
    <shipping_detail>
      <shipment>
        <products_to_ship_here qty=2>
          <product>
            <product-id>1234</product-id>
            <product-descrp>Sony DVD Player</product-descrp>
          </product>
          <product>
            <product-id>5478</product-id>
            <product-descrip>14-inch Tablet PC</product-descrip>
          </product>
        </products_to_ship_here>
        <addressLine1>500 Main St.</addressLine1>
        <addressLine2>Apt 2A</addressLine2>
        <addressLine3></addressLine3>
        <city>Anytown</city>
        <state>FL</state>
        <postalCode>45784</postalCode>
        <stateProvinceCode>12</stateProvinceCode>
      </shippment>
      <shippment>
        ...
      </shippment>
    </shipping_detail>
    <payment_detail>
      <type>credit_card</type>
      <brand>VISA</brand>
      <pan4>7645</pan4>
      <bin6>547645</bin6>
      <expiration_month>05</expiration_month>
      <expiration_year>2020</expiration_year>
      <avs_response_code>300 - Approved</avs_response_code>
      <psp_ref_id>54874</psp_ref_id>
    </payment_detail>
    <risk_detail>
    <risk_level>Medium</risk_level>
    <risk_advice>
      <advice>Verify signature</advice>
      <advice>Collect drivers license number</advice>
    </risk_advice>
  </risk_detail>
```

-continued

```
<partial_billing_details>
  <cardholder_name>John Consumer</cardholder_name>
  <billing_city>Anytown</billing_city>
  <billing_state>FL</billing_state>
  <billing_phone>7184587452</billing_phone>
</partial_billing_details>
<full_billing_details>
  <cardholder_name>John Consumer</cardholder_name>
  <billing_addr1>500 Main St.</billing_addr1>
  <billing_addr2>Apt 2A</billing_addr2>
  <billing_city>Anytown</billing_city>
  <billing_state>FL</billing_state>
  <billing_phone>7184587452</billing_phone>
</full_billing_details>
</transaction_detail_response>
```

In one embodiment, the seller server 1903 may then determine that additional transaction options are needed, e.g., 1996. Additional transaction options may be additional shipping options such as express shipping or bulk-rate, the use of a pre-paid card for a partial or full payment, additional shipping detail such as an apartment number, and/or the like. If no additional transaction options are needed, the logic flow may continue with respect to FIG. 19*b*.

If additional transaction options are needed, e.g., 1996, then a request from the seller server may be sent to the customer client 1902 to request the additional options. An example additional options request 1997, substantially in the form of an HTTP(S) POST message including XML-formatted data, is provided below:

```
POST /request.php HTTP/1.1
Host: www.server.com
Content-Type: Application/XML
Content-Length: 667
<?XML version = "1.0" encoding = "UTF-8"?>
<additional_options_request>
  <timestamp>2020-12-12 15:22:43</timestamp>
  <session_id>1e987543578643356</session_id>
  <options_requested>
    <option required=true>
      <id>shipping_options</id>
      <type>shipping</type>
      <values>
        <option>Express Shipping</option>
        <option>Flat Rate Shipping</option>
        <option>Ground</option>
      </values>
      <validation_code>
        <!--inline code returned, e.g., js, for validation -->
        <script>
          var shipping = null;
          if (document.popup.shipping == null)
            alert("Please input shipping");
          else shipping = document.popup.shipping;
        </script>
      </validation_code>
    </option>
    <option required=false>
      <id>gift_wrapping</id>
      <type>up_sell</type>
      <values>
        <option>Yes</option>
        <option>No</option>
      </values>
    </option>
    <option>
      ...
    </option>
  </options_requested>
</additional_options_request>
```

The customer client 1902 may then receive the additional options request 1997 and present the options to the user for input, e.g., 1998. For example, the customer client 1902 may display a "pop up" to the user indicating that additional options are required or optional for their order and request the appropriate input. In one embodiment, the additional options request 1997 may contain inline logic such as JavaScript or the like that will be executed by the customer client. In doing so, the seller server may collect very complex input from the user without a page reload. If additional options are needed, e.g., 1999*a*, the process outlined above may repeat. If no additional options are required, the seller server 1903 may transmit an options completion message to CWI server 1904, e.g., 1999*b*, indicating that all additional options have been collected. In one embodiment, no message is sent to the CWI server. The CWI server may then, in one embodiment, note that the additional options have been received. In one example, the CWI server 1904 may receive the options for storage or later retrieval, e.g., 1999*c*. The logic flow may then continue with respect to FIG. 19*b*.

Continuing the logic flow with respect to FIG. 19*b*, the seller server(s) may send a payment successful message at 1982 for display at the client device at 1988.

As discussed before, the CWI platform supports notifications and callbacks. One way of receiving notifications is via JavaScript implemented callback functions. In some implementations, callback functions are optional for setting up and running the CWI. Callback functions facilitate customization of the payment experience by collecting relevant data and/or make the experience more powerful using a JavaScript event handler function. Using the data returned from the CWI platform, a developer may code the JavaScript event handler in a page to read any data returned by the callback and display it, log it, or take an action based on it. Additionally, developers may present a customized action such as, for example, an offer to a user if the user buy a product now. This type of callback uses a front end push mechanism. Example returned event types that may be handled with the callback functions are provided below:

| Debit Event Type | Description |
|---|---|
| debit.init | Always fires. For example, every time a call is made, there is a debit API in the background. The JSON object returns the call id, a transaction id, user token, and/or user id. |
| debit.success | Fires when the amount was successfully debited from the user's account. In other words, the payment was made. |
| debit.cancel | Fires when the Cancel button is clicked in the lightbox. |
| debit.fail | Fires when the payment fails. |

An example code portion including a developer created callback function called handleVmeEvents is shown below. The callback function is triggered in the buy button tag using the callback parameter. The function name is created by the developer, with the only requirement being that it match the value of the callback parameter in the V.me buy button tag.

```
<html>
<head>
<script type="text/javascript">
handleVmeEvents = function(eventType,data){
    var MerchantTrans = data.merchTrans;
    if (eventType == "debit.success"){
        alert ( msg );
        mywindow = window.open
("./checkyourorder.php?merchTrans=" + MerchantTrans,"Check your
Order ID","width=400,height=300");
```

-continued

```
        mywindow.moveTo(300,300);
    }
}
</script>
</head>
<body>
<div id="v-root"></div>
<v:buy apikey = "CG6KBNNKJ5ZSSJC5XTEX"
    token = "eeeeb512b710d0fde173eff8b411ec01"
    amount = "100"
    currency = "USD"
    product-id = "sku29995"
    product-desc = "10 Items, sku: 29995"
    callback = "handleVmeEvents">
</v:buy>
```

The CWI platform may also support back end push notifications in some embodiments. This may be a mandatory server-to-server communication that sends notifications regarding payment events. The Postback URL for this exchange may be configured during the seller on-boarding process. Back-end notifications are automatically sent from CWI back-end servers to the seller's back-end servers when the seller's customer makes a payment using the v:buy button tag. To confirm the communication, the CWI server(s) expects an acknowledgement back from the seller's server. If the notification is not received, there is an exponentially increasing time between a decreasing number of retries, and eventually it is abandoned. The seller may use the developer console to specify the following configuration parameters that the CWI servers may use to send back-end notifications to the seller's servers:

| Parameter | Description |
|---|---|
| Postback URL | Back-end notifications are sent to the URL specified by the seller. V.me may not send back-end notifications if the seller has not specified a back-end URL. |
| Postback Method | POST or GET |
| Postback Contenttype | (Only if Postback Method is POST) JSON or XML |

An example back-end notification message sent from the CWI back-end server to a seller's back-end server using the POST method in JSON format is provided below.

```
{ "apikey" : "JZ5K6DNHY2JEUSBUE3Y8",
  "token" : "aDsL5kJfh8kyWei8UrYk0cmNbatQldy",
  "userid" : "testuser",
  "callId" : "101830367",
  "type" : "DEBIT",
  "status" : "200",
  "state" : "PROCESSED",
  "product-id" : "sku28756",
  "productDesc" : "Item",
  "amount" : "1000",
  "currency" : "USD"
  "merchTrans" : "129446-832362-389",
  "signature" : "acTf73f590425Bc8913P6a7b9dIb4c26",
}
```

As discussed with respect to FIG. 19*b*, example values of the "state" field may include "processed," "declined," or "insufficient" based on the type of activity. In some implementations, the value of the signature key in the notification message above may be the MD5 hash of the ordered concatenated string of the shared secret key and values of certain keys in the message as illustrated by the following pseudocode:

```
signature = md5(shared secret key + userid + amount + currency +
callId + merchTrans + product-id)
```

In some implementations, the responsibility to recreate the notification message's signature and compare it to the signature in the notification message that was sent from the CWI server(s) may reside with the seller. If the signatures are not an exact match, the seller may need to contact CWI server(s)/contact immediately to determine the reason for the mismatch.

An example back-end notification message sent from the CWI back-end servers to a seller's back-end servers using the POST method in XML format is shown below.

```
<notification-payload>
    <apikey>JZ5K6DNHY2JEUSBUE3Y8</apikey>
    <token>aDsL5kJfh8kyWei8UrYk0cmNbatQldy</token>
    <userid>testuser</userid>
    <call-id>101830367</call-id>
    <type>DEBIT</type>
    <status>200</status>
    <state>PROCESSED</state>
    <product-id>sku28756</product-id>
    <product-desc>Item</product-desc>
    <amount>1000</amount>
    <currency>USD</currency>
    <merch-trans>129446-832362-389</merch-trans>
    <signature>acTf73f590425Bc8913P6a7b9dIb4c26</signature>
</notification-payload>
```

An example back-end notification message sent from the CWI back-end servers to a seller's back-end servers using a non-browser based GET method is shown below.

```
apikey=JZ5K6DNHY2JEUSBUE3Y8&token=
aDsL5kJfh8kyWei8UrYk0cmNbatQldy&userid=testuser&callid=
101830367&type=DEBIT&status=200&state=PROCESSED&product-
id=sku28756&productdesc=Item&amount=1000&currency=USD&
merchtrans=129446-832362-389&signature=
acTf73f590425Bc8913P6a7b9dIb4c26
```

In some implementations, the notifications that are pushed from CWI server(s) to the seller can be pulled at will by the seller from the same API used by CWI server(s). The pull at will facility may allow the developer the freedom to choose when to view information on a transaction. The CWI server(s) may automatically call the getStatus API for debit events when users purchase something using the buy button. In some implementations, a GET request method for making the call may follow the following syntax:

```
<UltimatePayServerURL>wallet/api/getStatus?callid={callid}&callno
={callno}&apikey={apikey}&token>={user token}&userid={User id}
```

An example request using the syntax above is shown below.

```
http://server1.sitename.com/wallet/api/getStatus?callid=100006&callno=
1&apikey=1&token=u:c6a5941420cf4cc12486abe8e09a8299&userid=
JohnDoe
```

The CWI server(s) may then send this data to sellers via a POST message in XML format. An exemplary POST message substantially in XML format is shown below.

```
<?xml version="1.0" encoding="UTF-8"?>
<activity>
  <apikey>ksdlkjdf7asdkk3dADT9I8jj5</apikey>
  <token>al3kjdfdkf844WNlkjadfl7kjf939038aUkljd</token>
  <userid>JohnDoe</userid>
  <call-id>3</call-id>
  <type>DEBIT</type>
  <status>200</status>
  <state>PROCESSED</state>
  <product-id>sku744932</product-id>
  <product-desc>Item</product-desc>
  <merch-trans>567456-456456-544</merch-trans>
  <signature>1dec14a5c5c417f69cbd3d30a474519c</signature>
  <transaction>
    <amount>50</amount>
    <currency>USD</currency>
  </transaction>
</activity>
```

Sellers may then parse these messages and handle message data. In some other implementations, sellers may proactively call the getStatus API in case the purchase data does not reach them for some reason.

An example code illustrating various tags, including root tag, initialize tag, buy button tag, JavaScript SDK tag and callback function implemented in JavaScript is shown below.

```
<html>
<head>
<script type="text/javascript">
handleVmeEvents = function(eventType,data) {
  var MerchantTrans = data.merchTrans;
  var ProductID = data.product-id;
  if (eventType == "payment.success") {
    var msg = "Payment Succeeded " + ProductID + "Order id "
+ MerchantTrans; alert (msg); }
}
</script>
</head>
<body>
<div id="v-root"></div>
<v:init
  apikey = "RGDJIXJW3U63WTCX3PS0"
  token = "98fef8ac38289318a7a4cb661f9fa0d1"
  userId = "JohnDoe"
  callback = "handleVmeEvents">
</v:init>
<h3> Welcome to Bill's Jewelries Site! Purchase content
here!</h3>
<table width="415" border="1" width="50" height="50">
<tr><td>Order ID: 1234 , 10 Items, SKU: 29995</td>
<td style=text-align:right>
<b style=font-size:2em>10 Items</b>
<v:buy
  apikey = "CG6KBNNKJ5ZSSJC5XTEX"
  token = "eeeeb512b710d0fde173eff8b411ec01"
  amount = "100"
  currency = "USD"
  product-id = "sku29995"
  product-desc = "Item, sku: 29995"
  callback = "handleVmeEvents">
</v:buy>
</td></tr>
<br><br>
<script type="text/javascript" src="http://sandbox-
static.v.me/js/1/v-widgets.js">
</script>
</body>
</html>
```

Figure 20A:
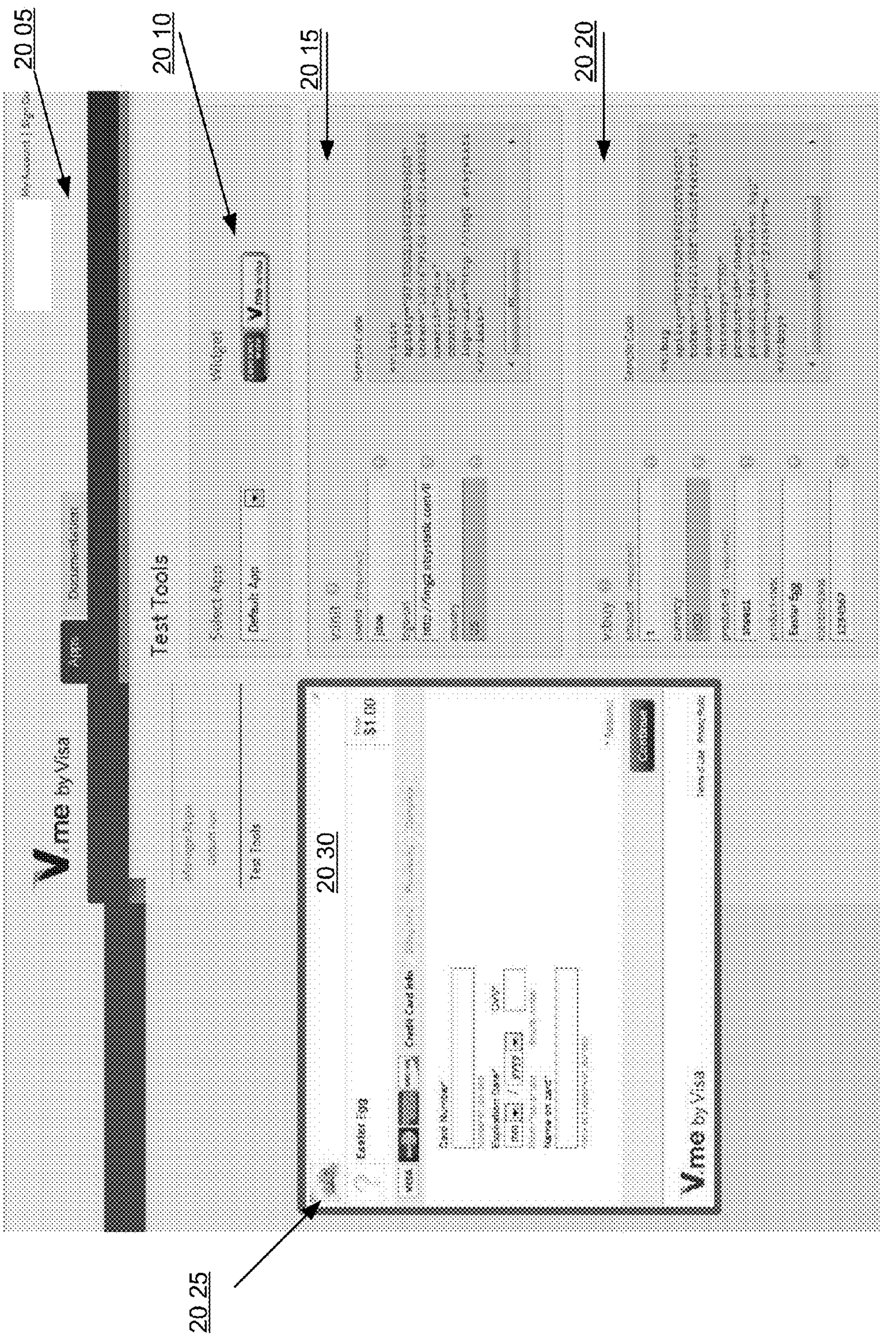
FIGS. 20*a-c* show screen shots illustrating example widget customization using test tools, in some embodiments of the CWI.
Figure 20B:
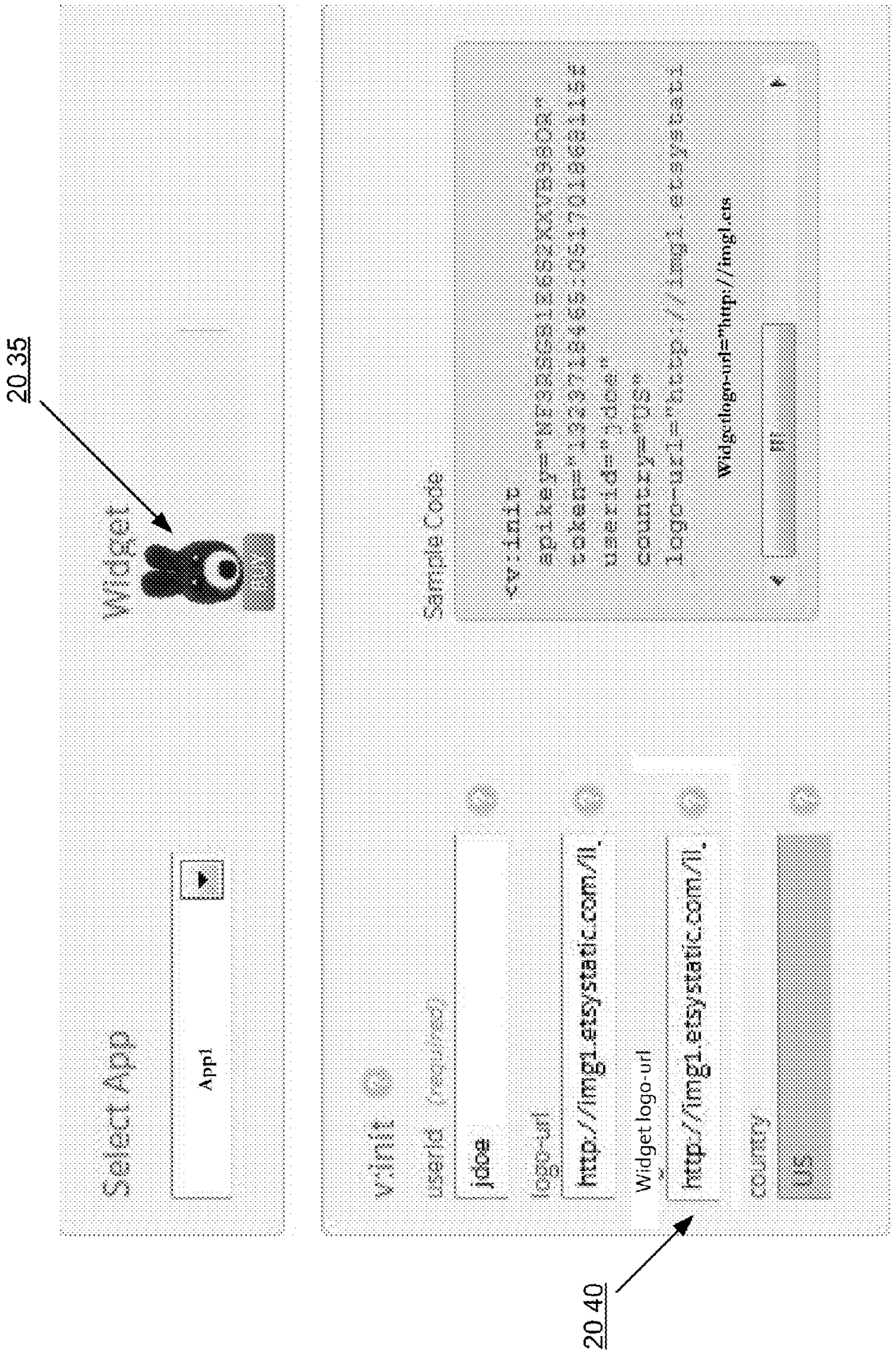
Figure 20C:
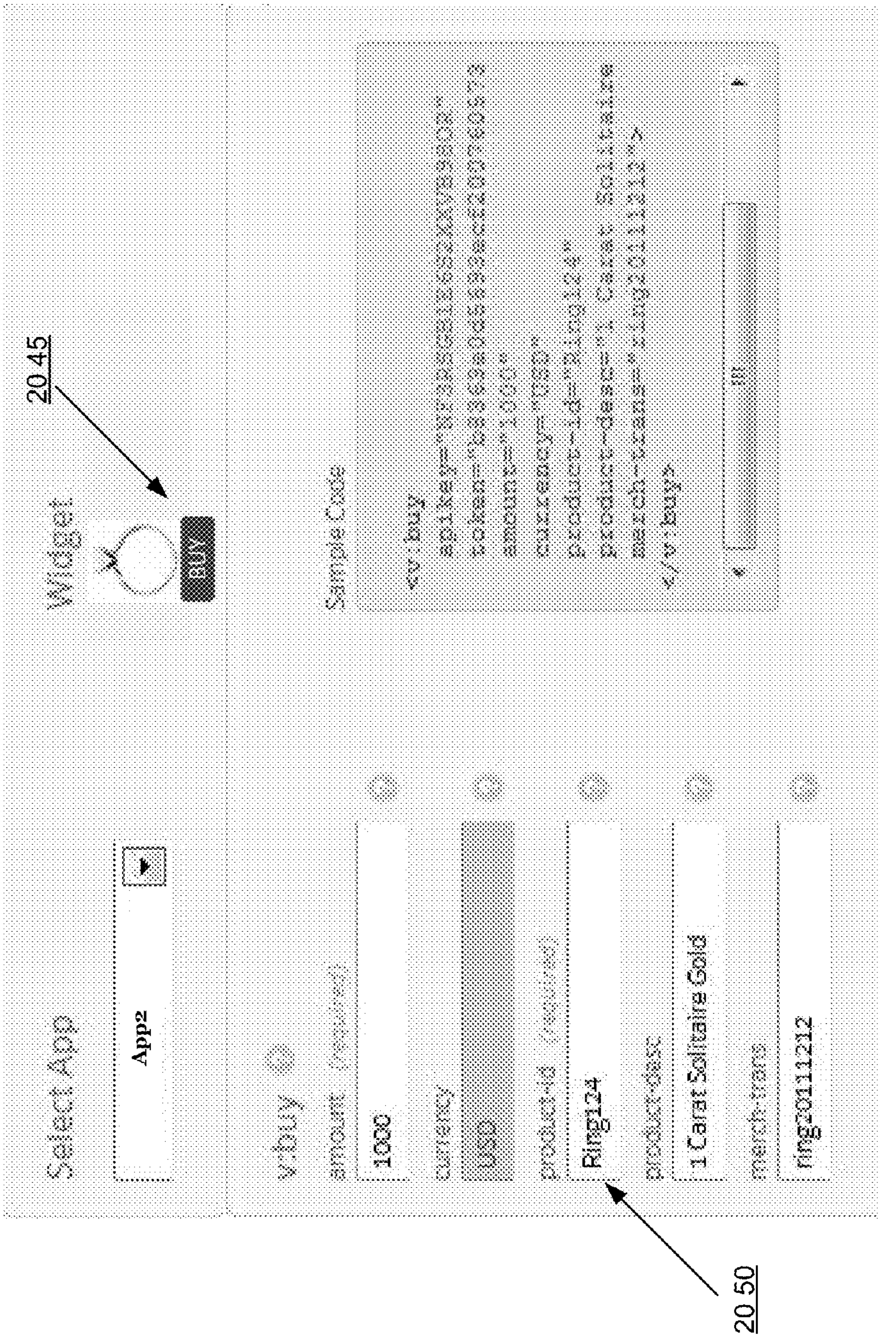

FIGS. 20*a-c* show screen shots illustrating example widgets generated via a test tool in some embodiments of the CWI. An example test tool web page 2005 is shown in FIG. 20*a*. The test tool web page includes a series of fields for selecting an application and entering values for v:init tag 2015 and v:buy tag 2020. Next to the fields for each tag are corresponding sample code snippets generated on the fly based on the user provided inputs in the fields. The buy widget 2010, in this example, may be a default widget that is not customized. When a user clicks on the buy widget, a lightbox 2030 is displayed. The lightbox 2030 is customized based on user inputs. For example, the image 2025 on the lightbox corresponds to the image in the logo-url specified in the v:init tag 2015. Similarly, the product description "easter egg" corresponds to the product description in the product-desc field of the v:buy tag 2020.

In some embodiments, the seller may have the option to customize the widget. For example, FIG. 20*b* shows an example App1 where, a widget logo-url 2040 is specified. The corresponding code then dynamically generates a widget 2035 having the image specified by the widget logo-url 2040. As another example, the widget 2045 shown in FIG. 20C is dynamically generated and customized based on the product-id code in the v:buy tag, e.g., 2050. Information such as text (e.g., "buy" or "Get it"), shape and/or color may also be specified in the various tags to dynamically generate customized or personalized buy widgets.

FIGS. 21*a-d* show example user interfaces of a widget code generator in one embodiment of the CWI. An example user interface showing a widget code generator with integrated testing is show in FIG. 21*a*. In one embodiment, code is provided by the widget generator for copy/paste into a seller's web page code (e.g., HTML, PHP, and/or the like). Some of the code, e.g., 2101, is provided for pasting near the "body" tags within the seller's site code and may not vary with respect to the other options of the widget code generator. In one embodiment, the options selected in the widget code generator will cause the v:init code, e.g., 2101, and/or the sample code to automatically change when you update widget parameters using the widget controls, e.g., 2102-2107 and/or the like.

In one embodiment, a seller may enter an amount to be charged for an item, e.g., 2102, a currency, e.g., 2103, and/or a product identifier, e.g., 2104. In some embodiments, a merchant transaction code (e.g., an order number, customer code, transaction identifier, seller identifier, and/or the like) may be entered, e.g., 2105. Options for whether the widget should collect shipping, e.g., 2106, and/or when a transaction should be processed, e.g., 2107, may also be collected. In one embodiment, some of the fields may be pre-populated based on a seller's profile, previous use of the code generator, selling history, and/or the like.

In one embodiment, the options entered into the widget may be saved for later use, e.g., 2110. In doing so, a seller may quickly generate new widget code for rapid integration into their web site code. In some embodiments, the skin of the widget that the provided code will generate may be customized through the code generator, e.g., 2108. For example, a seller may click button 2108 to input options. As a result, in one embodiment, a custom widget skin may be made available to the seller and the widget code may be updated to note the widget skin to display, e.g., 2109. In another embodiment, the widget skin customizations may be stored on the CWI server and therefore not affect the displayed code, e.g., 2109. Further detail with respect to widget skin customization can be found herein and particularly with respect to FIG. 21*b*. In one embodiment, the user may be given an option within the widget generator to generate numerous widgets in bulk, e.g., 2111. Further detail with respect to bulk widget generation can be found herein and particularly with respect to FIG. 21C.

FIG. 21*b* is an example user interface depicting widget skin customization in one embodiment of the CWI. In one embodiment, a pop-up may be presented to the seller after the seller indicates that they wish to customize the widget skin. For example, a seller may click a button, e.g., 2108, and be presented with a pop-up widget skin customization interface, e.g., 2112. In one embodiment, the seller may customize the background color of the widget to, for example, better match the background of the seller's site, e.g., 2113. The seller may also, in one embodiment, add a logo file to the widget by providing a URL to a logo file, e.g., 2114. In another embodiment, the user may upload the logo directly to the CWI server from the interface 2112 by way of a file upload control (e.g., HTML inline file upload, Flash file upload, and/or the like).

In one embodiment, the seller may check options to add badges to the widget, e.g., 2116. A badge is a textual or visual enhancement that is added near, on top of, overlapping the main widget body, and/or the like. A badge may be used to indicate that a seller has additional capabilities, accepts certain payment types, allows the consumer to split a bill with a friend, is privacy enhanced, offers credit, and/or the like. In one embodiment, the preview of the widget may be updated in real-time to show the badge(s) that a seller has selected. Additionally, in one embodiment, other options may influence the rendering of the badge with the widget. For example, a widget background color, e.g., 2113, may also be applied to a widget badge, e.g., 2116.

In one embodiment, the seller may specify additional run-time widget options. These options will cause the code generator to inject additional code into the generated widget code that will enable additional widget features. For example, in one embodiment, the widget code may be modified to allow the calculation of shipping/handling and/or tax, e.g., 2116*a*. In another embodiment, the seller may select an option to have the widget prompt the user for a quantity amount, e.g., 2116*b*. Optionally, the user may also specify a minimum and maximum amount, which will be validated by the widget prior to or after launching the lightbox. Other fields may also be dynamically loaded into the widget. In one embodiment, shipping information may be already stored in a consumer's v.me account and the seller may desire to have the dynamically generated widget display an address drop down, e.g., 2116*c*. In still another embodiment, address information may be stored on a third-party server, such as a seller's server. A seller may provide access to their or another server for the purpose of retrieving a consumer's address or other information at the time of widget rendering. In one embodiment, the preview widget, e.g., 2116*d*, may additionally display a quantity field when a seller indicates that a quantity should be displayed. Additionally, a total transaction cost may be calculated automatically based on the quantity selected, e.g., 2116*e*. In some embodiments, the widget's calculation of total cost may be modified by the address information selected within the widget, such address information being optionally automatically loaded from a virtual wallet (e.g., v.me and/or the like) or third party server via a dynamic link, e.g., 2116*c*, the quantity of item selected, tax costs, shipping costs, VAT costs, price changes, real-time commodity prices, and/or the like.

In one embodiment, as the seller selects options within the widget skin customization screen, e.g., 2112, a preview of the widget as it would appear on the seller's commerce site may appear within the interface, e.g., 2116*d*. In doing so, the seller may see in real-time the effect of their widget customization options and may make both design and content decisions that would provide an optimal user experience. Additionally, in one embodiment, the preview widget may be live and capable of performing a transaction.

FIG. 21C is an example user interface depicting bulk widget generation in one embodiment of the CWI. In one embodiment, a pop-up may be presented to the seller after the seller indicates that they wish to bulk generate widgets. For example, a seller may click a button, e.g., 2111, and be presented with a pop-up bulk widget generation interface, e.g., 2117. In one embodiment, a seller may upload a file, e.g., 2118, that contains data records to be used in bulk widget generation. Example file formats suitable for this purpose are Excel (.xls, and/or the like), Access (.dbf, and/or the like), or a flat file (e.g., comma-separated, tab-separated, and/or the like). Once uploaded, e.g., 2119, fields may be extracted from the file (such as by using COM integration within or in conjunction with MS Excel, flat-file reading, and/or the like), e.g., 2120. Fields required for widget generation, e.g., 2120, may be displayed to the seller along with an option to choose a field from the uploaded file that matches the field. The names of the required fields and the selected fields need not match. In one embodiment, a default override value option, e.g., 2121, may be provided to the seller. By inputting a value in the default override, the value of the field in widget generation will be dictated by the default field and not by a value in the uploaded file. In one embodiment, the user may specify a null value as a default override, e.g., 2122. In another embodiment, only valid values for a field may be presented to the user as a default override, e.g., 2124. Upon filling out all of the required information, the user may then indicate that they wish to bulk generate a widget code snippet for all of the entries in the uploaded data file, e.g., 2125.

In one embodiment, the CWI server will receive the bulk widget generation options and will proceed to create the widget code as described herein. Each widget code may be stored in an Excel, database, or other suitable file. In one embodiment, the bulk generated widget code may be automatically uploaded to a seller's web site server. For example, the seller may designate a template file on their server which has a placeholder suitable for replacement by the bulk widget generator. For example, the template may contain code such as:

```
<!-- BULK WIDGET TEMPLATE SNIP START -->
BULK_WIDGET_REPLACEMENT($PRODUCT_ID)
<!-- BULK WIDGET TEMPLATE SNAP END -->
```

In one embodiment, the bulk widget generation, e.g., 2125, may then copy the template file to another location on the seller's server and replace the appropriate section of the template file with the generated widget code. In order to facilitate this operation, the seller may provide the CWI access to their server, such as by providing SFTP credentials, a shared key, and/or the like.

Figure 21A:
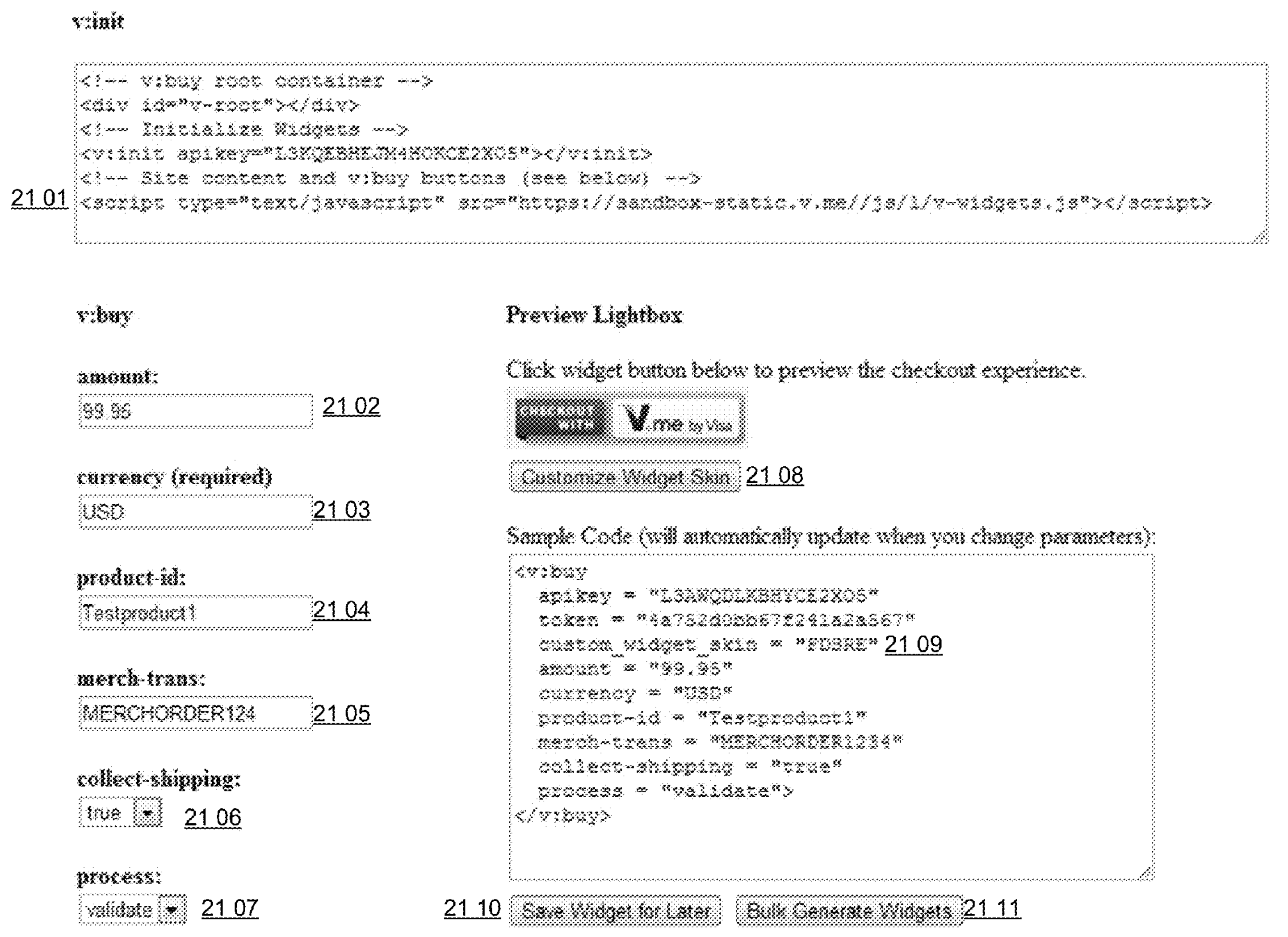
Figure 21D:

FIG. 21*d* is an example user interface depicting a widget code generator with dynamic content retrieval, in one embodiment of the CWI. In some embodiments of the CWI, sellers may desire to integrate widget code into their web sites that allows one or more of the widget option values to vary and/or be changed at the time of widget generation. In one embodiment, the option may vary within a range. For example, a seller may desire to generate a widget that automatically updates the price for an item by polling a pricing database. Additionally, instead of being required to re-generate widget code (including a shs256 hashed token)

every time an item's price changes, it may be more advantageous for the seller to specify a range of sale prices within which the widget should still accept the transaction. In one embodiment, a maximum amount, e.g., 2126, and a minimum amount, e.g., 2127) may be specified. A dynamic link, e.g., 2128, may also be specified by the seller. When polled, the link may return the current price of an item, such price optionally being within the range specified above. In so doing, the widget generator may generate a token that is not tied to a single price of an item, but rather is suitable for use with items of varying prices. Further detail regarding the generation of a token using a range of item cost amounts is provided with respect to FIG. 22.

Figure 22A:
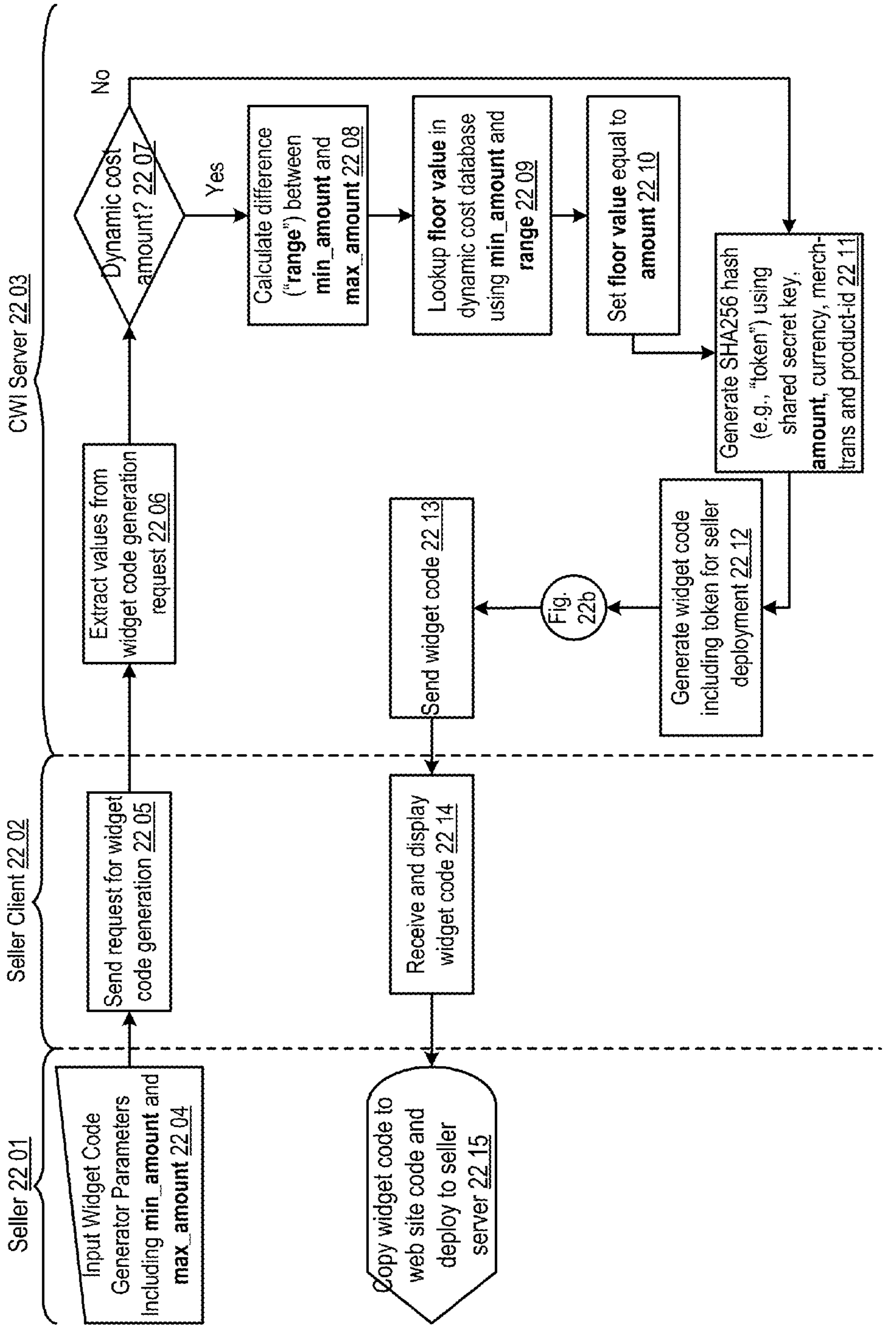
FIG. 22*a-b* shows a logic flow diagram illustrating a widget code generator with dynamic content retrieval component, in some embodiments of the CWI.

FIG. 22*a* is an example logic flow depicting a widget code generator with dynamic content retrieval, e.g., DCR component 22000, in one embodiment of the CWI. In one embodiment, seller 2201 inputs the widget code generator parameters (e.g., currency, product id, merchant transaction value, collect shipping option, and/or the like). In one example, the widget code generator parameters contain a minimum amount and a maximum amount within which the item's cost may vary, e.g., 2204. In other embodiments, the variable portion of the widget code parameters may instead be the product identifier, merchant transaction value, and/or the like.

In one embodiment, the seller client 2202 may then send a request for widget code generation to the CWI server 2203, e.g., 2205. An example widget code generation request 2205, substantially in the form of an HTTP(S) POST message including XML-formatted data, is provided below:

```
POST /widget_code_request.php HTTP/1.1
Host: www.server.com
Content-Type: Application/XML
Content-Length: 667
<?XML version = "1.0" encoding = "UTF-8"?>
<widget_code_generation_request>
  <timestamp>2020-12-12 15:22:43</timestamp>
  <api_key>LAWQDLK</api_key>
  <max_amount>110.99</max_amount>
  <min_amount>95.99</min_amount>
  <product_id>CU8765</product_id>
  <merch_trans>987545</merch_trans>
  <collect_shipping value=true />
  <process_on>capture</process_on>
  <dynamic_data field="amount">
    <dyn_link>https://merc-serve/prod/?[productid]</dyn_link>
    <substitute value="product_id">[productid]</substitute>
    <request_method>GET</request_method>
    <return_type>JSON</return_type>
    <return_variable>price</return_variable>
  </dynamic_data>
</widget_code_generation_request>
```

The server may then extract the widget generator parameters, e.g., 2206, and determine if a dynamic cost amount has been provided, e.g., 2207. In one embodiment, the CWI server 2203 can determine if a dynamic cost amount has been specified by the presence of a minimum amount and maximum amount in the request for widget code generation, e.g., 2205 and/or the extracted values, e.g., 2206. In one embodiment, the CWI server then calculates a difference or range between the minimum amount and maximum amount, e.g., 2208. Then a floor value may be looked up in a dynamic cost database, e.g., 2209. An example listing, substantially in the form of PHP/SQL commands, for querying a dynamic database for a floor value is provided below:

```
<?PHP
header('Content-Type: text/plain');
mysql_connect("locaohost",$DBserver,$password); // access
database server
mysql_select_db("dynamic_cost.sql"); // select database table to
search
//create query for token arbitrators
$query = "SELECT floor_value FROM dynamic_cost WHERE
minimum_amount > $min_amount AND maximum_amount -
minimum_amount
< $range AND permissions LIKE '%' $user_permissions";
$result = mysql_query($query); // perform the search query
mysql_close("dynamic_cost.sql"); // close database access
?>
```

In one embodiment, the floor value is a value that is based on the minimum amount and the range between the minimum amount and maximum amount. In another embodiment, the floor value is based on only the range, only the maximum value, only the minimum value, and/or the like. In still other embodiments, the floor value is specified by a CWI server administrator based on business risk tolerance (e.g., the tolerance of the issuer for risk, the tolerance of the seller for risk, the size of the transaction, the history of the buyer, and/or the like). In one example, the determined floor value is then set equal to the amount, e.g., 2210.

In one embodiment, a token is generated that represents a unique combination of widget parameters. As described herein, one or more of the unique widget parameters (e.g., amount, and/or the like) may be representative of a range of acceptable values, one value, and/or the like. In one embodiment, a token is generated using an SHA256 hashing algorithm that hashes the string combination of a shared secret key, the amount calculated above or provided by the seller, the currency, a merchant transaction identifier and a product identifier, e.g., 2211. In other embodiments, the hash is generated using MD5, Whirlpool, Gost, Haval, and/or the like. An example hash command suitable for token generation, e.g., 2211, substantially in the form of PHP is provided below:

```
$token = "";
$token = hash('sha256', $shared_secret_key . $amount . $currency
. $merch_trans . $product_id);
```

In one embodiment, the generated token will then be placed in a widget code template, and other values in the template will be populated based on user inputs, values looked up, and/or the like, e.g., 2212. A widget code template is a widget code shell that may contain placeholders for the insertion of specific widget customization parameters. The widget code and/or the widget code template may then be further customized with respect to FIG. 22*b*.

Figure 22B:
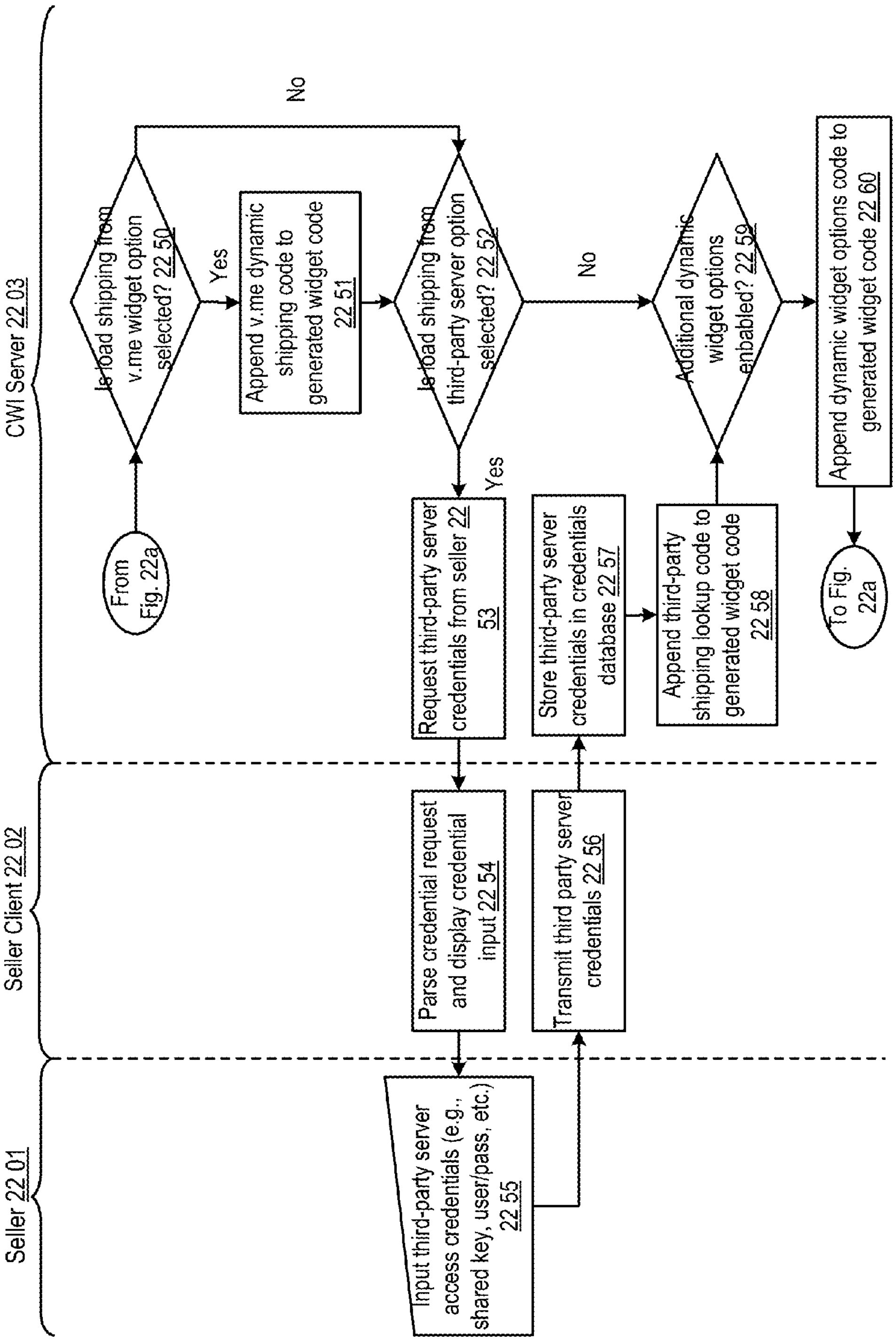

FIG. 22*b* is an example logic flow of a widget code generator with dynamic content retrieval, in one embodiment of the CWI. In one embodiment, the CWI will determine if the seller has selected that the widget should load shipping information for a consumer from the v.me virtual wallet (see, e.g., FIG. 21*b*, 2116*c*), e.g., 2250. If the seller has chosen to have the widget load v.me shipping information dynamically, then additional code to dynamically load the shipping information into the widget at the time of rendering may be appended and/or inserted into the generated widget code, e.g., 2251. Example code, substantially in the form of JavaScript/jQuery, suitable for injection into the widget code for dynamic address retrieval is:

```
//wait until DOM has loaded to trigger dynamic address loading
//then load up the address information from remote
//server (v.me, etc.)
//and build a SELECT with content
<script language="JavaScript">
jQuery(document) .ready(function($) {
  $.get(
    'https://www.v.me/',
    {doing: "get_shipping_addresses", seller_id: "1254874",
version: 5.1},
    function(response){
        //injection code begin
        inj_code = "<select name=shipping>";
        //for each returned address, create a dropdown menu
item
        for(i=0; i<response.length; i++) {
          inj_code = inj_code + "<option>" + response[i] +
"</option>";
        }
        //injection code end
      inj_code = inj_code + "</select>";
    },
    "json"
  ) ;
}) ;
</script>
```

In one embodiment, shipping information may be loaded from an external server, such as a third-party server, e.g., 2252. In some embodiments, the widget code generator may then require credential information (such as a username/password, shared key, fingerprint authentication, and/or the like) for the third-party server the seller has access to and may request that the seller client 2202 solicit this information from the seller, e.g., 2253.

In one embodiment, the seller client 2202 may parse the credential request and display a prompt to the seller 2201 for the credential information for the third-party shipping information server, e.g., 2254. The seller may then input the information directly into the widget code generator, e.g., 2255, or otherwise upload or store the information in a location accessible by the CWI server 2203. The seller client 2202 may then transmit the credentials to the CWI server, e.g., 2256. In one embodiment, the CWI server will then store the credentials in a credentials database in a secure format, such as by one-way cryptographically hashing the credential password, e.g., 2257. The CWI server may then append third-party server shipping lookup code to the generated widget code, e.g., 2258. Example code, substantially in the form of JavaScript/jQuery, suitable for injection into the widget code for third-party address retrieval is:

```
//wait until DOM has loaded to trigger dynamic address loading
//then load up the address information
//from remote server (v.me, etc.)
//and build a SELECT with content
<script language="JavaScript">
jQuery(document) .ready(function($) {
  $.get(
    'https://www.third-party.com/?credential=87HASH654',
    {doing: "get_shipping_addresses",
      user_name: "shippingAccessUserName",
      password: "timeLimitedPassword"},
    function(response) {
      //injection code begin
      inj_code = "<select name=shipping>";
      //for each returned address, create a dropdown menu
item
      for(i=0; i<response.length; i++) {
          inj_code = inj_code + "<option>" + response[i] +
"</option>";
        }
```

-continued

```
        //injection code end
      inj_code = inj_code + "</select>";
      },
      "json"
  );
});
</script>
```

In one embodiment, additional dynamic data may be loaded into the widget generator generated code, e.g. 2259 using code substantially similar to the appended code described herein. For example, default quantity information may be solicited from a costing server based on a consumer's past buying behavior and dynamic retrieval of same incorporated into the dynamically generated widget code. In one embodiment, the additional injected widget generation code may load items from a user's "wish list" at a merchant, facilitating low friction commerce opportunities via a seller based widget, e.g. 2260.

Returning to FIG. 22*a*, the widget code may then be set by the CWI server 2203 to the seller client 2202, e.g., 2213. An example widget code generation response, e.g. 2213, substantially in the form of an HTTP(S) POST message including XML-formatted data, is provided below:

```
POST /widget_code_response.php HTTP/1.1
Host: www.server.com
Content-Type: Application/XML
Content-Length: 667
<?XML version = "1.0" encoding = "UTF-8"?>
<widget_code_response>
  <timestamp>2020-12-12 15:22:43</timestamp>
  <api_key>LAWQDLK</api_key>
  <code content_type="Javascript / HTML 5.0">
      <v:buy
      apikey = "L3AWQDLKBHYCE2XO5"
      token = "7643245f59a654654"
      dynamic_amount = "https://merch-
serve/prod/?[product_id]"
      dynamic_method="POST"
      product-id = "Testproduct1"
      merch-trans = ""
      collect-shipping = "true"
      process = "validate">
  </v:buy>
  <script language="JavaScript">
      jQuery(document) .ready(function($) {
        //dynamic shipping code, e.g., 2258
      }
    </script>
  </code>
</widget_code_response>
```

The seller client 2202 may receive and display the widget code, e.g., 2214. In one embodiment, the seller may then copy and paste the generated widget code from the widget generator into their web site code (e.g., HTML, PHP code, and/or the like), e.g., 2215. The seller's web site code containing the generated widget code may then be deployed to the sellers server (e.g., by SFTP upload, using shared keys, using a live WYSIWYG code editor, and/or the like). in one embodiment the widget code generator generation step is performed by the seller's server, seller client 2202 (such as dynamically generating the widget code directly using JavaScript, and/or the like), the seller 2201 (such as by manually inserting the appropriate widget code and calculating the token), and/or the like.

CWI Controller

Figure 23:
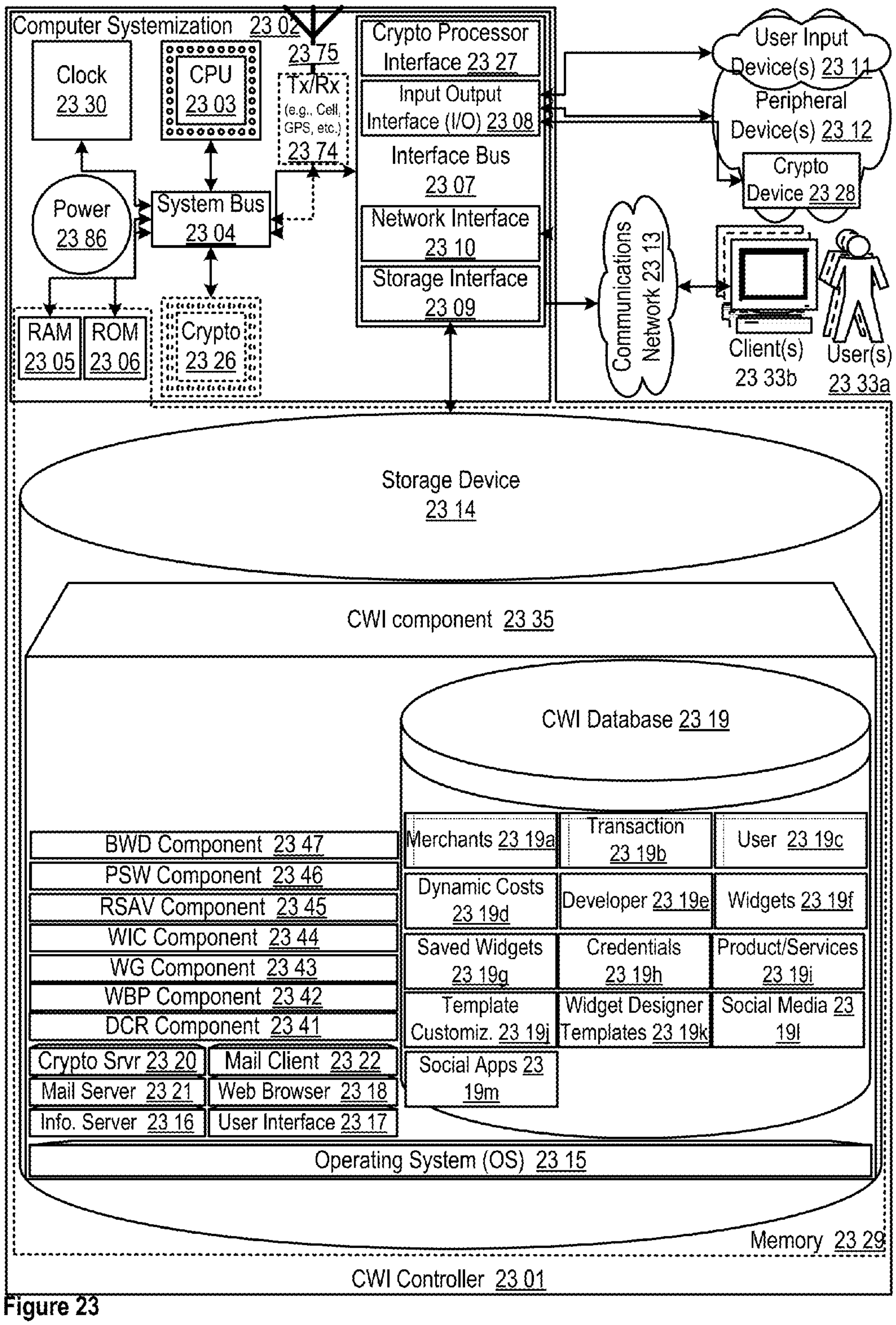
FIG. 23 shows a block diagram illustrating aspects of an exemplary embodiment of a CWI user interface controller, in one implementation of the CWI operation.

FIG. 23 shows a block diagram illustrating embodiments of a CWI controller. In this embodiment, the CWI controller 2301 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 2303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CWI controller 2301 may be connected to and/or communicate with entities such as, but not limited to: one or more users from user input devices 2311; peripheral devices 2312; an optional cryptographic processor device 2328; and/or a communications network 2313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CWI controller 2301 may be based on computer systems that may comprise, but are not limited to, components such as: a computer systemization 2302 connected to memory 2329.

Computer Systemization

A computer systemization 2302 may comprise a clock 2330, central processing unit ("CPU(s)" and/or "processor(s)" (these terms are used interchangeable throughout the disclosure unless noted to the contrary)) 2303, a memory 2329 (e.g., a read only memory (ROM) 2306, a random access memory (RAM) 2305, etc.), and/or an interface bus 2307, and most frequently, although not necessarily, are all interconnected and/or communicating through a system bus 2304 on one or more (mother)board(s) 2302 having conductive and/or otherwise transportive circuit pathways through which instructions (e.g., binary encoded signals) may travel to effectuate communications, operations, storage, etc. The computer systemization may be connected to a power source 2386; e.g., optionally the power source may be internal. Optionally, a cryptographic processor 2326 and/or transceivers (e.g., ICs) 2374 may be connected to the system bus. In another embodiment, the cryptographic processor and/or transceivers may be connected as either internal and/or external peripheral devices 2312 via the interface bus I/O. In turn, the transceivers may be connected to antenna(s) 2375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing CWI controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus)

controllers, memory management control units, floating point units, and even specialized processing sub-units like graphics processing units, digital signal processing units, and/or the like. Additionally, processors may include internal fast access addressable memory, and be capable of mapping and addressing memory 2329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CWI controller and beyond through various interfaces. Should processing requirements dictate a greater amount speed and/or capacity, distributed processors (e.g., Distributed CWI), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the CWI may be achieved by implementing a microcontroller such as CAST's R8051XC2 microcontroller; Intel's MCS 51 (i.e., 8051 microcontroller); and/or the like. Also, to implement certain features of the CWI, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CWI component collection (distributed or otherwise) and/or features may be implemented via the microprocessor and/or via embedded components; e.g., via ASIC, coprocessor, DSP, FPGA, and/or the like. Alternately, some implementations of the CWI may be implemented with embedded components that are configured and used to achieve a variety of features or signal processing.

Depending on the particular implementation, the embedded components may include software solutions, hardware solutions, and/or some combination of both hardware/software solutions. For example, CWI features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CWI features. A hierarchy of programmable interconnects allow logic blocks to be interconnected as needed by the CWI system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CWI may be developed on regular FPGAs and then migrated into a fixed version that more resembles ASIC implementations. Alternate or coordinating implementations may migrate CWI controller features to a final ASIC instead of or in addition to FPGAs. Depending on the implementation all of the aforementioned embedded components and microprocessors may be considered the "CPU" and/or "processor" for the CWI.

Power Source

The power source 2386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2386 is connected to at least one of the interconnected subsequent components of the CWI thereby providing an electric current to all subsequent components. In one example, the power source 2386 is connected to the system bus component 2304. In an alternative embodiment, an outside power source 2386 is provided through a connection across the I/O 2308 interface. For example, a USB and/or IEEE 1394 connection carries both data and power across the connection and is therefore a suitable source of power.

Interface Adapters

Interface bus(ses) 2307 may accept, connect, and/or communicate to a number of interface adapters, conventionally although not necessarily in the form of adapter cards, such as but not limited to: input output interfaces (I/O) 2308, storage interfaces 2309, network interfaces 2310, and/or the like. Optionally, cryptographic processor interfaces 2327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2309 may accept, communicate, and/or connect to a number of storage devices such as, but not limited to: storage devices 2314, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2310 may accept, communicate, and/or connect to a communications network 2313. Through a communications network 2313, the CWI controller is accessible through remote clients **2333*b* (e.g., computers with web browsers) by users 2333***a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CWI), architectures may similarly be employed to pool, load balance, and/or otherwise increase the communicative bandwidth required by the CWI controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2310 may be used to engage with various communications network types 2313. For example, multiple network interfaces may be employed to allow for the communication over broadcast, multicast, and/or unicast networks.

Input Output interfaces (I/O) 2308 may accept, communicate, and/or connect to user input devices 2311, peripheral devices 2312, cryptographic processor devices 2328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2311 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2312 may be connected and/or communicate to I/O and/or other facilities of the like such as network interfaces, storage interfaces, directly to the interface bus, system bus, the CPU, and/or the like. Peripheral devices may be external, internal and/or part of the CWI controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CWI controller may be embodied as an embedded, dedicated, and/or monitor-less (i.e., headless) device, wherein access would be provided over a network interface connection.

Cryptographic units such as, but not limited to, microcontrollers, processors 2326, interfaces 2327, and/or devices 2328 may be attached, and/or communicate with the CWI controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2329. However, memory is a fungible technology and resource, thus, any number of memory embodiments may be employed in lieu of or in concert with one another. It is to be understood that the CWI controller and/or a computer systemization may employ various forms of memory 2329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2329 will include ROM 2306, RAM 2305, and a storage device 2314. A storage device 2314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2329 may contain a collection of program and/or database components and/or data such as, but not limited to: operating system component(s) 2315 (operating system); information server component(s) 2316 (information server); user interface component(s) 2317 (user interface); Web browser component(s) 2318 (Web browser); database(s) 2319; mail server component(s) 2321; mail client component(s) 2322; cryptographic server component(s) 2320 (cryptographic server); the CWI component(s) 2335; DCR Component 2341, WBP Component 2342, WG Component 2343, WIC Component 2344, RSAV Component 2345, PSW Component 2346, BWD Component 2347; and/or the like (i.e., collectively a component collection). These components may be stored and accessed from the storage devices and/or from storage devices accessible through an interface bus. Although non-conventional program components such as those in the component collection, typically, are stored in a local storage device 2314, they may also be loaded and/or stored in memory such as: peripheral devices, RAM, remote storage facilities through a communications network, ROM, various forms of memory, and/or the like.

Operating System

The operating system component 2315 is an executable program component facilitating the operation of the CWI controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CWI controller to communicate with other entities through a communications network 2313. Various communication protocols may be used by the CWI controller as a subcarrier transport mechanism for interaction, such as, but not limited to: multicast, TCP/IP, UDP, unicast, and/or the like.

Information Server

An information server component 2316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CWI controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CWI database 2319, operating systems, other program components, user interfaces, Web browsers, and/or the like.

Access to the CWI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CWI. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CWI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 2317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CWI enabled nodes. The combined application may be nugatory on systems employing standard Web browsers.

Mail Server

A mail server component 2321 is a stored program component that is executed by a CPU 2303. The mail server may be a conventional Internet mail server such as, but not limited to sendmail, Microsoft Exchange, and/or the like. The mail server may allow for the execution of program components through facilities such as ASP, ActiveX, (ANSI) (Objective−) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CWI.

Access to the CWI mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2322 is a stored program component that is executed by a CPU 2303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2320 is a stored program component that is executed by a CPU 2303, cryptographic processor 2326, cryptographic processor interface 2327, cryptographic processor device 2328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CWI may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CWI component to engage in secure transactions if so desired. The cryptographic component facilitates the secure accessing of resources on the CWI and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CWI Database

The CWI database component 2319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CWI database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CWI database is implemented as a data-structure, the use of the CWI database 2319 may be integrated into another component such as the CWI component 2335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2319 includes several tables **2319*a-m*. A merchants table 2319*a* includes fields such as, but not limited to: merchant_id, merchant_name, country, currency, email_address, password, userid, api_key, secret_key, postback_URL, and/or the like. The merchants table may support and/or track multiple entity accounts on a CWI. A transaction table 2319*b* includes fields such as, but not limited to: transaction_id, product_id, merchant_id, user_id, product_desc, merchant_trans, customer_id, amount, currency, dom_id, state, and/or the like. A user table 2319*c* user table includes fields such as, but not limited to: user_id, user_name, customer_id, credit_card_number, expiration_date, CVV, address, email, and/or the like. A dynamic costs table 2319*d* includes fields such as, but not limited to: dynamic_cost_id, credentials_id, transaction_id, product_id, cost, minimum_cost, maximum_cost, floor_value, ceiling_value, and/or the like. A developer table 2319*e* includes fields such as, but not limited to: developer_id, secret_key, api_key, developer_name, seller_id, last_deployed_code_date, saved_widgets. A widgets table 2319*f* includes fields such as, but not limited to: widget_id, seller_id, product_id, developer_id, widget_code, last_used_widget, is_saved, and/or the like. A saved widgets table 2319*g* includes fields such as, but not limited to: saved_widget_id, widget_id, seller_id, developer_id, widget_last_updated_date, and/or the like. A credentials table 2319*h* includes fields such as, but not limited to: credential_id, seller_id, developer_id, user_name, password, crypto_key, web_site_url, request_method, request_response_variable, and/or the like. A product/services table 2319*i* includes fields such as, but not limited to: product_id, seller_id, developer_id, product_name, product_description, inventory_quantity, next_inventory_order_date, next_inventory_order_amount, model_number, manufacturer, and/or the like. A template customization table 2319*j* includes fields such as, but not limited to: template_customization_id, template_id, developer_id, user_id, merchant_id, template_rule, is_active, rule_parser, parent_template_customization_id, and/or the like. A widget designer templates table 2319***k* includes fields such as, but not limited to: widget_designer_templates_id, widget_id, template_format, template, template_parser, and/or the like. A social media table 2319*l* includes fields such as, but not limited to: social_media_id, social_media_name, application_generation_template, access_credentials, developer_api_key, last_accessed, and/or the like. A social media applications table 2319*m* includes fields such as, but not limited to: social_media_application_id, social_media_id, app_name, developer_id, associated_ widgets_id, application_pages, application_views, and/or the like.

In one embodiment, the CWI database may interact with other database systems. For example, employing a distributed database system, queries and data access by search CWI component may treat the combination of the CWI database, an integrated data security layer database as a single database entity.

In one embodiment, user programs may contain various user interface primitives, which may serve to update the CWI. Also, various accounts may require custom database tables depending upon the environments and the types of clients the CWI may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2319*a-m*. The CWI may be configured to keep track of various settings, inputs, and parameters via database controllers.

The CWI database may communicate to and/or with other components in a component collection, including itself, and/or facilities of the like. Most frequently, the CWI database communicates with the CWI component, other program components, and/or the like. The database may contain, retain, and provide information regarding other nodes and data.

The CWIs

The CWI component 2335 is a stored program component that is executed by a CPU. In one embodiment, the CWI component incorporates any and/or all combinations of the aspects of the CWI that was discussed in the previous figures. As such, the CWI affects accessing, obtaining and the provision of information, services, transactions, and/or the like across various communications networks. The features and embodiments of the CWI discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the CWI's features and facilities, and in many cases reduce the costs, energy consumption/requirements, and extend the life of CWI's underlying infrastructure; this has the added benefit of making the CWI more reliable. Similarly, many of the features and mechanisms are designed to be easier for users to use and access, thereby broadening the audience that may enjoy/employ and exploit the feature sets of the CWI; such ease of use also helps to increase the reliability of the CWI. In addition, the feature sets include heightened security as noted via the Cryptographic components 2320, 2326, 2328 and throughout, making access to the features and data more reliable and secure.

The CWI component may transform social application widget checkout requests, and/or the like and use the CWI. In one embodiment, the CWI component 2335 takes inputs (e.g., widget designer request 206, widget merchant content update request 207, social application data request 213, social checkout widget assembly request 212, registration information 1605, CWI tags and parameters 1630, buy widget click 1805, payment information 1825, and/or the like), and transforms the inputs via various components (e.g., DCR Component 2341, WBP Component 2342, WG Component 2343, WIC Component 2344, RSAV Component 2345, PSW Component 2346, BWD Component 2347, and/or the like) into outputs (e.g., widget designer response 210, social checkout widget assembly response 217, social checkout widget application injection 216, widget designer response 210, registration request 1610, deploy code request 1635, lightbox request 1810, purchase request 1830, and/or the like).

The CWI component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo! User Interface; and/or the like), WebObjects, and/or the like. In one embodiment, the CWI server employs a cryptographic server to encrypt and decrypt communications. The CWI component may communicate to and/or with other components in a component collection, including itself, and/or facilities of the like. Most frequently, the CWI component communicates with the CWI database, operating systems, other program components, and/or the like. The CWI may contain, communicate, generate, obtain, and/or provide program component, system, user, and/or data communications, requests, and/or responses.

Distributed CWIs

The structure and/or operation of any of the CWI node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CWI controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CWI controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address = '192.168.0.100';
$port = 255;
//create a server-side SSL socket, listen
//for/accept incoming communication
$sock = socket_create(AF_INET, SOCK_STREAM, 0);
socket_bind($sock, $address, $port)
  or die('Could not bind to address');
socket_listen($sock);
$client = socket_accept($sock);
//read input data from client device in 1024 byte
//blocks until end of message
do {
    $input ="";
    $input = socket_read($client, 1024);
    $data .= $input;
} while($input != "");
// parse data to extract variables
$obj = json_decode($data, true);
// store input data in a database
mysql_connect("10.1.1.1",$srvr,$pass); // access database server
mysql select("CLIENT_DB.SQL"); // select database to append
mysql_query("INSERT INTO UserTable (transmission) VALUES
($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments of the CWI may include:

1. A processor implemented method of social application widget integration, comprising:

receiving a request to instantiate a social media application view;

retrieving a social media template corresponding to the social media application view;

generating, via a computer, social checkout widget launch code;

rendering a widget enhanced social media application view using the social checkout widget launch code and the social media template; and providing the widget enhanced social media application view.

2. The method of embodiment 1, additionally comprising:

receiving a social application widget checkout render request including a social application identifier;

querying a widget checkout template database for a checkout template corresponding to the social application identifier;

generating a rendered social application checkout widget using the widget checkout template;

providing the rendered social application checkout widget.

3. The method of embodiment 1, wherein receiving a request to instantiate a social media application view includes receiving an item designator of an item for purchase.

4. The method of embodiment 3, wherein the social widget launch code is generated using the item designator of an item for purchase.

5. The method of embodiment 4, wherein the social widget launch code is configured to render a widget launch button.

6. The method of embodiment 5, wherein the widget launch button includes an indication of an item for purchase.

7. The method of embodiment 6, wherein the indication is a photo of the item for purchase.

8. The method of embodiment 3, additionally comprising:

querying a merchant server for updated pricing and inventory data corresponding to the item designator of an item for purchase; and receiving updated pricing and inventory data corresponding to the item designator of an item for purchase.

9. The method of embodiment 8, wherein receiving updated pricing and inventory data includes receiving data corresponding to a substitute item that can be substituted for the item for purchase.

In order to address various issues and advance the art, the entirety of this application for CWI (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CWI individual and/or enterprise user, database configuration and/or relational model, data type, data transmission and/or network framework, syntax structure, and/or the like, various embodiments of the CWI, may be implemented that enable a great deal of flexibility and customization. For example, aspects of the CWI may be adapted for restaurant dining, online shopping, brick-and-mortar shopping, secured information processing, and/or the like. While various embodiments and discussions of the CWI have been directed to electronic purchase transactions, however, it is to be understood that the embodiments described herein may be readily configured and/or customized for a wide variety of other applications and/or implementations.

What is claimed is:

1. A processor-implemented social widget checkout integration code generation method, comprising:

obtaining, via one or more processors, a plurality of social widget customization parameters from a user;

selecting, via the one or more processors, from a social widget template database, a social widget code template for a social media application, wherein selection of the social widget code template is based on the capabilities supported by the social media application;

applying, via the one or more processors, the social widget customization parameters to the social widget code template to create a customized widget code template;

storing, via the one or more processors, the customized widget code template in the social widget template database;

generating, using the customized widget code template, executable social widget launch code via the one or more processors;

injecting, via the one or more processors, the social widget launch code into the social media application; and executing, via the one or more processors, the social widget launch code;

in response to execution of the social widget launch code, modifying the social media application, wherein modifying the social media application includes launching an integrated checkout interface for display on a user device.

2. The method of claim 1, additionally comprising:

receiving a request to inject the generated social widget launch code into the social media application and access credentials for the social media application.

3. The method of claim 2, wherein injecting the social widget launch code comprises integrating the social widget launch code into a social media application view page.

4. The method of claim 3, wherein the social media application view page includes a placeholder token representing the widget injection point.

5. The method of claim 1, additionally comprising:

receiving a request to create a new social media application and inject the generated social widget launch code into the new social media application, wherein the request includes social media application configuration parameters;

retrieving a social media application creation template containing a social media application creation procedure;

applying the social media application configuration parameters to the social media application creation template;

executing the social media application creation procedure; and injecting the generated social widget launch code into the social media application.

6. The method of claim 1 wherein the social widget customization parameters include an indication of an item to feature in the social widget.

7. The method of claim 6, additionally comprising an image representing the item.

8. The method of claim 1, wherein the social widget customization parameters include an indication of a revenue split to be used for purchases made using the social widget.

9. The method of claim 8, wherein the revenue split includes a social media site hosting the social media application.

10. The method of claim 2, additionally comprising retrieving a social media application profile, wherein the social media application profile contains indications of the social media application capabilities.

11. The method of claim 10, wherein the social media application capabilities include the ability to limit usage of the social widget launch code to users that are above an age threshold.

12. A processor-implemented social widget checkout integration code generation system, comprising:

a memory;

a processor disposed in communication with said memory, and configured to issue a plurality of processing instructions stored in the memory, wherein the processor issues instructions to:

obtain a plurality of social widget customization parameters from a user;

select, from a social widget template database, a social widget code template for a social media application, wherein selection of the social widget code template is based on the capabilities supported by the social media application;

apply the social widget customization parameters to the social widget code template to create a customized widget code template;

store the customized widget code template in the social widget checkout database;

generate, using the customized widget code template, executable social widget launch code;

inject the social widget launch code into the social media application; and execute the social widget launch code;

in response to the execution of the social widget launch code, modify the social media application, wherein modification of the social media application includes launching an integrated checkout interface for display on a user device.

13. The system of claim 12, additionally comprising:

receiving a request to inject the generated social widget launch code into a social media application and access credentials for the social media application.

14. The system of claim 13, wherein injecting the social widget launch code comprises integrating the social widget launch code into a social media application view page.

15. The system of claim 14, wherein the social media application view page includes a placeholder token representing the widget injection point.

16. The system of claim 12, additionally comprising:

receiving a request to create a new social media application and inject the generated social widget launch code into the new social media application, wherein the request includes social media application configuration parameters;

retrieving a social media application creation template containing a social media application creation procedure;

applying the social media application configuration parameters to the social media application creation template;

executing the social media application creation procedure; and injecting the generated social widget launch code into the social media application.

17. The system of claim 12 wherein the social widget customization parameters include an indication of an item to feature in the social widget.

18. The system of claim 17, additionally comprising an image representing the item.

19. A non-transitory medium storing social widget checkout integration code generation instructions to:

obtain a plurality of social widget customization parameters from a user;

select, from a social widget template database, a social widget code template for a social media application, wherein selection of the social widget code template is based on the capabilities supported by the social media application;

apply the social widget customization parameters to the social widget code template to create a customized widget code template;

apply the social widget customization parameters to the social widget code template to create a customized widget code template;

store the customized widget code template in the social widget checkout database;

generate, using the customized widget code template, executable social widget launch code;

inject the social widget launch code into the social media application; and execute the social widget launch code;

in response to the execution of the social widget launch code, modify the social media application, wherein modification of the social media application includes launching an integrated checkout interface for display on a user device.

* * * * *